(12) United States Patent
Sensarn et al.

(10) Patent No.: US 11,302,342 B1
(45) Date of Patent: Apr. 12, 2022

(54) INTER-CHANNEL LEVEL DIFFERENCE BASED ACOUSTIC TAP DETECTION

(71) Applicant: Amazon Technologies, Inc., Seattle, WA (US)

(72) Inventors: Steven Sensarn, Milpitas, CA (US); Savaskan Bulek, Sunnyvale, CA (US); Pradeep Kumar Govindaraju, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/092,948

(22) Filed: Nov. 9, 2020

Related U.S. Application Data

(63) Continuation-in-part of application No. 16/582,091, filed on Sep. 25, 2019, now Pat. No. 10,911,881.

(51) Int. Cl.
| | |
|---|---|
| *G06F 3/01* | (2006.01) |
| *G06F 3/16* | (2006.01) |
| *G10L 19/002* | (2013.01) |
| *G10L 21/0216* | (2013.01) |
| *H04R 3/00* | (2006.01) |
| *G10L 21/0232* | (2013.01) |
| *G10L 19/02* | (2013.01) |
| *H04R 5/04* | (2006.01) |
| *H04R 3/04* | (2006.01) |

(52) U.S. Cl.
CPC .......... *G10L 21/0232* (2013.01); *G06F 3/011* (2013.01); *G06F 3/017* (2013.01); *G06F 3/16* (2013.01); *G10L 19/002* (2013.01); *G10L 19/02* (2013.01); *H04R 3/005* (2013.01); *H04R 3/04* (2013.01); *H04R 5/04* (2013.01); *G10L 2021/02165* (2013.01)

(58) Field of Classification Search
CPC ... G10L 21/0232; G10L 19/002; G10L 19/02; G10L 2021/02165; G06F 3/16; G06F 3/011; G06F 3/017; H04R 5/04; H04R 3/04; H04R 3/005
USPC ........................ 381/58, 56, 92, 359, 356, 99
See application file for complete search history.

(56) References Cited

U.S. PATENT DOCUMENTS

| | | | | |
|---|---|---|---|---|
| 6,470,142 B1 * | 10/2002 | Isozaki | ............... | H04N 9/8066 386/208 |
| 2011/0037734 A1 * | 2/2011 | Pance | ..................... | G06F 3/043 345/177 |

(Continued)

*Primary Examiner* — Vivian C Chin
*Assistant Examiner* — Con P Tran
(74) *Attorney, Agent, or Firm* — Pierce Atwood LLP

(57) ABSTRACT

A system configured to detect a tap event on a surface of a device using microphone audio data and motion data. Instead of using a physical sensor to detect the tap event, the device detects a tap event based on a power level difference between two or more microphones. When a power ratio exceeds a threshold, the device may detect a tap event and perform an action, such as delaying or ending an alarm. To reduce false positives caused by wind or loud noises close to the microphones, the device may confirm a tap event using motion data that indicates actual movement of the device. In some examples, the device may detect the tap event using a neural network processing the microphone data and the motion data. In addition, the device may embed the motion data within the microphone data using unused bits of the microphone data.

20 Claims, 36 Drawing Sheets

(56) References Cited

U.S. PATENT DOCUMENTS

| | | | |
|---|---|---|---|
| 2011/0149812 A1* | 6/2011 | Bonta | H04W 72/1268 |
| | | | 370/277 |
| 2013/0181951 A1* | 7/2013 | Klinghult | G06F 3/0416 |
| | | | 345/177 |
| 2015/0070152 A1* | 3/2015 | Rank | G08B 6/00 |
| | | | 340/407.1 |
| 2017/0064344 A1* | 3/2017 | Petersen | H04N 21/2385 |
| 2019/0175077 A1* | 6/2019 | Zhang | A61B 5/7475 |

* cited by examiner

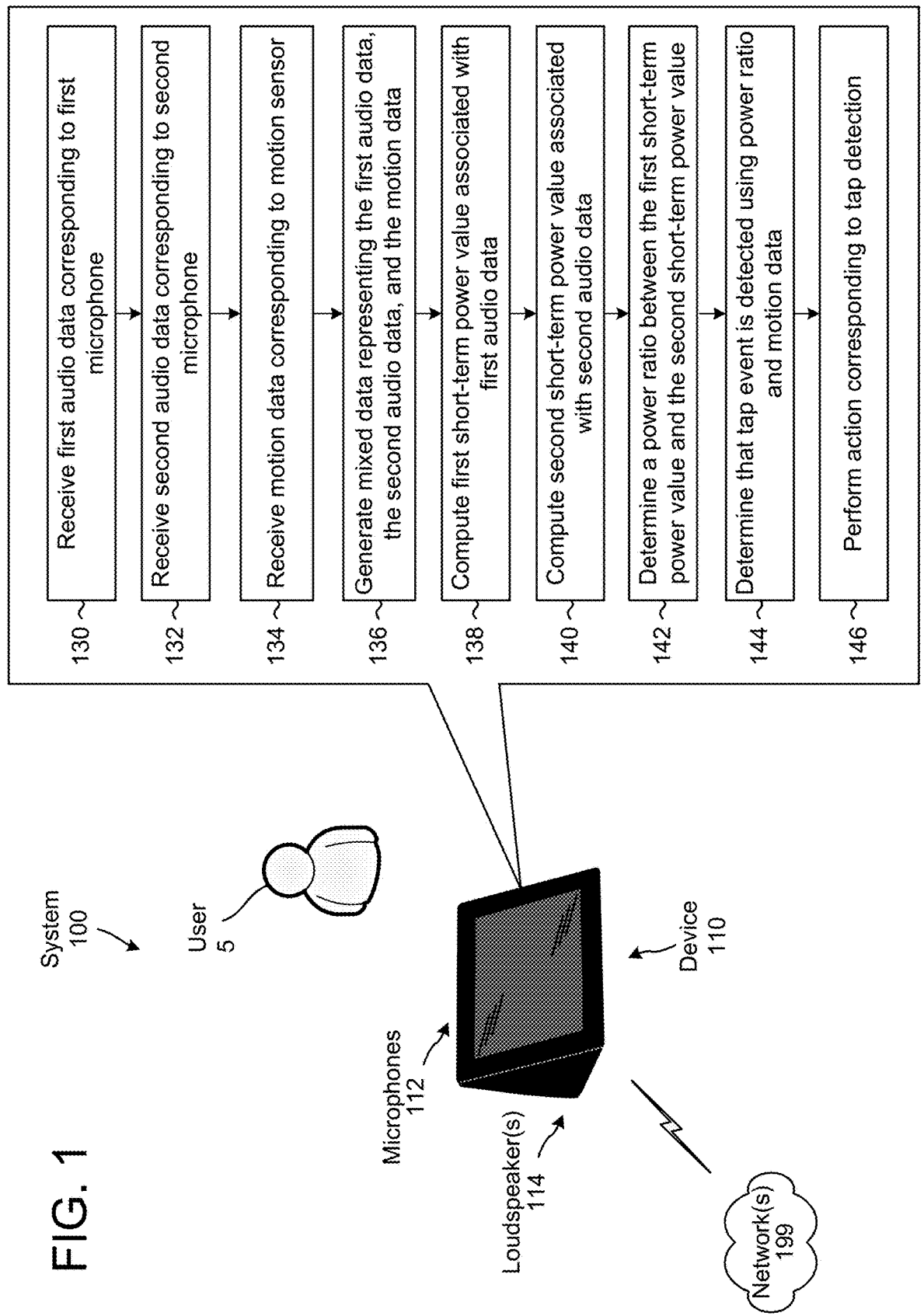

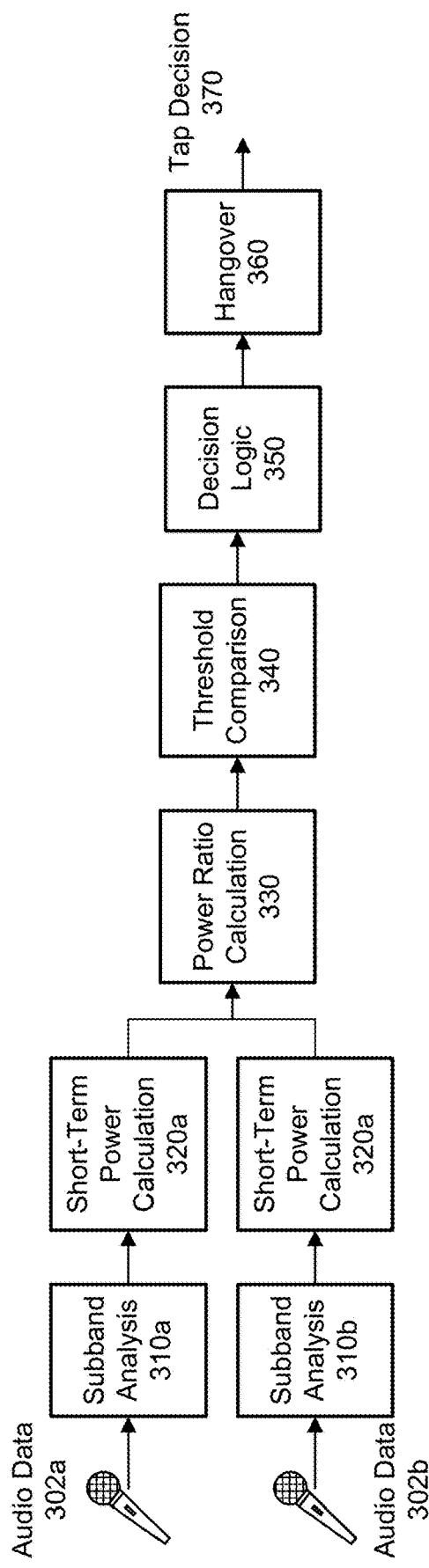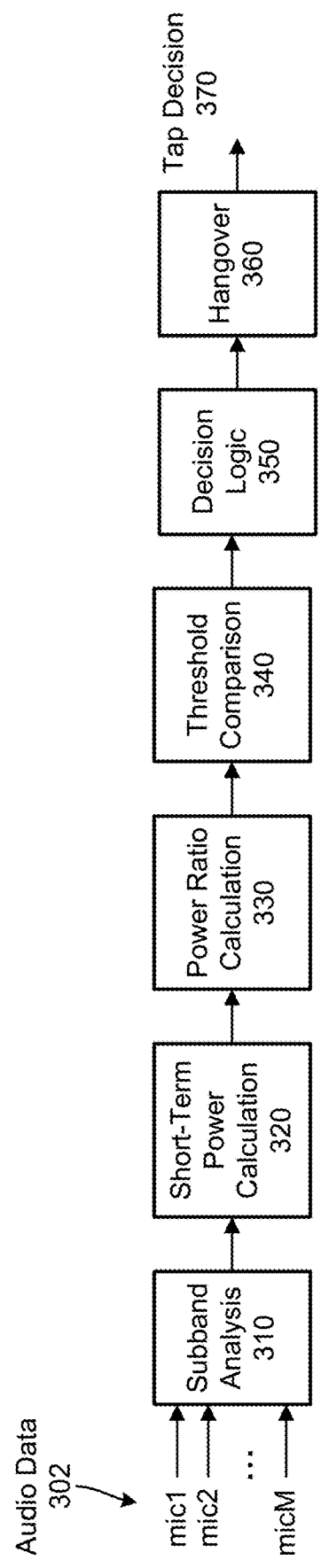

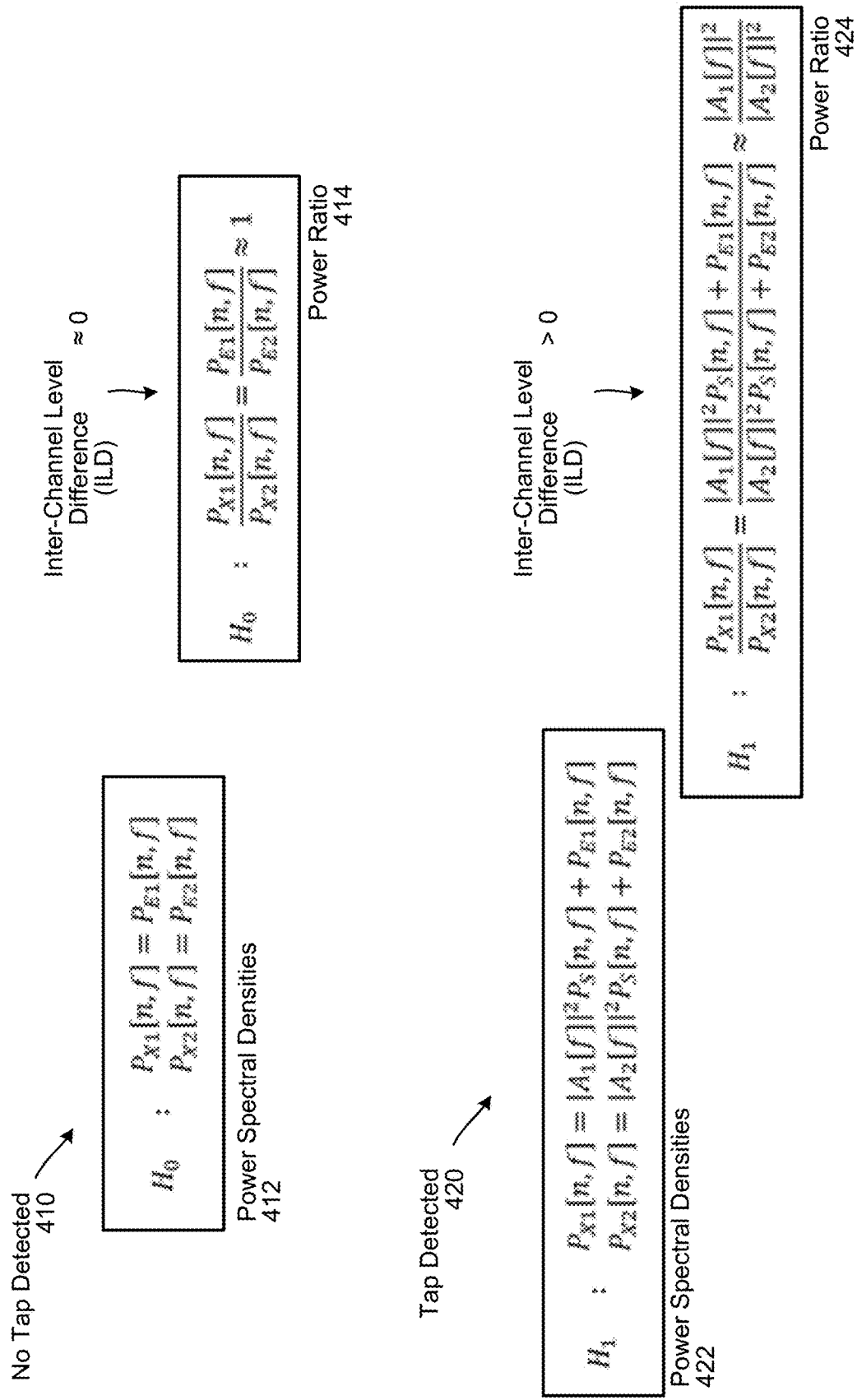

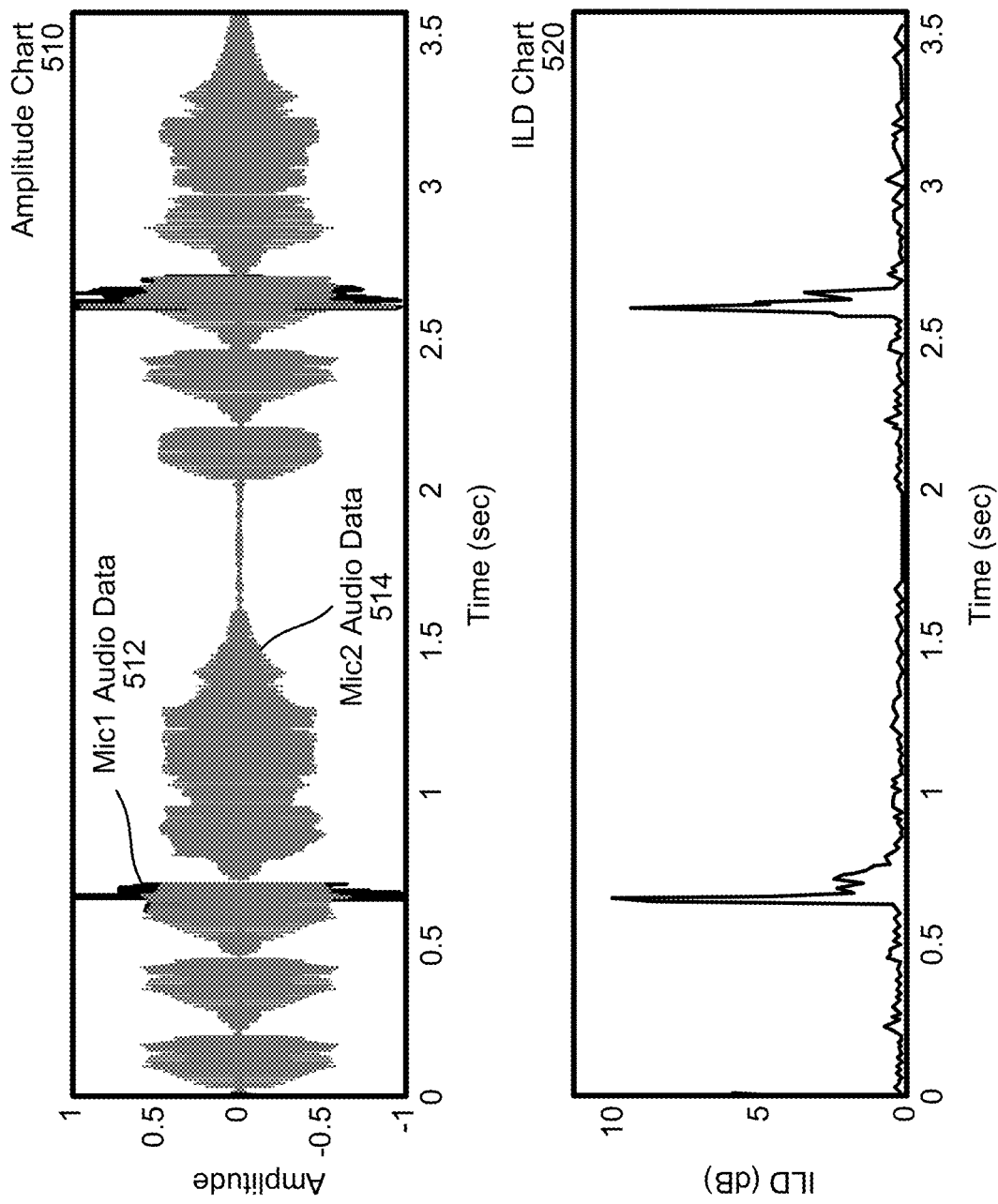

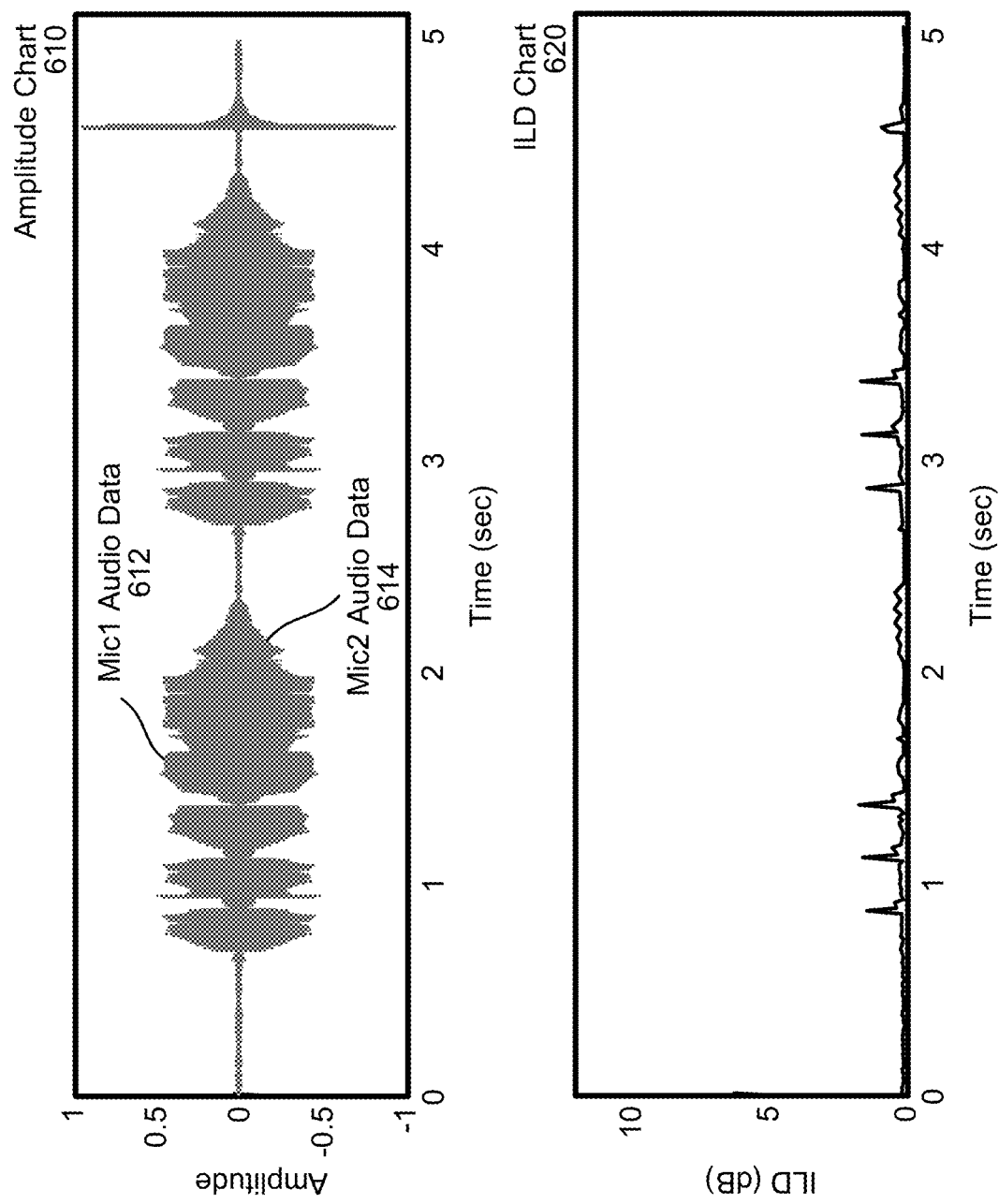

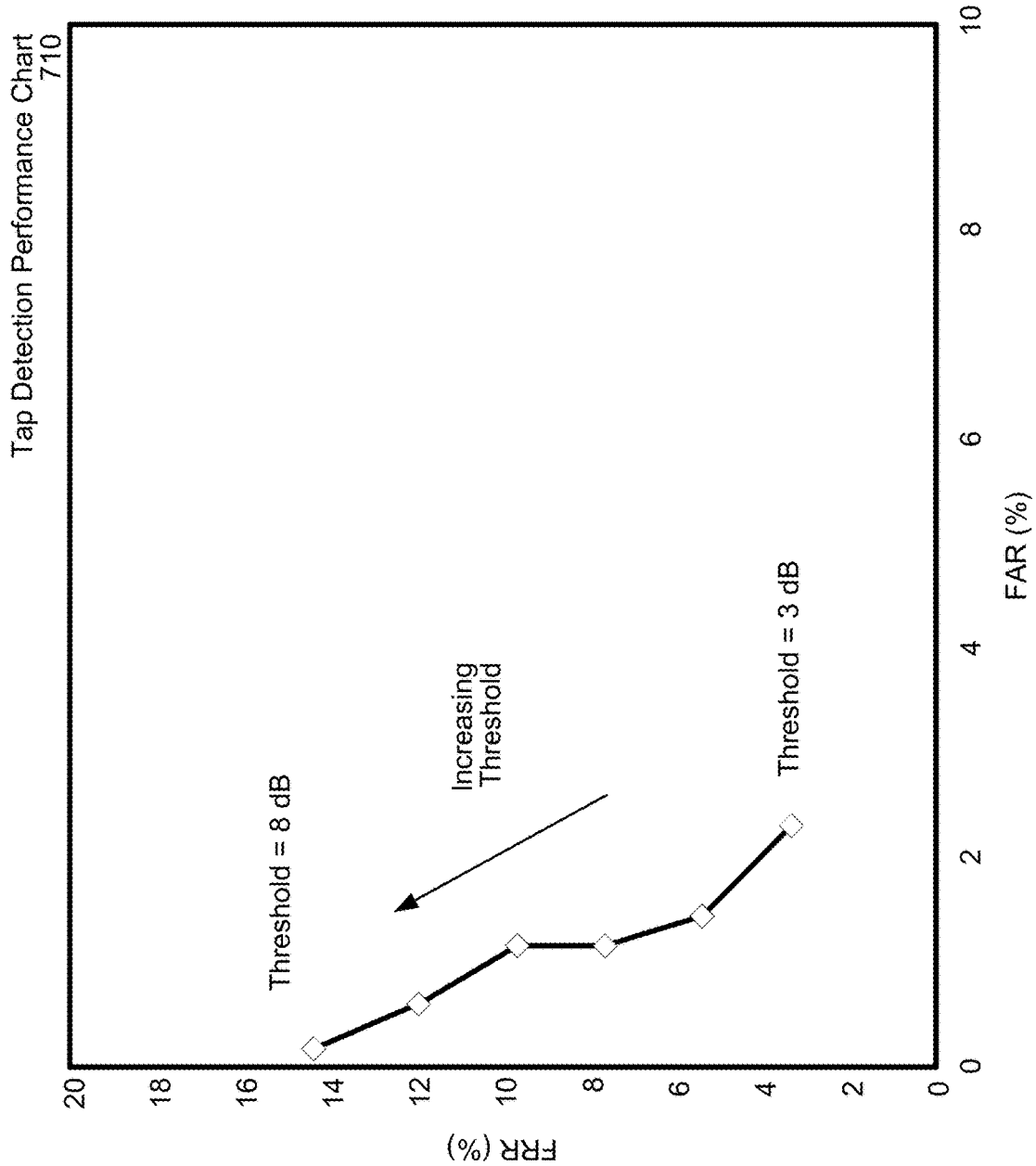

FIG. 9

$$\max\left\{\frac{P_{X1}[n,f]}{P_{X2}[n,f]}, \frac{P_{X2}[n,f]}{P_{X1}[n,f]}\right\} > Threshold$$

Two-Microphone
One Potential Outcome
910

$$\frac{P_{X1}[n,f]}{P_{X2}[n,f]} > Threshold \qquad \frac{P_{X2}[n,f]}{P_{X1}[n,f]} > Threshold$$

Two-Microphone
Two Potential Outcomes
920

$$\frac{\max\{P_{X1}[n,f], P_{X2}[n,f], P_{X3}[n,f], P_{X4}[n,f]\}}{\min\{P_{X1}[n,f], P_{X2}[n,f], P_{X3}[n,f], P_{X4}[n,f]\}} > Threshold$$

Four-Microphone
One Potential Outcome
930

FIG. 16A $$E_i(n) = \frac{1}{N} \sum_{t=n-N+1}^{n} x_i^2(t)$$

Signal Power Calculation
1610

$$\max_i E_i(n) \geq Sig_{thresh} \quad \text{signal present}$$

$$\max_i E_i(n) < Sig_{thresh} \quad \text{no signal}$$

Signal Detection Decision
1620

$$Sig_{thresh} = -50 \text{ dBFS}$$

Signal Threshold
1625

FIG. 16B $$P_i(n) = \frac{1}{N}\sum_{t=n-N+1}^{n} x_{LBP}^2(t)$$

Power Calculation
1630

$$ILD(n) = 10\log_{10}\left(\max_i P_i(n)\right) - 10\log_{10}\left(\min_i P_i(n)\right)$$

Inter-channel Level
Difference (ILD) Calculation
1640

$ILD(n) \geq ILD_{thresh}$    $ild_{flag}(n) = 1$ $ILD(n) < ILD_{thresh}$    $ild_{flag}(n) = 0$ ILD Decision
1645

$ILD_{thresh} = 10$ dB    No Wind Present $ILD_{thresh} = 30$ dB    Wind Present ILD Threshold
1650

FIG. 16C $$\Gamma(n,f) = \frac{\phi_{x_1 x_2}(n,f)}{\sqrt{\phi_{x_1 x_1}(n,f)\phi_{x_2 x_2}(n,f)}}$$

Coherence Calculation
1660

$$\phi_{x_i x_j}(n,f) = \alpha_s \phi_{x_i x_j}(n-1,f) + (1-\alpha_s) X_i(n,f) X_j^*(n,f)$$

Power Spectral Density
(PSD) Calculation
1670

$$\Gamma_L(n) = \sum_{f=0}^{300} |\Gamma(n,f)|$$

Magnitude Coherence
Calculation
1680

$$\Gamma_L(n) \geq Wnd_{thresh} \quad Wnd_{flag}(n) = 0$$

$$\Gamma_L(n) < Wnd_{thresh} \quad Wnd_{flag}(n) = 1$$

Wind Decision
1690

FIG. 20D

Accelerometer Encoding Technique 2080

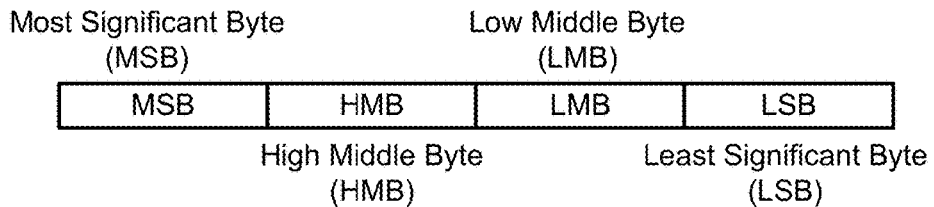

Most Significant Byte (MSB) | High Middle Byte (HMB) | Low Middle Byte (LMB) | Least Significant Byte (LSB)

| Header 2010 | | |
|---|---|---|
| Identifier | Audio | Mic1-Sample0 |
| Version Type | Audio | Mic2-Sample0 |
| Payload | Audio | Mic3-Sample0 |
| Acc Samples | Audio | Mic4-Sample0 |
| X_0 MSB | Audio | Mic1-Sample1 |
| X_0 HMB | Audio | Mic2-Sample1 |
| X_0 LMB | Audio | Mic3-Sample1 |
| X_0 LSB | Audio | Mic4-Sample1 |
| Y_0 MSB | Audio | Mic1-Sample2 |
| Y_0 HMB | Audio | Mic2-Sample2 |
| Y_0 LMB | Audio | Mic3-Sample2 |
| Y_0 LSB | Audio | Mic4-Sample2 |
| Z_0 MSB | Audio | Mic1-Sample3 |
| Z_0 HMB | Audio | Mic2-Sample3 |
| Z_0 LMB | Audio | Mic3-Sample3 |
| Z_0 LSB | Audio | Mic4-Sample3 |

| | | |
|---|---|---|
| X_n-1 MSB | Audio | Mic1-SampleX |
| X_n-1 HMB | Audio | Mic2-SampleX |
| X_n-1 LMB | Audio | Mic3-SampleX |
| X_n-1 LSB | Audio | Mic4-SampleX |
| Y_n-1 MSB | Audio | Mic1-SampleX+1 |
| Y_n-1 HMB | Audio | Mic2-SampleX+1 |
| Y_n-1 LMB | Audio | Mic3-SampleX+1 |
| Y_n-1 LSB | Audio | Mic4-SampleX+1 |
| Z_n-1 MSB | Audio | Mic1-SampleX+2 |
| Z_n-1 HMB | Audio | Mic2-SampleX+2 |
| Z_n-1 LMB | Audio | Mic3-SampleX+2 |
| Z_n-1 LSB | Audio | Mic4-SampleX+2 |
| Checksum MSB | Audio | Mic1-SampleX+3 |
| Checksum LSB | Audio | Mic2-SampleX+3 |
| | Audio | Mic3-SampleX+3 |
| | Audio | Mic4-SampleX+3 |
| | Audio | Mic1-SampleX+3 |

•
•
•

| | | |
|---|---|---|
| | Audio | Mic3-SampleY |
| | Audio | Mic4-SampleY |

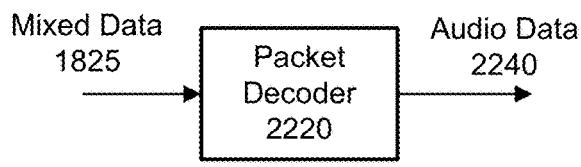
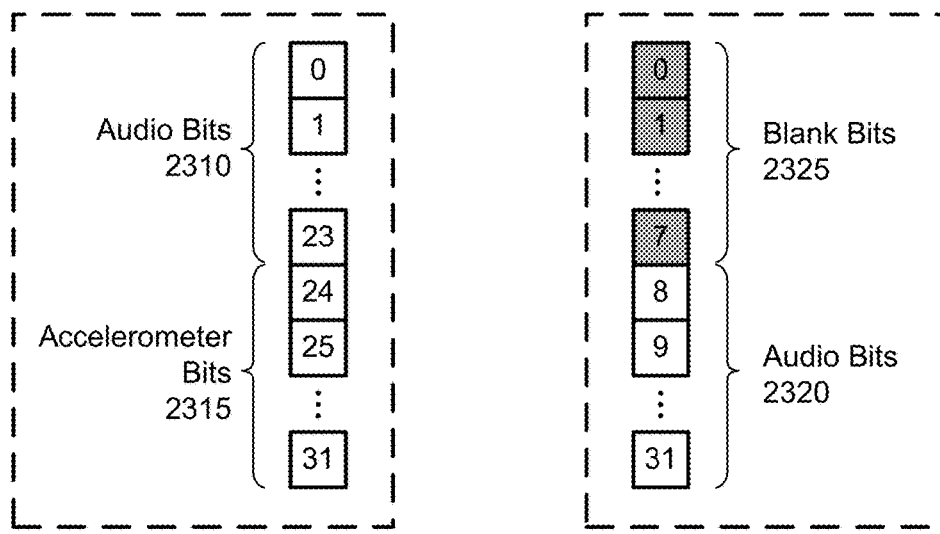
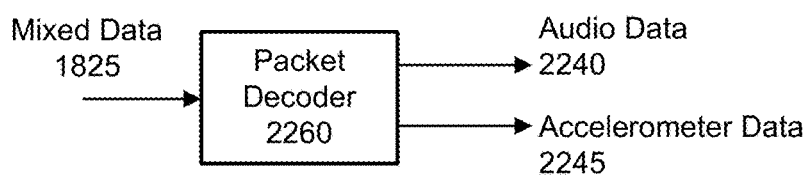
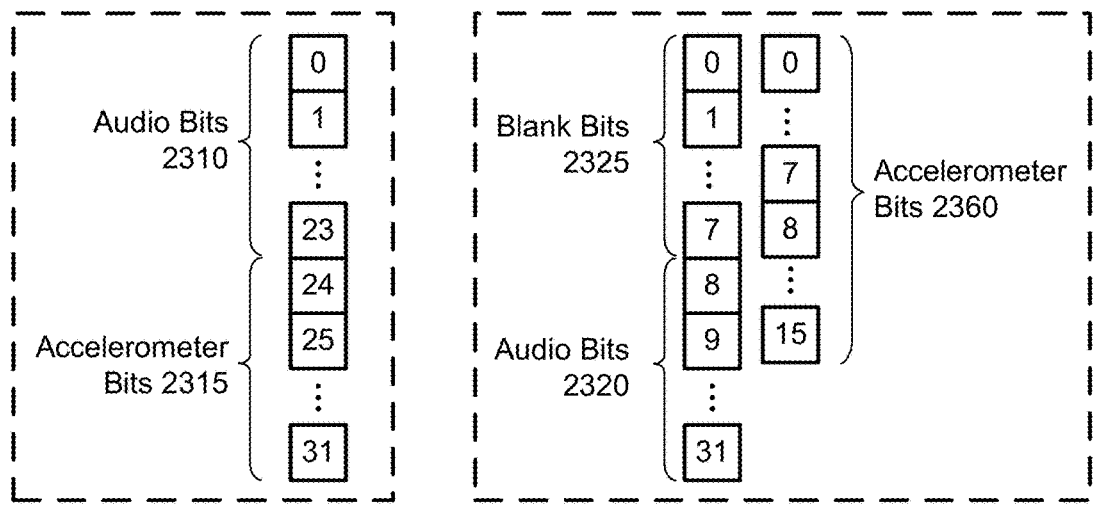
FIG. 23

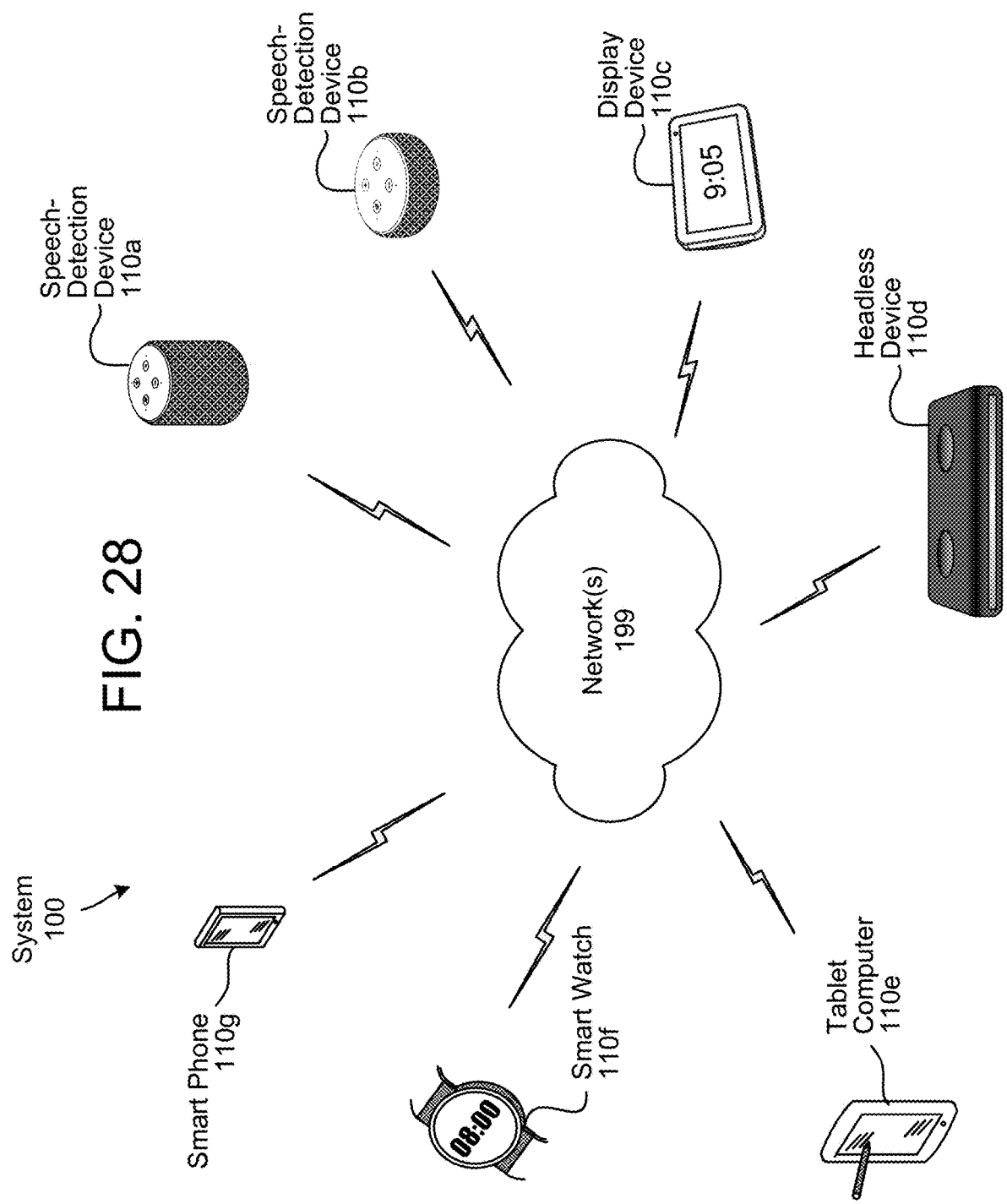

INTER-CHANNEL LEVEL DIFFERENCE BASED ACOUSTIC TAP DETECTION

CROSS-REFERENCE TO RELATED APPLICATION DATA

This application is a continuation-in-part of, and claims the benefit of priority of, U.S. Non-Provisional patent application Ser. No. 16/582,091, filed Sep. 25, 2019 and entitled "Inter-Channel Level Difference Based Acoustic Tap Detection," in the names of Savaskan Bulek et al. The above utility application is herein incorporated by reference in its entirety.

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIGS. 3A-3B illustrate example component diagrams for performing tap detection according to embodiments of the present disclosure.

FIG. 4 illustrates examples of performing tap detection using inter-channel level differences according to embodiments of the present disclosure.

FIG. 5 illustrates an example of inter-channel level differences when a tap is detected according to embodiments of the present disclosure.

FIG. 6 illustrates an example of inter-channel level differences when a tap is not detected according to embodiments of the present disclosure.

FIG. 7 illustrates an example of tap detection performance according to embodiments of the present disclosure.

FIG. 9 illustrates examples of performing tap detection with a varying number of outcomes and/or microphones according to embodiments of the present disclosure.

FIGS. 16A-16C illustrate example calculations used to perform tap detection according to embodiments of the present disclosure.

FIGS. 20A-20D illustrate examples of embedding accelerometer data according to embodiments of the present disclosure.

FIG. 23 illustrates examples of decoding mixed data according to embodiments of the present disclosure.

FIG. 28 illustrates an example of a network of devices according to embodiments of the present disclosure.

DETAILED DESCRIPTION

Figure 2A:
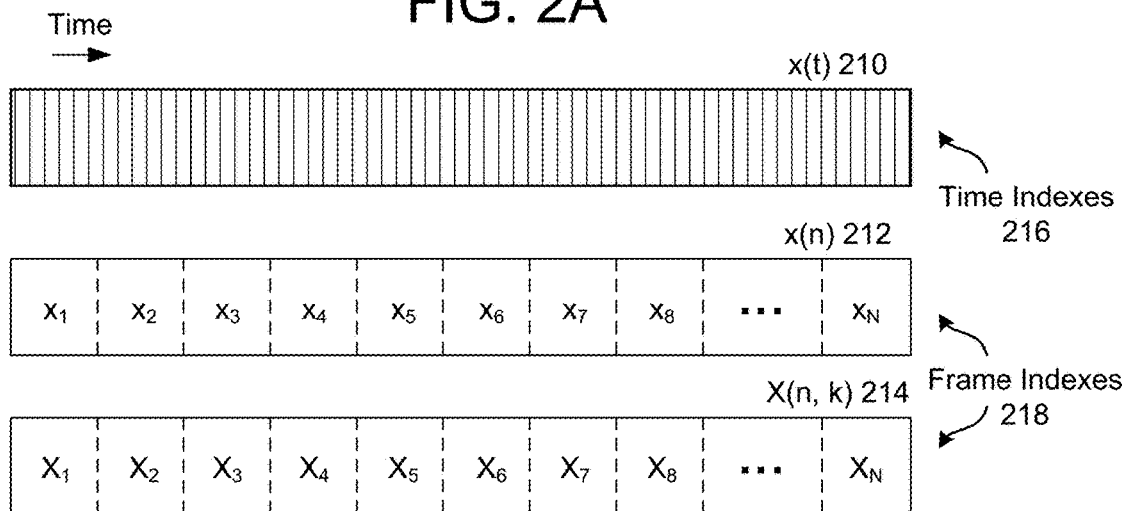
FIGS. 2A-2D illustrate examples of frame indexes, tone indexes, and channel indexes.

Electronic devices may be used to capture and process audio data. The audio data may be used for voice commands and/or may be output by loudspeakers as part of a communication session. In some examples, loudspeakers may generate audio using playback audio data while a microphone generates local audio data. While the device may process the audio data to identify a voice command and perform a corresponding action, processing the voice command may require complex processing and/or a delay while the audio data is sent to a remote system for speech processing.

To improve a user interface, devices, systems and methods are disclosed that detect when a tap event occurs on a surface of a device using microphone audio data. For example, instead of using a physical sensor to detect the tap event, the device may detect a tap event in proximity to a microphone based on a power level difference between two or more microphones. When a power ratio exceeds a threshold, the device may detect a tap event and perform an action. For example, the device may output an alarm and use a detected tap event as an input to delay or end the alarm. To reduce false positives, the device may detect a tap event using motion data generated by a motion sensor. For example, the device may detect a potential tap event using the audio data and may confirm that the potential tap event corresponds to actual movement of the device using the motion data. Additionally or alternatively, the device may process the audio data and the motion data using a trained model to detect a tap event.

FIG. 1 illustrates a high-level conceptual block diagram of a system 100 configured to perform tap detection according to embodiments of the disclosure. Although FIG. 1 and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 199 and may include two or more microphones 112 in a microphone array and/or one or more loudspeaker(s) 114. However, the disclosure is not limited thereto and the device 110 may include additional components without departing from the disclosure. While FIG. 1 illustrates the loudspeaker(s) 114 being internal to the device 110, the disclosure is not limited thereto and the loudspeaker(s) 114 may be external to the device 110 without departing from the disclosure. For example, the loudspeaker(s) 114 may be separate from the device 110 and connected to the device 110 via a wired connection and/or a wireless connection without departing from the disclosure.

The device 110 may be an electronic device configured to send audio data to a remote device (not illustrated) and/or generate output audio. For example, the device 110 may perform speech processing to interpret a voice command from a user 5 that is represented in audio data captured by the microphones 112. In some examples, the device 110 may send the audio data to a remote system to perform speech processing and may receive an indication to perform an action in response to the voice command.

To illustrate an example, the microphones 112 may generate microphone audio data $x_m(t)$ that may include a voice command directed to the remote system, which may be indicated by a keyword (e.g., wakeword). For example, the device 110 may detect that the wakeword is represented in the microphone audio data $x_m(t)$ and may send the microphone audio data $x_m(t)$ to the remote system. The remote system may determine a voice command represented in the microphone audio data $x_m(t)$ and may perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeaker(s) 114, capture audio using microphones 112, or the like), multimedia devices (e.g., play videos using a display, such as a television, computer, tablet or the like), smart home devices (e.g., change temperature controls, turn on/off lights, lock/unlock doors, etc.) or the like.

The device 110 may generate output audio corresponding to an alarm, corresponding to audio data stored on the device 110, and/or corresponding to audio data received from a remote device or the remote system. For example, the device 110 may generate an alarm notification by sending alarm output audio data to the loudspeaker(s) 114. However, the disclosure is not limited thereto and the device 110 may receive playback audio data from a remote device and may generate output audio using the playback audio data.

To improve a user interface, the device 110 may detect when a tap event occurs on a surface of the device 110 using microphone audio data. For example, instead of using a physical sensor to detect the tap event, the device 110 may detect a tap event in proximity to a microphone 112 based on a power level difference between the two or more microphones 112. When a power ratio exceeds a threshold, the device 110 may detect a tap event and perform an action. For example, the device 110 may interpret the tap event as an input and delay or end the alarm, turn a light switch on or off, turn music on or off, and/or the like. In some examples, the device 110 may detect a tap event using a plurality of microphones. Additionally or alternatively, the device 110 may distinguish between multiple tap events based on a location of the tap event. For example, the device 110 may distinguish between a first location associated with a first microphone 112a and a second location associated with a second microphone 112b, enabling the device 110 to perform two separate actions depending on a location of the tap event.

As used herein, performing tap detection may refer to the device 110 applying a tap detection algorithm, detecting a tap event, detecting when a tap event occurs, detecting a physical interaction with the device, and/or the like without departing from the disclosure. For example, the device 110 may apply the tap detection algorithm to monitor for potential tap events and, in response to detecting a tap event, may generate event data indicating that the tap event occurred.

Performing tap detection using only audio data may result in false positives, however. For example, loud noises in proximity to the device 110 (e.g., clapping, snapping, etc.), wind noise (e.g., caused by wind, a nearby fan, etc.), and/or other non-tap events may cause the device 110 to detect a tap event when no physical tap occurred. To reduce these false positives, the device 110 may perform tap detection using a combination of audio data and motion data. For example, the device 110 may perform tap detection using the audio data to identify a potential tap event, then confirm the tap event based on motion data (e.g., accelerometer data) generated by an accelerometer or other motion sensor. Additionally or alternatively, the device 110 may use both the audio data and the motion data to perform tap detection using a trained model (e.g., neural network, convolutional neural network (CNN), deep neural network (DNN), etc.). Thus, the device 110 only detects a tap event corresponding to an actual movement of the device 110.

As illustrated in FIG. 1, the device 110 may receive (130) first audio data corresponding to a first microphone and may receive (132) second audio data corresponding to a second microphone. As part of receiving the first audio data and the second audio data, the device 110 may convert the first audio data from a time domain to a subband domain (e.g., time domain signal corresponding to individual subbands) and may convert the second audio data from the time domain to the subband domain. For example, the device 110 may select a portion of the first audio data that is within a desired frequency range using a bandpass filter or the like. However, the disclosure is not limited thereto, and the device 110 may convert the time domain signal to a frequency domain signal without departing from the disclosure.

Figure 18:
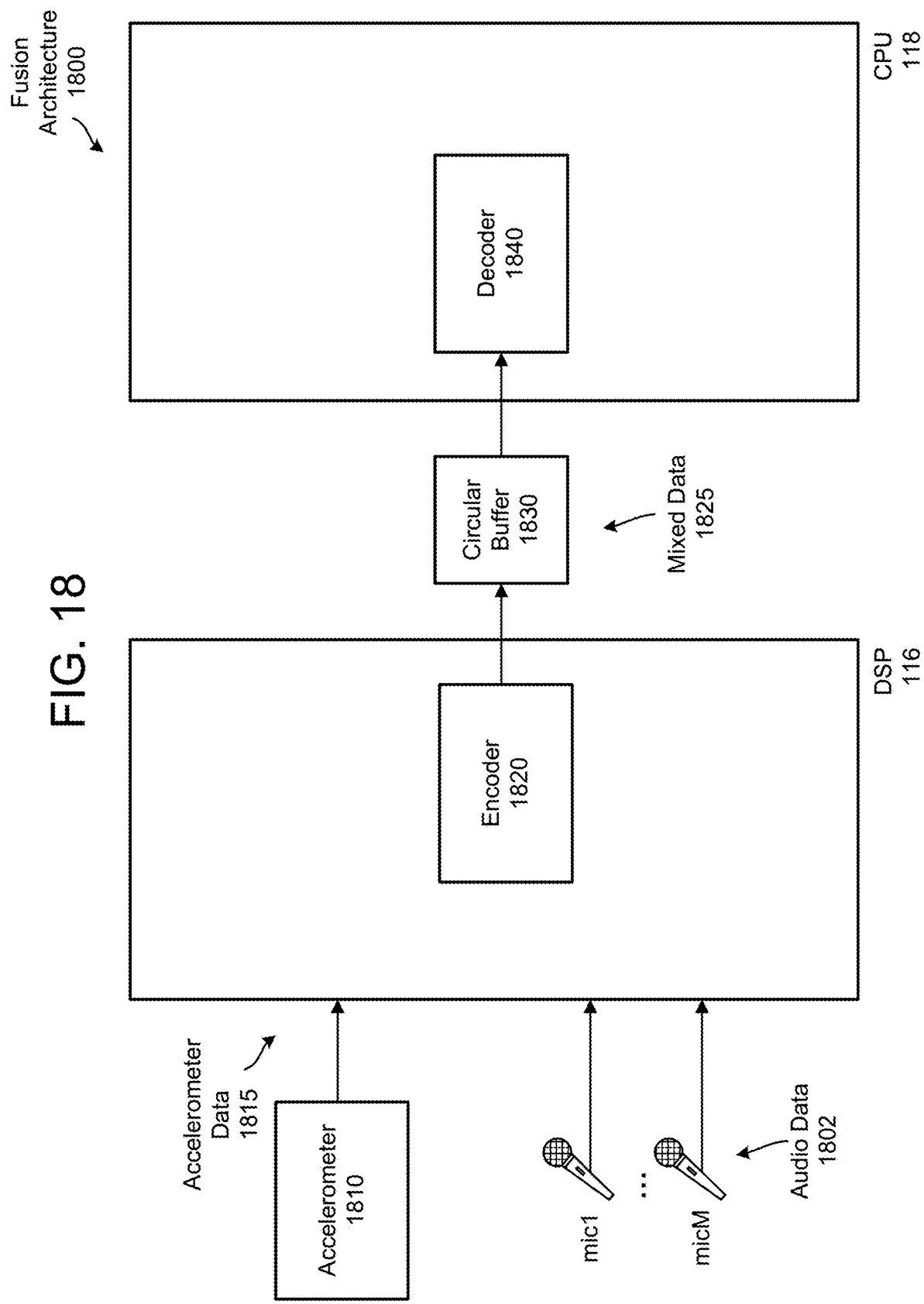
FIG. 18 illustrates an example component diagram for using an accelerometer to reduce false positives while performing tap detection according to embodiments of the present disclosure.

The device 110 may receive (134) motion data corresponding to a motion sensor (e.g., accelerometer data generated by an accelerometer component) and may generate (136) mixed data representing the first audio data, the second audio data, and the motion data. For example, the device 110 may encode the motion data in the mixed data using the techniques described in greater detail below with regard to FIGS. 20A-21. While not illustrated in FIG. 1, the device 110 may generate the mixed data using a first processor (e.g., digital signal processor (DSP) component 116) and may send the mixed data to a second processor (e.g., central processing unit (CPU) component 118), as illustrated in FIGS. 18 and 21. Thus, the second processor may be configured to perform tap detection using the mixed data, as illustrated in FIGS. 24A-26.

The device 110 may compute (138) a first short-term power value associated with the first audio data, may compute (140) a second short-term power value associated with the second audio data, and may determine (142) a power ratio between the first short-term power value and the second short-term power value. For example, the device 110 may divide the first short-term power value by the second short-term power value.

The device 110 may determine (144) that a tap event is detected using the power ratio (e.g., the power ratio satisfies a condition) and the motion data and may perform (146) an action (e.g., snooze an alarm, turn on or off a light switch, etc.) in response to detecting the tap event. Additional details associated with performing tap detection processing will be described below with regard to FIGS. 3-26.

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in the time-domain. However, the disclosure is not limited thereto and the device 110 may convert these signals to the frequency-domain or subband-domain prior to performing additional processing, such as acoustic echo cancellation (AEC), tap detection, and/or the like. For example, the device 110 may convert the time-domain signal to the frequency-domain using a Fast Fourier Transform (FFT) and/or the like. Additionally or alternatively, the device 110 may convert the time-domain signal to the subband-domain by applying a bandpass filter or other filtering to select a portion of the time-domain signal within a desired frequency range.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

As used herein, a frequency band corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Playback audio data $x_r(t)$ (e.g., far-end reference signal) corresponds to audio data that will be output by the loudspeaker(s) 114 to generate playback audio (e.g., echo signal $y(t)$). For example, the device 110 may stream music or output speech associated with a communication session (e.g., audio or video telecommunication). In some examples, the playback audio data may be referred to as far-end reference audio data, loudspeaker audio data, and/or the like without departing from the disclosure. For ease of illustration, the following description will refer to this audio data as playback audio data or reference audio data. As noted above, the playback audio data may be referred to as playback signal(s) $x_r(t)$ without departing from the disclosure.

Microphone audio data $x_m(t)$ corresponds to audio data that is captured by one or more microphone(s) 112 prior to the device 110 performing audio processing such as AEC processing. The microphone audio data $x_m(t)$ may include a tap event (e.g., energy corresponding to tapping on a surface of the device 110), local speech $s(t)$ (e.g., an utterance, such as near-end speech generated by the user 5), an "echo" signal $y(t)$ (e.g., portion of the playback audio $x_r(t)$ captured by the microphone(s) 112), acoustic noise $n(t)$ (e.g., ambient noise in an environment around the device 110), and/or the like. As the microphone audio data is captured by the microphone(s) 112 and captures audio input to the device 110, the microphone audio data may be referred to as input audio data, near-end audio data, and/or the like without departing from the disclosure. For ease of illustration, the following description will refer to this signal as microphone audio data. As noted above, the microphone audio data may be referred to as a microphone signal without departing from the disclosure.

An "echo" signal $y(t)$ corresponds to a portion of the playback audio that reaches the microphone(s) 112 (e.g., portion of audible sound(s) output by the loudspeaker(s) 114 that is recaptured by the microphone(s) 112) and may be referred to as an echo or echo data $y(t)$.

Isolated audio data corresponds to audio data after the device 110 performs audio processing (e.g., AEC processing and/or the like) to remove the echo signal from the microphone signal. For example, the isolated audio data $r(t)$ corresponds to the microphone audio data $x_m(t)$ after subtracting the reference signal(s) (e.g., using AEC component 120) and/or other audio processing known to one of skill in the art. As noted above, the isolated audio data may be referred to as isolated audio signal(s) without departing from the disclosure, and one of skill in the art will recognize that audio data output by the AEC component 120 may also be referred to as an error audio data m(t), error signal m(t) and/or the like.

FIGS. 2A-2D illustrate examples of frame indexes, tone indexes, and channel indexes. As described above, the device 110 may generate microphone audio data xm(t) using microphone(s) 112. For example, a first microphone 112a may generate first microphone audio data xm1(t) in a time domain, a second microphone 112b may generate second microphone audio data xm2(t) in the time domain, and so on. As illustrated in FIG. 2A, a time domain signal may be represented as microphone audio data x(t) 210, which is comprised of a sequence of individual samples of audio data. Thus, x(t) denotes an individual sample that is associated with a time t.

While the microphone audio data x(t) 210 is comprised of a plurality of samples, in some examples the device 110 may group a plurality of samples and process them together. As illustrated in FIG. 2A, the device 110 may group a number of samples together in a frame to generate microphone audio data x(n) 212. As used herein, a variable x(n) corresponds to the time-domain signal and identifies an individual frame (e.g., fixed number of samples s) associated with a frame index n.

Additionally or alternatively, the device 110 may convert microphone audio data x(n) 212 from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data X(n, k) 214 in the frequency domain or the subband domain. As used herein, a variable X(n, k) corresponds to the frequency-domain signal and identifies an individual frame associated with frame index n and tone index k. As illustrated in FIG. 2A, the microphone audio data x(t) 212 corresponds to time indexes 216, whereas the microphone audio data x(n) 212 and the microphone audio data X(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data x(t) 210) and frame indexes 218 (e.g., microphone audio data x(n) 212 in the time domain and microphone audio data X(n, k) 216 in the frequency domain). For example, the system 100 may apply FFT processing to the time-domain microphone audio data x(n) 212, producing the frequency-domain microphone audio data X(n,k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
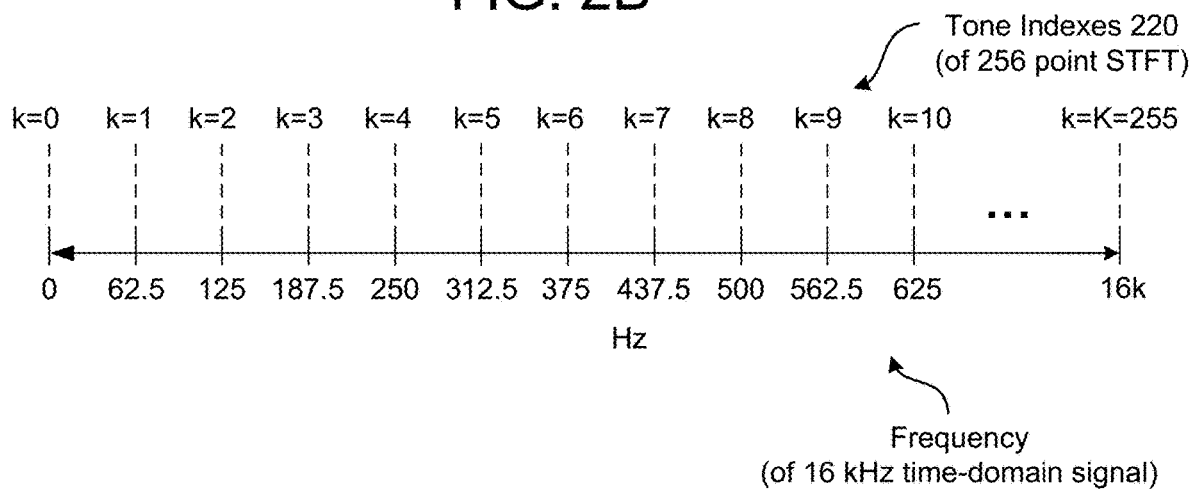

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 72B illustrates the frequency range being divided into 256 different subbands (e.g., tone indexes), the disclosure is not limited thereto and the system 100 may divide the frequency range into K different subbands (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
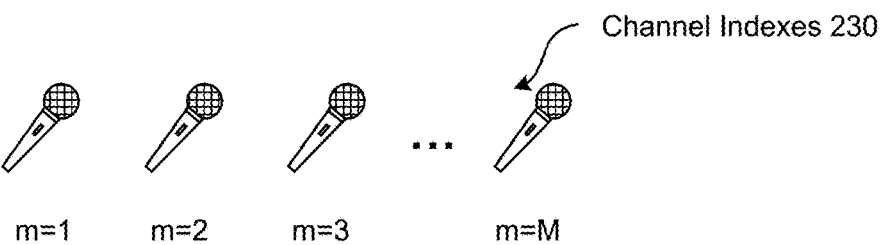

The system 100 may include multiple microphone(s) 112, with a first channel m corresponding to a first microphone 112a, a second channel (m+1) corresponding to a second microphone 112b, and so on until a final channel (MP) that corresponds to microphone 112M. FIG. 2C illustrates channel indexes 230 including a plurality of channels from channel m1 to channel M. While many drawings illustrate two channels (e.g., two microphones 112), the disclosure is not limited thereto and the number of channels may vary. For the purposes of discussion, an example of system 100 includes "M" microphones 112 (M>1) for hands free near-end/far-end distant speech recognition applications.

While FIGS. 2A-2D are described with reference to the microphone audio data $x_m(t)$, the disclosure is not limited thereto and the same techniques apply to the playback audio data $x_r(t)$ without departing from the disclosure. Thus, playback audio data $x_r(t)$ indicates a specific time index t from a series of samples in the time-domain, playback audio data $x_r(n)$ indicates a specific frame index n from series of frames in the time-domain, and playback audio data $X_r(n, k)$ indicates a specific frame index n and frequency index k from a series of frames in the frequency-domain.

Prior to converting the microphone audio data $x_m(n)$ and the playback audio data $x_r(n)$ to the frequency-domain, the device 110 must first perform time-alignment to align the playback audio data $x_r(n)$ with the microphone audio data $x_m(n)$. For example, due to nonlinearities and variable delays associated with sending the playback audio data $x_r(n)$ to the loudspeaker(s) 114 using a wireless connection, the playback audio data $x_r(n)$ is not synchronized with the microphone audio data $x_m(n)$. This lack of synchronization may be due to a propagation delay (e.g., fixed time delay) between the playback audio data $x_r(n)$ and the microphone audio data $x_m(n)$, clock jitter and/or clock skew (e.g., difference in sampling frequencies between the device 110 and the loudspeaker(s) 114), dropped packets (e.g., missing samples), and/or other variable delays.

To perform the time alignment, the device 110 may adjust the playback audio data $x_r(n)$ to match the microphone audio data $x_m(n)$. For example, the device 110 may adjust an offset between the playback audio data $x_r(n)$ and the microphone audio data $x_m(n)$ (e.g., adjust for propagation delay), may add/subtract samples and/or frames from the playback audio data $x_r(n)$ (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data.

While FIG. 2A illustrates the frame indexes 218 as a series of distinct audio frames, the disclosure is not limited thereto. In some examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n−1 previous audio frames) corresponding to the fixed time window. Thus, subsequent power calculations include n overlapping audio frames.

Figure 2D:
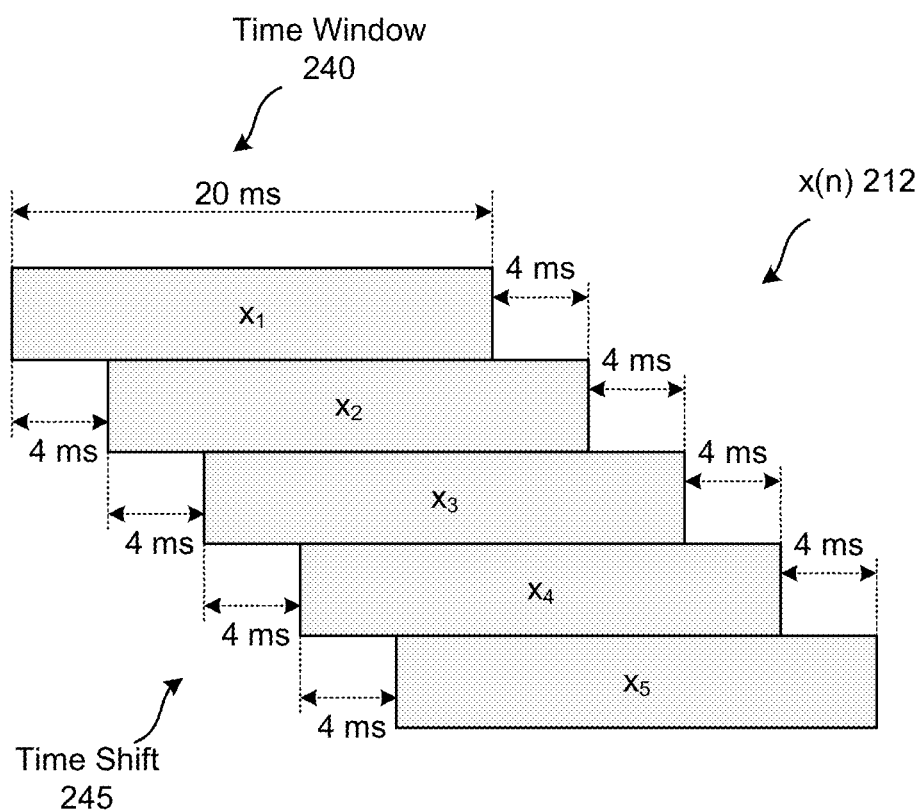

As illustrated in FIG. 2D, overlapping audio frames may be represented as overlapping audio data associated with a time window 240 (e.g., 20 ms) and a time shift 245 (e.g., 4 ms) between neighboring audio frames. For example, a first audio frame $x_1$ may extend from 0 ms to 20 ms, a second audio frame $x_2$ may extend from 4 ms to 24 ms, a third audio frame $x_3$ may extend from 8 ms to 28 ms, and so on. Thus, the audio frames overlap by 80%, although the disclosure is not limited thereto and the time window 240 and the time shift 245 may vary without departing from the disclosure.

FIGS. 3A-3B illustrate example component diagrams for performing tap detection according to embodiments of the present disclosure. As illustrated in FIG. 3A, the device 110 may generate first audio data 302a using a first microphone and generate second audio data 302b using a second microphone. The device 110 may convert the first audio data 302 from a time domain to a frequency domain using a subband analysis component 310 and may determine a short-term power value using a short-term power calculation component 320. For example, a first subband analysis component 310a and a first short-term power calculation component 320a may determine a first power value using the first audio data 302a and a second subband analysis component 310b and a second short-term power calculation component 320b may determine a second power value using the second audio data 302b.

The short-term power calculation component 320 may determine the power values using specific frequency ranges. In some examples, the short-term power calculation component 320 may determine the power value using a first frequency range below a first cutoff frequency value (e.g., 500 Hz) without departing from the disclosure. However, the disclosure is not limited thereto and the short-term power calculation component 320 may determine the power value using any frequency range without departing from the disclosure. For example, the device 110 may detect that wind is present and the short-term power calculation component 320 may determine the power value using a second frequency range above a second cutoff frequency value (e.g., 3 kHz), which minimizes interference caused by the wind.

A power ratio calculation component 330 may receive the first power value and the second power value and may determine a ratio value between the two power values. The power ratio calculation component 330 may output the ratio value to a threshold comparison component 340, which may determine whether the ratio value satisfies a condition. For example, the threshold comparison component 340 may determine whether the ratio value is above a first threshold value and/or below a second threshold value, although the disclosure is not limited thereto.

The threshold comparison component 340 may generate indication data that indicates whether the ratio value satisfies the condition and may output the indication data to a decision logic component 350, which may determine whether a tap event is detected based on the indication data. The decision logic component 350 may generate tap decision data indicating whether a tap event is detected. In some examples, the decision logic component 350 may output the tap decision data to a hangover component 360, which may perform hangover processing to generate tap decision data 370. For example, the hangover component 360 may interpret multiple tap events detected within a short duration of time as a single tap event, such that the device 110 does not detect multiple tap events and perform the same action repeatedly. To illustrate an example, if the tap event corresponds to switching a light switch on or off, the hangover component 360 may cause the device 110 to switch the light switch on instead of switching it on and off repeatedly.

In some examples, the power ratio calculation component 330 may determine a fixed ratio value (e.g., Mic1/Mic2) and the threshold comparison component 340 may compare the ratio value to multiple thresholds and/or a range of ratio values to perform tap detection. For example, the threshold comparison component 340 may determine that the ratio value is below a first threshold value (e.g., 0.5) or above a second threshold value (e.g., 1.5), such that the ratio value is outside of a range of ratio values (e.g., 0.5-1.5), indicating that either the first audio data 302a or the second audio data 302b is associated with a higher power level than the other (e.g., either the first microphone or the second microphone is experiencing a tap event).

In other examples, the power ratio calculation component 330 may determine several fixed ratios (e.g., Mic1/Mic2, Mic2/Mic1, etc.) and then select a highest ratio value. For example, the device 110 may select a first ratio value (e.g., Mic1/Mic2) if the tap is in proximity to the first microphone and may select a second ratio value (e.g., Mic2/Mic1) if the tap is in proximity to the second microphone. This enables the threshold comparison component 340 to compare the output of the power ratio calculation component 330 to a single threshold value to detect a tap event.

In some examples, the power ratio calculation component 330 may determine several fixed ratios (e.g., Mic1/Mic2, Mic2/Mic1, etc.) and output several ratio values to the threshold comparison component 340. For example, the threshold comparison component 340 may compare the first ratio value (e.g., Mic1/Mic2) to a threshold value to determine if a tap is detected in proximity to the first microphone and may compare the second ratio value (e.g., Mic2/Mic1) to the threshold value to determine if a tap is detected in proximity to the second microphone. This enables the device 110 to provide two virtual buttons or perform two separate actions, as the device 110 may differentiate between a tap in proximity to the first microphone (e.g., Mic1/Mic2>Threshold) and a tap in proximity to the second microphone (e.g., Mic2/Mic1>Threshold).

In some examples, the power ratio calculation component 330 may determine a single ratio value using a maximum power value and a minimum power value. For example, the power ratio calculation component 330 may determine that the first audio data 302a corresponds to a maximum power value and that the second audio data 302b corresponds to a minimum power value, such that the power ratio calculation component 330 may determine a first ratio value by dividing the maximum power value by the minimum power value (e.g., Mic1/Mic2). If a tap event occurs in proximity to the second microphone, the power ratio calculation component 330 would then reverse the values and determine a second ratio value (e.g., Mic2/Mic1). This technique is beneficial when the power ratio calculation component 330 receives power values from three or more microphones, as the power ratio calculation component 330 may determine the maximum power value and minimum power value of a plurality of microphones and calculate a single ratio value, instead of determining a series of ratio values and then selecting a maximum ratio value.

As illustrated in FIG. 3B, the device 110 may include any number of microphones without departing from the disclosure. For example, the audio data 302 may correspond to M separate microphones (e.g., mic1, mic2, . . . micM), and the device 110 may include a subband analysis component 310 and a short-term power calculation component 320 for each of the microphones without departing from the disclosure. Using more than two microphones may enable the device 110 to perform additional functionality, as described in greater detail below with regard to FIGS. 9 and 17.

FIG. 4 illustrates examples of performing tap detection using inter-channel level differences according to embodiments of the present disclosure. As illustrated in FIG. 4, no tap detected 410 corresponds to first power spectral densities 412 that are approximately equal, as they both correspond to far-field sound sources that have similar levels between the two microphones. For example, $P_{E1}[n, f]$ and $P_{E2}[n, f]$ both correspond to the same far-field sound sources (e.g., acoustic echo, background noise, people talking, ambient sound events, etc.) and have similar values, resulting in a first power ratio 414 that is approximately equal to a value of one. Thus, as the inter-channel level difference (ILD) is approximately equal to a value of zero when no tap detected 410, the power spectral densities generated by each microphone are equal and cancel each other out.

In contrast, tap detected 420 corresponds to second power spectral densities 422, which are not equal between the microphones. While both power spectral densities include a power component corresponding to the far-field sound sources that are approximately equal (e.g., $P_{E1}[n, f] \approx P_{E2}[n, f]$), they also include a power component associated with a near-field sound source (e.g., tap sound signal or target event). As illustrated in FIG. 4, the near-field sound source is represented as $P_S[n, f]$ and is much larger than the far-field power values (e.g., $P_S[n, f] \gg P_{E1}[n, f]$). For example, a second power ratio 424 corresponds to a ratio between the first power spectral density and the second power spectral density, which can be approximated as a ratio between a first acoustic impulse response (AIR) associated with the first microphone (e.g., $|A_1[f]|^2$) and a second acoustic impulse response (AIR) associated with the second microphone (e.g., $|A_2[f]|^2$). Thus, as the inter-channel level difference (ILD) is greater than zero when tap detected 420, the power spectral densities can be simplified as a ratio between the AIR values (e.g., $|A_1[f]|^2/|A_1[f]|^2$), which results in a value greater than 1. Additional details about calculating the power spectral densities and the power ratio are described below.

In a free-field that is in the absence of reflections and reverberation, the solution to the wave equation that governs the propagation of sound in air is given by the spherical wave model. For example, the i-th microphone signal $x_i(\tilde{t})$ due to a point source signal $s(\tilde{t})$ is modeled as:

$$x_i(\tilde{t}) = \frac{1}{\sqrt{4\pi} \, r_i} s\left(\tilde{t} - \frac{r_i}{c}\right) \quad [1]$$

with $\tilde{t}$ denoting the continuous time, $r_i$ denoting the distance between the source and the i-th microphone, and c denoting the speed of sound. The i-th microphone signal $x_i(\tilde{t})$ can be expressed by linear convolution of the point source signal and an acoustic impulse response (AIR) representing the propagation of the sound from the source to the microphone:

$$x_i(\tilde{t}) = a_i(\tilde{t}) * s(\tilde{t}), \quad [2]$$

where the AIR is given by:

$$a_i(\tilde{t}) = \frac{1}{\sqrt{4\pi} \, r_i} \delta\left(\tilde{t} - \frac{r_i}{c}\right), \quad [3]$$

with $\delta$ being the delta function.

In a near-field case, the source to microphone distances $r_i$ are comparable to the inter-microphone distance d. The attenuation factors $1/(\sqrt{4\pi} r_i)$ are distinct for different $r_i$, which results in different power levels in different microphones. Thus, a tap event corresponds to a tap sound and is considered a near-field source as taps near the mics satisfy $r_i \leq 5$ cm for d=2.6 cm mic spacing. Therefore, it is expected that a first microphone closer to the tap location always receives a more powerful signal than a second microphone that is farther from the tap location. While an acoustic echo may be present and is also a near-field source, the acoustic echo may be ignored when the microphones are positioned symmetrically relative to a location of the loudspeaker(s), as both microphones will have equal power levels as a result of the acoustic echo.

In a far-field case, however, source to microphone distances $r_i$ are large compared to the inter-microphone distance d. The attenuation factors $1/(\sqrt{4\pi} r_i)$ then become approximately equal, and lead to equal power levels in different microphones. Far-field sound sources may correspond to people talking in a room, footsteps, door opening/shutting, etc., and are considered as far-field events.

The tap sound signal (target event) may be denoted as s [t], and interference signal (e.g. acoustic echo, background noise, etc.) may be denoted as e [t], with t denoting the discrete time index. When a tap event is present, the microphone signal contains both s [t] and e [t]. When there is no tap event, the microphone signal contains e [t] only. Thus, the device 110 may detect whether tap is present or not using only the microphone signals using a hypothesis test between two competing hypotheses, $H_o$ (e.g., "no tap") and $H_1$ (e.g., "tap present"):

$$H_0: \begin{matrix} x_1[t] = e_1[t] \\ x_2[t] = e_2[t] \end{matrix} \text{ no tap} \qquad [4]$$

$$H_1: \begin{matrix} x_1[t] = a_1[t]*s[t] + e_1[t] \\ x_2[t] = a_2[t]*s[t] + e_2[t] \end{matrix} \text{ tap present} \qquad [5]$$

where $a_i[t]$ is the AIR between the i-th microphone and the target source (tap sound).

The basic principle behind using the ILD is that sound sources that are in the near field of the microphone array, where the distances between the source and the microphones are small, have different power levels detected by different microphones, while levels associated with sound sources in the far-field of the microphone array are almost identical. This can be explained by representing the signals in the short-term Fourier Transform (STFT) domain:

$$H_0: \begin{matrix} X_1[n,f] = E_1[n,f] \\ X_2[n,f] = E_2[n,f] \end{matrix} \text{ no tap} \qquad [6]$$

$$H_1: \begin{matrix} X_1[n,f] = A_1[f]S[n,f] + E_1[n,f] \\ X_2[n,f] = A_2[f]S[n,f] + E_2[n,f] \end{matrix} \text{ tap present} \qquad [7]$$

where $X_i[n, f]$, $S[n, f]$, $E [n, f]$ denote STFT of the microphone signal, tap sound, and interference, respectively. Here, n denotes a frame index, f denotes a frequency index, and $A_i[f]=1/\sqrt{4\pi}r_i\exp(-j2\pi fr_i/c)$ denotes the discrete Fourier Transform (DFT) of $a_i[t]$ and may be referred to as an acoustic transfer function.

If the tap sound and interference are statistically uncorrelated, then the power spectral density (PSD) functions of the signals can be written:

$$H_0: \begin{matrix} P_{X1}[n,f] = P_{E1}[n,f] \\ P_{X2}[n,f] = P_{E2}[n,f] \end{matrix} \text{ no tap} \qquad [8]$$

$$H_1: \begin{matrix} P_{X1}[n,f] = |A_1[f]|^2 P_S[n,f] + P_{E1}[n,f] \\ P_{X2}[n,f] = |A_2[f]|^2 P_S[n,f] + P_{E2}[n,f] \end{matrix} \text{ tap present} \qquad [9]$$

where P denotes the power of the signal. A ratio value of the microphone PSDs is referred to as an inter-channel level difference (ILD), and has the following form:

$$H_0: \frac{P_{X1}[n,f]}{P_{X2}[n,f]} = \frac{P_{E1}[n,f]}{P_{E2}[n,f]} \approx 1 \text{ no tap} \qquad [10]$$

$$H_1: \frac{P_{X1}[n,f]}{P_{X2}[n,f]} = \frac{|A_1[f]|^2 P_S[n,f] + P_{E1}[n,f]}{|A_2[f]|^2 P_S[n,f] + P_{E2}[n,f]} \approx \frac{|A_1[f]|^2}{|A_2[f]|^2} \text{ tap present} \qquad [11]$$

When no tap event is present, far-field interference (e.g., background noise, people talking, door open/close, etc.) and near-field interference (e.g., acoustic echo) is approximately equal (e.g., $P_{E1} \approx P_{E2}$), such that the ILD is approximately 1.

When a tap event is present, the tap event is much larger than the far-field interference (e.g., $P_S[n, f] \gg P_E[n, f]$), so the ILD is approximately equal to $|A_1[f]|^2/|A_2[f]|^2 = r_2^2/r_1^2$. Because of this, it is expected that the first microphone closer to the tap location always receives a more powerful signal than the second microphone farther from the tap location. In some examples, the device 110 may determine a maximum value of the mic power ratios (e.g., $$\max\left(\frac{P_{X1}[n,f]}{P_{X2}[n,f]}, \frac{P_{X2}[n,f]}{P_{X1}[n,f]}\right)$$

to ensure that the ILD has a value greater than 1 for $H_1$, although the disclosure is not limited thereto.

FIG. 5 illustrates an example of inter-channel level differences when a tap is detected according to embodiments of the present disclosure. As illustrated in FIG. 5, an amplitude chart 510 illustrates first microphone (Mic1) audio data 512 and second microphone (Mic2) audio data 514, while an inter-channel level difference (ILD) chart 520 illustrates the ILD values determined based on the amplitude chart 510. For example, a first tap event occurs around 0.7 seconds, which is represented by the first microphone audio data 512 being much larger than the second microphone audio data 514 and the ILD chart 520 jumping up to 10 dB. Similarly, a second tap event occurs around 2.7 seconds, which is also represented by the first microphone audio data 512 being much larger than the second microphone audio data 514 and the ILD chart 520 jumping up to 10 dB. Apart from the two tap events, the first microphone audio data 512 is roughly equal to the second microphone audio data 514 and therefore indistinguishable in the amplitude chart 510.

FIG. 6 illustrates an example of inter-channel level differences when a tap is not detected according to embodiments of the present disclosure. As illustrated in FIG. 6, an amplitude chart 610 illustrates first microphone (Mic1) audio data 612 and second microphone (Mic2) audio data 614, while an inter-channel level difference (ILD) chart 620 illustrates the ILD values determined based on the amplitude chart 610. In contrast to the amplitude chart 510 illustrated in FIG. 5, the amplitude chart 610 does not illustrate a tap event and the first microphone audio data 612 and the second microphone audio data 614 are indistinguishable from each other and approximately equal. Thus, the ILD chart 620 only includes small variations (e.g., less than 2 dB) and does not include a spike corresponding to a tap event.

As illustrated in FIGS. 5-6, the device 110 may detect a tap event when a magnitude of the ILD exceeds a threshold value. For example, the 10 dB spikes illustrated in the ILD chart 520 would exceed a threshold value (e.g., 5 dB), whereas the variations (e.g., less than 2B) in the ILD chart 620 do not exceed the threshold value. Thus, the device 110 may control a sensitivity of tap detection by varying the threshold value used to detect a tap event.

FIG. 7 illustrates an example of tap detection performance according to embodiments of the present disclosure. As illustrated in FIG. 7, a tap detection performance chart 710 represents a performance of tap detection based on a threshold value selected. For example, the horizontal axis corresponds to a False Alarm Rate (FAR), while the vertical axis corresponds to a False Rejection Rate (FRR), and both the FAR and the FRR are represented as a percentage of total samples.

False rejection (FR) is defined as "out of N taps on top of the device (target events), D were detected." This results in FRR (%):

$$FRR = \frac{N - D}{N} \times 100 \quad [12]$$

False alarm (FA) is defined as "out of N taps on the table (non-target events), D were detected." This results in FAR (%):

$$FAR = \frac{D}{N} \times 100 \quad [13]$$

To illustrate examples generated during testing, a threshold of 3 dB corresponded to a FAR exceeding 2% (e.g., $FAR_3 \approx 2.3\%$) and a FRR below 4% (e.g., $FRR_3 \approx 3.7\%$), a threshold of 4 dB corresponded to a FAR below 2% (e.g., $FAR_4 \approx 1.5\%$) and a FRR above 5% (e.g., $FRR_4 \approx 5.5\%$), a threshold of 5 dB corresponded to a FAR close to 1% (e.g., $FAR_5 \approx 1.2\%$) and a FRR just below 8% (e.g., $FRR_5 \approx 7.8\%$), a threshold of 6 dB corresponded to a FAR close to 1% (e.g., $FAR_6 \approx 1.2\%$) and a FRR just below 10% (e.g., $FRR_6 \approx 9.8\%$), a threshold of 7 dB corresponded to a FAR below 1% (e.g., $FAR_7 \approx 0.6\%$) and a FRR around 12% (e.g., $FRR_7 \approx 12.0\%$), and a threshold of 8 dB corresponded to a FAR close to 0% (e.g., $FAR_8 \approx 0.2\%$) and a FRR above 14% (e.g., $FRR_8 \approx 14.4\%$).

Thus, increasing the threshold value reduces the false alarm rate (e.g., false positives, in which a tap event is detected by mistake), but increases the false rejection rate (e.g., false negatives, in which a valid tap event is not detected). Using the example illustrated in FIG. 7, a threshold value of 5 dB provides a compromise between the FAR and the FRR, resulting in a low percentage of false positives or false negatives, but the disclosure is not limited thereto and the threshold value may vary without departing from the disclosure. For example, the device 110 may modify the threshold value dynamically based on situation, selecting a higher threshold value when it is important to avoid false positives (e.g., snoozing an alarm) and selecting a lower threshold value at other times to reduce false negatives (e.g., receiving tap input to turn on a light switch).

Figure 8A:
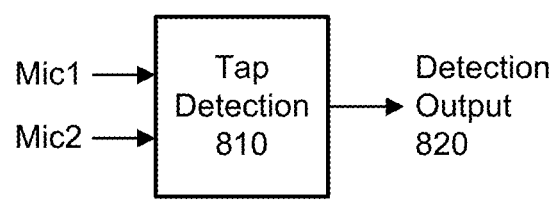
FIGS. 8A-8B illustrate examples of performing tap detection on raw microphone audio data and processed microphone audio data output by an echo canceller according to embodiments of the present disclosure.
Figure 8B:
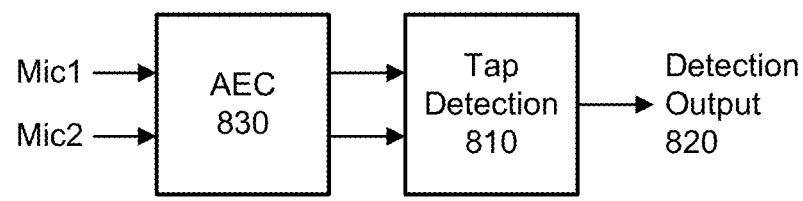

FIGS. 8A-8B illustrate examples of performing tap detection on raw microphone audio data and processed microphone audio data output by an echo canceller according to embodiments of the present disclosure. In some examples, the device 110 may perform acoustic echo cancellation (AEC) prior to determining the power ratio. Thus, the device 110 may calculate the power spectral densities using AEC output signals instead of raw microphone signals without departing from the disclosure.

As illustrated in FIG. 8A, the device 110 may input raw microphone signals (e.g., Mic1 and Mic2) to a tap detection component 810 to determine detection output data 820. The device 110 may perform tap detection using the raw microphone signals when the microphones are positioned symmetrically relative to loudspeaker(s) of the device 110, which causes both an echo signal detected by both microphone signals to be equal.

Additionally or alternatively, FIG. 8B illustrates that the device 110 may input the raw microphone signals to an acoustic echo cancellation (AEC) component 830 to perform acoustic echo cancellation to generate isolated microphone signals and the isolated microphone signals may be input to the tap detection component 810 to determine the detection output data 820 without departing from the disclosure. While not illustrated in FIG. 8B, the device 110 may also perform residual echo suppression (RES) processing to generate the isolated microphone signals without departing from the disclosure, although the disclosure is not limited thereto. The device 110 may perform tap detection using the isolated microphone signals to improve performance of the tap detection component 810, when the microphones are not positioned symmetrically relative to the loudspeaker(s) of the device 110, and/or for other reasons.

The device 110 may perform AEC to remove an echo signal captured by the microphones. For example, the device 110 may receive playback audio data $x_r(t)$ and may generate playback audio (e.g., echo signal $y(t)$) using the loudspeaker(s) 114. The playback audio data $x_r(t)$ may be referred to as playback audio data, a playback signal, a far-end reference signal, far-end reference audio data, and/or the like. The one or more microphone(s) 112 in the microphone array may capture microphone audio data $x_m(t)$, which may be referred to as microphone audio data, a microphone signal, a near-end reference signal, near-end audio data, input audio data, and/or the like, which may include the echo signal $y(t)$ along with other audible sounds.

In audio systems, AEC processing refers to techniques that are used to recognize when a device has recaptured sound via microphone(s) after some delay that the device previously output via loudspeaker(s). The device may perform AEC processing by subtracting a delayed version of the original audio signal (e.g., playback audio data $x_r(t)$) from the captured audio (e.g., microphone audio data $x_m(t)$), producing a version of the captured audio that ideally eliminates the "echo" of the original audio signal, leaving only new audio information. For example, if someone were singing karaoke into a microphone while prerecorded music is output by a loudspeaker, AEC processing can be used to remove any of the recorded music from the audio captured by the microphone, allowing the singer's voice to be amplified and output without also reproducing a delayed "echo" of the original music. As another example, a media player that accepts voice commands via a microphone can use AEC processing to remove reproduced sounds corresponding to output media that are captured by the microphone, making it easier to process input voice commands.

To perform echo cancellation, the device 110 may include a reference generator (not illustrated) that is configured to generate reference audio data $y_r(t)$ that corresponds to the echo signal $y(t)$. In some examples, the reference generator may generate the reference audio data $y_r(t)$ based on the playback audio data $x_r(t)$. However, the disclosure is not limited thereto and in other examples, the reference generator 130 may generate the reference audio data $y_r(t)$ based on the microphone audio data $x_m(t)$ without departing from the disclosure. The AEC component 830 may subtract the reference audio data $y_r(t)$ from the microphone audio data $x_m(t)$ to generate the isolated microphone signal (e.g., error signal $m(t)$).

While FIG. 8 illustrates the AEC component 830 as performing echo cancellation, this is intended for ease of illustration and the disclosure is not limited thereto. Instead, the AEC component 120 may perform acoustic echo cancellation (AEC), adaptive noise cancellation (ANC), acoustic interference cancellation (AIC), and/or the like without departing from the disclosure.

In some examples, echo cancellation can introduce level differences that interfere with tap event detection as the ILD values exceed a threshold. To reduce false positives caused by echo cancellation, the device 110 may skip AEC processing and/or use low frequencies (e.g., up to 120 Hz or 200 Hz) without departing from the disclosure.

FIG. 9 illustrates examples of performing tap detection with a varying number of outcomes and/or microphones according to embodiments of the present disclosure. FIG. 9 illustrates examples of performing tap detection with two-microphone one potential outcome 910, two-microphone two potential outcomes 920, and four-microphone one potential outcome 930, although the disclosure is not limited thereto and the number of microphones may vary without departing from the disclosure.

In some examples, the device 110 may perform tap detection by determining a fixed ratio value (e.g., Mic1/Mic2) and comparing the ratio value to multiple thresholds and/or a range of ratio values to perform tap detection. For example, the device 110 may determine that the ratio value is below a first threshold value (e.g., 0.5) or above a second threshold value (e.g., 1.5), such that the ratio value is outside of a range of ratio values (e.g., 0.5-1.5), indicating that either the first microphone or the second microphone is associated with a higher power level than the other (e.g., either the first microphone or the second microphone is experiencing a tap event).

In other examples, the device 110 may perform tap detection by determining several fixed ratios (e.g., Mic1/Mic2, Mic2/Mic1, etc.) and then selecting a highest ratio value. For example, the device 110 may select a first ratio value (e.g., Mic1/Mic2) if the tap is in proximity to the first microphone and may select a second ratio value (e.g., Mic2/Mic1) if the tap is in proximity to the second microphone. This enables the device 110 to compare the highest ratio value to a single threshold value in order to detect a tap event, and is illustrated in FIG. 9 as the two-microphone one potential outcome 910 (e.g., $$\max\left\{\frac{P_{X1}[n, f]}{P_{X2}[n, f]}, \frac{P_{X2}[n, f]}{P_{X1}[n, f]}\right\} > \text{Threshold}\right).$$

>Threshold).

In some examples, the device 110 may perform tap detection by determining several fixed ratios (e.g., Mic1/Mic2, Mic2/Mic1, etc.) and comparing each of the ratio values to a threshold value. For example, the device 110 may compare the first ratio value (e.g., Mic1/Mic2) to a threshold value to determine if a tap is detected in proximity to the first microphone and may compare the second ratio value (e.g., Mic2/Mic1) to the threshold value to determine if a tap is detected in proximity to the second microphone. This enables the device 110 to provide two virtual buttons or perform two separate actions, as the device 110 may differentiate between a tap in proximity to the first microphone (e.g., Mic1/Mic2>Threshold) and a tap in proximity to the second microphone (e.g., Mic2/Mic1>Threshold). This is illustrated in FIG. 9 as the two-microphone two potential outcomes 920 (e.g., $$\frac{P_{X1}[n, f]}{P_{X2}[n, f]} > \text{Threshold}; \frac{P_{X2}[n, f]}{P_{X1}[n, f]} > \text{Threshold}\right).$$

In some examples, the device 110 may perform tap detection by determining a single ratio value using a maximum power value and a minimum power value. For example, the device 110 may determine that first audio data corresponds to a maximum power value and that second audio data corresponds to a minimum power value, resulting in a first ratio value that divides the maximum power value by the minimum power value (e.g., Mic1/Mic2). If a tap event occurs in proximity to the second microphone, the device 110 would then reverse the values and determine a second ratio value (e.g., Mic2/Mic1). This technique is beneficial when the device 110 receives power values from three or more microphones, as the device 110 may determine the maximum power value and minimum power value of a plurality of microphones and calculate a single ratio value, instead of determining a series of ratio values and then selecting a maximum ratio value. This is illustrated in FIG. 9 as four-microphone one potential outcome 930 (e.g., $$\frac{\max\{P_{X1}[n, f], P_{X2}[n, f], P_{X3}[n, f], P_{X4}[n, f]\}}{\min\{P_{X1}[n, f], P_{X2}[n, f], P_{X3}[n, f], P_{X4}[n, f]\}} > \text{Threshold}\right).$$

However, this is intended to conceptually illustrate an example and the disclosure is not limited thereto. Instead, the device 110 may include any number of microphones without departing from the disclosure.

Figure 10:
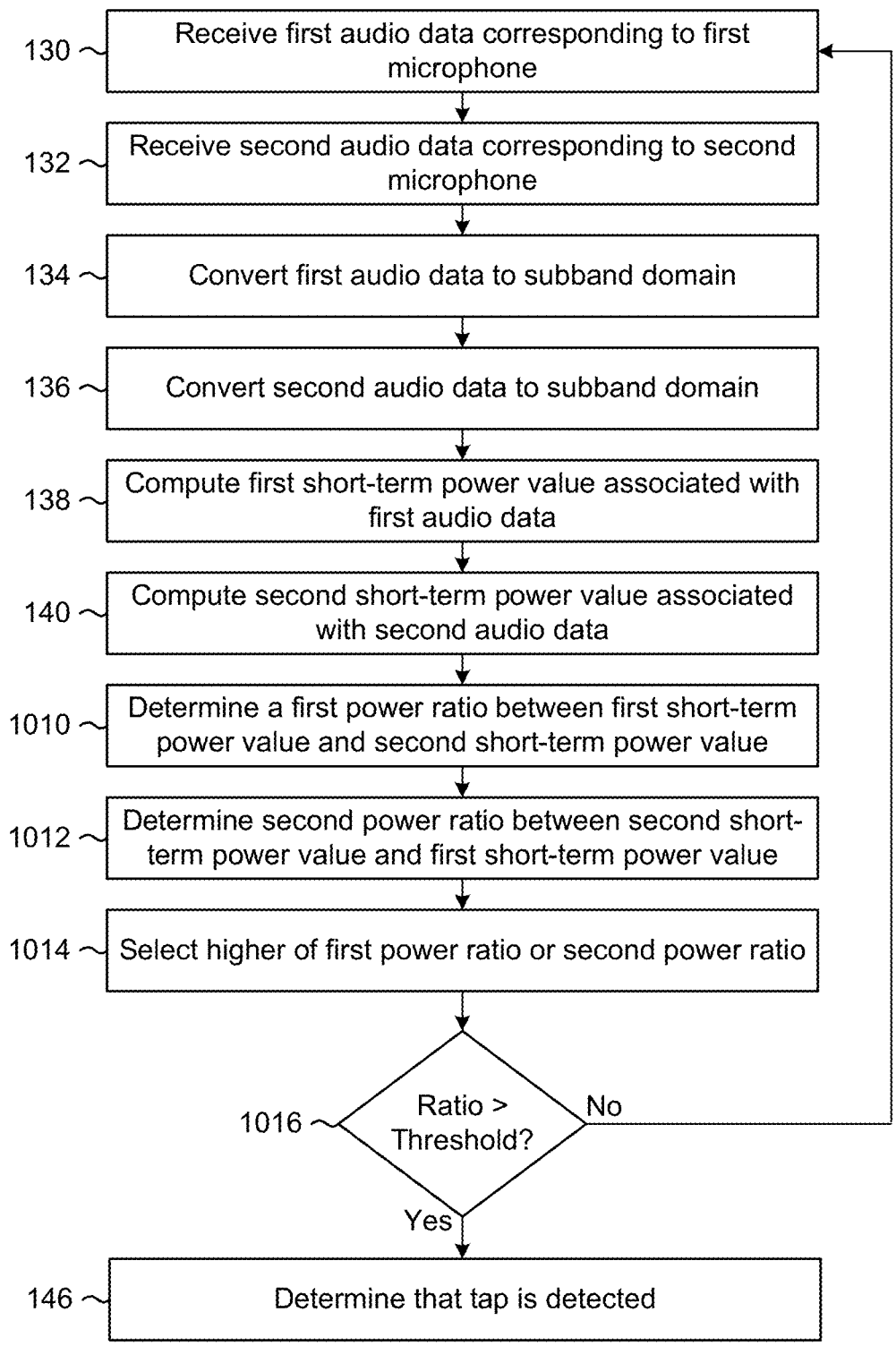
FIG. 10 is a flowchart conceptually illustrating an example method for performing tap detection according to embodiments of the present disclosure.

FIG. 10 is a flowchart conceptually illustrating an example method for performing tap detection according to embodiments of the present disclosure. As illustrated in FIG. 10, the device 110 may receive (130) first audio data corresponding to a first microphone, may receive (132) second audio data corresponding to a second microphone, may convert (134) the first audio data from a time domain to a subband domain, and may convert (136) the second audio data from the time domain to the subband domain.

The device 110 may compute (138) a first short-term power value associated with the first audio data, may compute (140) a second short-term power value associated with the second audio data, may determine (1010) a first power ratio between the first short-term power value and the second short-term power value, may determine (1012) a second power ratio between the second short-term power value and the first short-term power value, may select (1014) the higher of the first power ratio or the second power ratio, and may determine (1016) whether the selected ratio exceeds a threshold value. If the selected ratio does not exceed the threshold value, the device 110 may loop to step 130 and repeat steps 130-1016. If the selected ratio does exceed the threshold value, the device 110 may determine (146) that the tap event is detected and perform an action (e.g., snooze an alarm, turn on or off a light switch, etc.).

Figure 11:
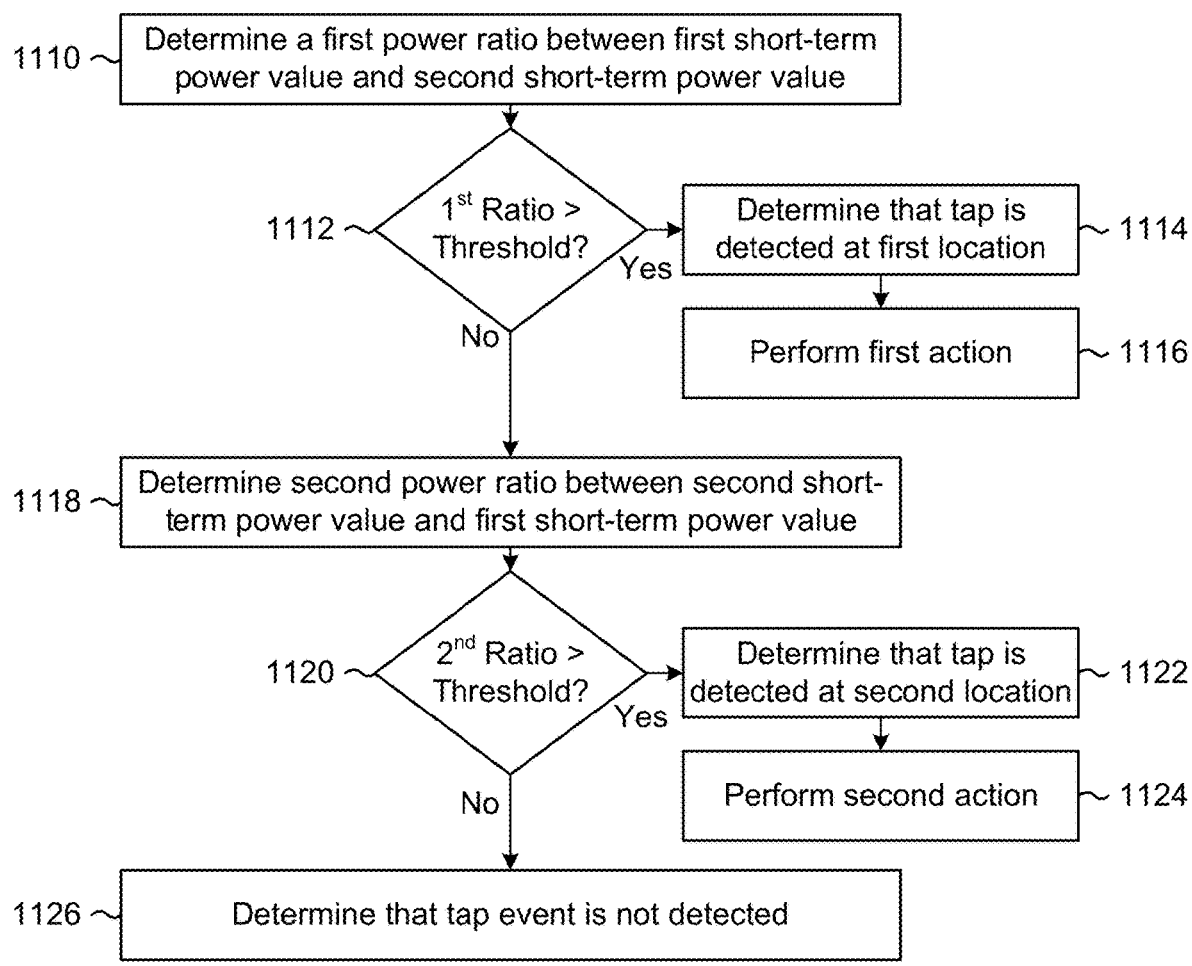
FIG. 11 is a flowchart conceptually illustrating an example method for performing tap detection to distinguish between two actions according to embodiments of the present disclosure.

FIG. 11 is a flowchart conceptually illustrating an example method for performing tap detection to distinguish between two actions according to embodiments of the present disclosure. As illustrated in FIG. 11, the device 110 may determine (1110) a first power ratio between a first short-term power value and a second short-term power value and may determine (1112) whether the first power ratio exceeds a threshold value. If the device 110 determines that the first power ratio exceeds the threshold value, the device 110 may determine (1114) that a tap is detected at a first location (e.g., in proximity to the first microphone) and may perform (1116) a first action.

If the device 110 determines that the first power ratio does not exceed the threshold value, the device 110 may determine (1118) a second power ratio between the second short-term power value and the first short-term power value and may determine (1120) whether the second power ratio exceeds the threshold value. If the device 110 determines that the second power ratio exceeds the threshold value, the device 110 may determine (1122) that a tap is detected at a second location (e.g., in proximity to the second microphone) and may perform (1124) a second action.

If the device 110 determines that the first power ratio does not exceed the threshold value and the second power ratio does not exceed the threshold value, the device 110 may determine (1126) that a tap event is not detected.

While FIG. 11 illustrates the first power ratio and the second power ratio being compared to a single threshold value, the disclosure is not limited thereto and the first power ratio may be compared to a first threshold value and the second power ratio may be compared to a second threshold value that is different from the first threshold value without departing from the disclosure.

Figure 12:
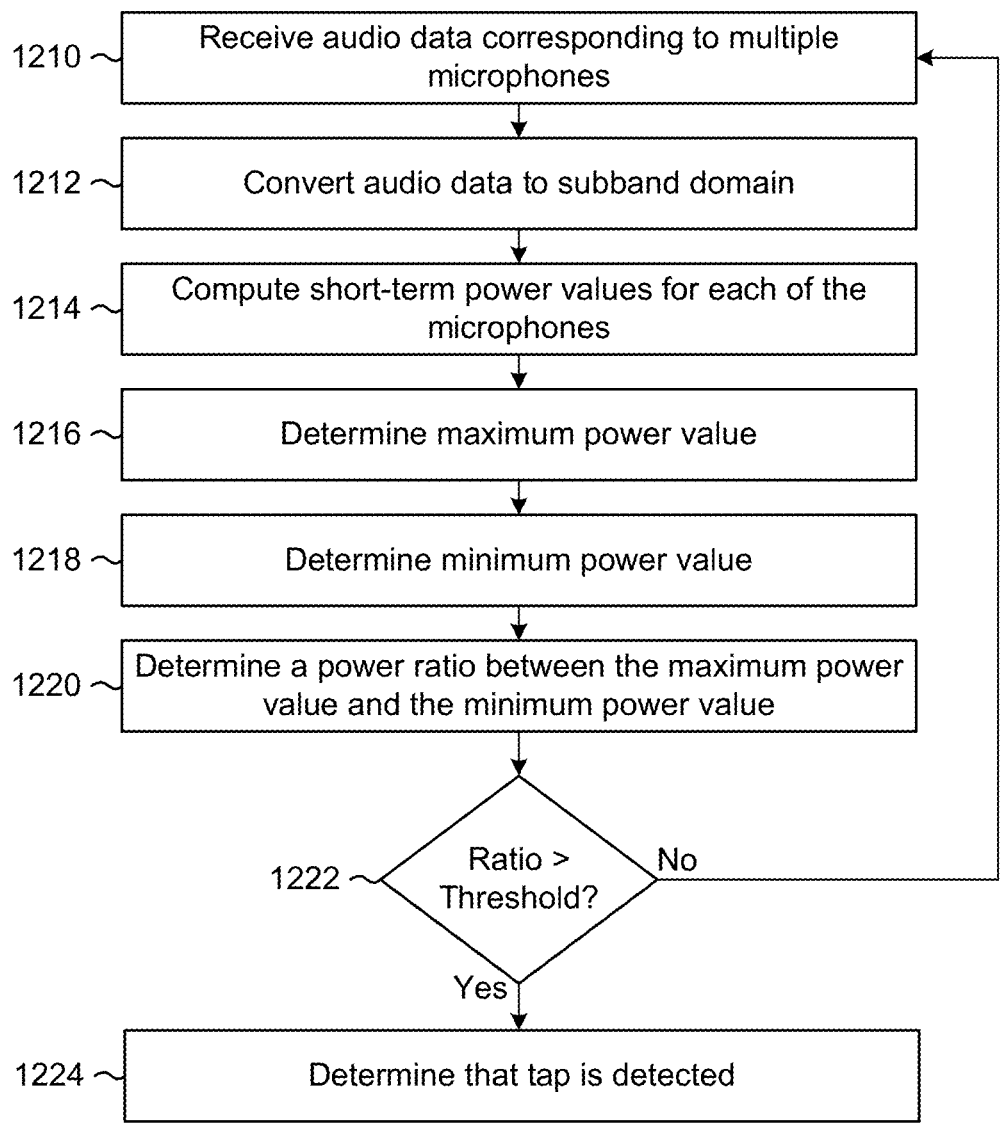
FIG. 12 is a flowchart conceptually illustrating an example method for performing tap detection with a plurality of microphones according to embodiments of the present disclosure.

FIG. 12 is a flowchart conceptually illustrating an example method for performing tap detection with a plurality of microphones according to embodiments of the present disclosure. As illustrated in FIG. 12, the device 110 may receive (1210) audio data corresponding to multiple microphones, may convert (1212) the audio data from a time domain to a subband domain, and may compute (1214) short-term power values for each of the microphones. The device 110 may determine (1216) a maximum power value, determine (1218) a minimum power value, and determine (1220) a power ratio between the maximum power value and the minimum power value.

The device 110 may then determine (1222) whether the power ratio exceeds a threshold value and, if not, may loop to step 1210 and repeat steps 1210-1220. If the device 110 determines that the power ratio exceeds the threshold value, the device 110 may determine (1224) that a tap event is detected and perform an action corresponding to the tap event.

Figure 13:
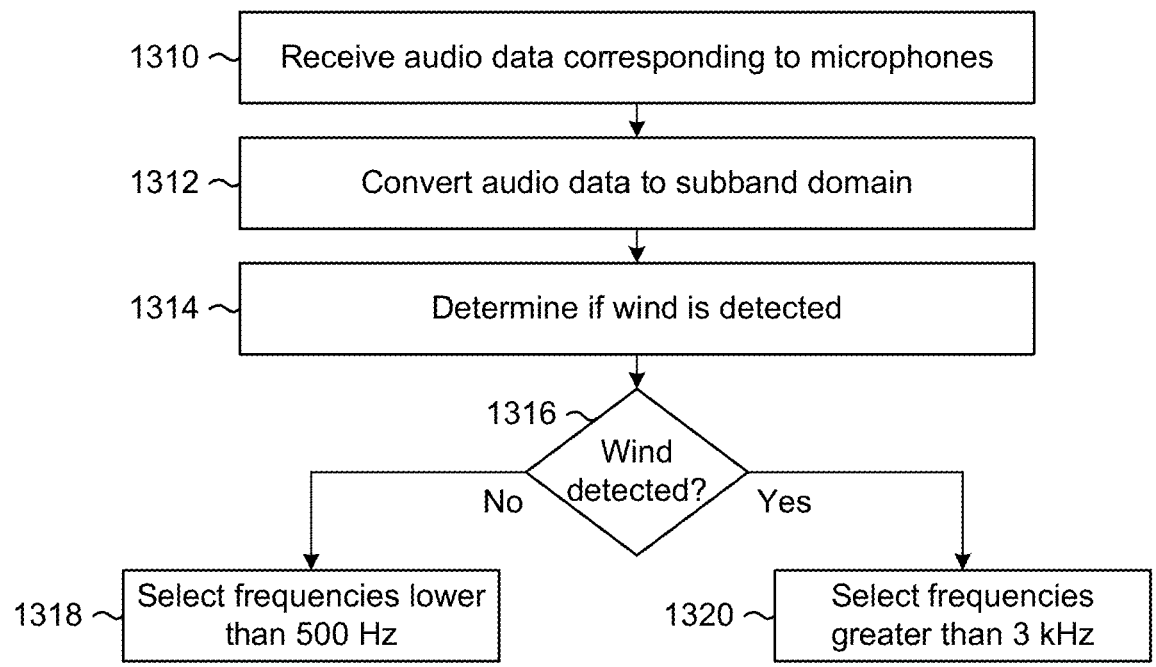
FIG. 13 is a flowchart conceptually illustrating an example method for performing tap detection when wind is present according to embodiments of the present disclosure.

FIG. 13 is a flowchart conceptually illustrating an example method for performing tap detection when wind is present according to embodiments of the present disclosure. As illustrated in FIG. 13, the device 110 may receive (1310) audio data corresponding to microphones (e.g., first audio data corresponding to a first microphone and second audio data corresponding to a second microphone), may convert (1312) the audio data from a time domain to a subband domain, and may determine (1314) if wind is detected in the audio data. For example, the device 110 may compare energy values in different frequency ranges to determine that wind is represented.

If the device 110 determines that wind is not detected in the audio data, the device 110 may select (1318) frequencies in a first frequency range (e.g., lower than 500 Hz) to perform tap detection processing. If the device 110 determines that wind is detected in the audio data, the device 110 may select (1320) frequencies in a second frequency range (e.g., higher than 3 kHz) to perform tap detection processing.

Thus, the device 110 may perform tap detection processing using different frequency ranges depending on whether wind is detected in the audio data, as wind may cause relatively large ILD that may be incorrectly interpreted as a tap event. However, wind noise typically occurs at low frequencies below 1 kHz, whereas tap events cause ILD values across all frequencies, so the device 110 may perform tap detection processing using higher frequencies without departing from the disclosure. While FIG. 13 illustrates examples of the first frequency range and the second frequency range, the disclosure is not limited thereto. Instead, the first frequency range and the second frequency range may vary without departing from the disclosure.

Figure 14A:
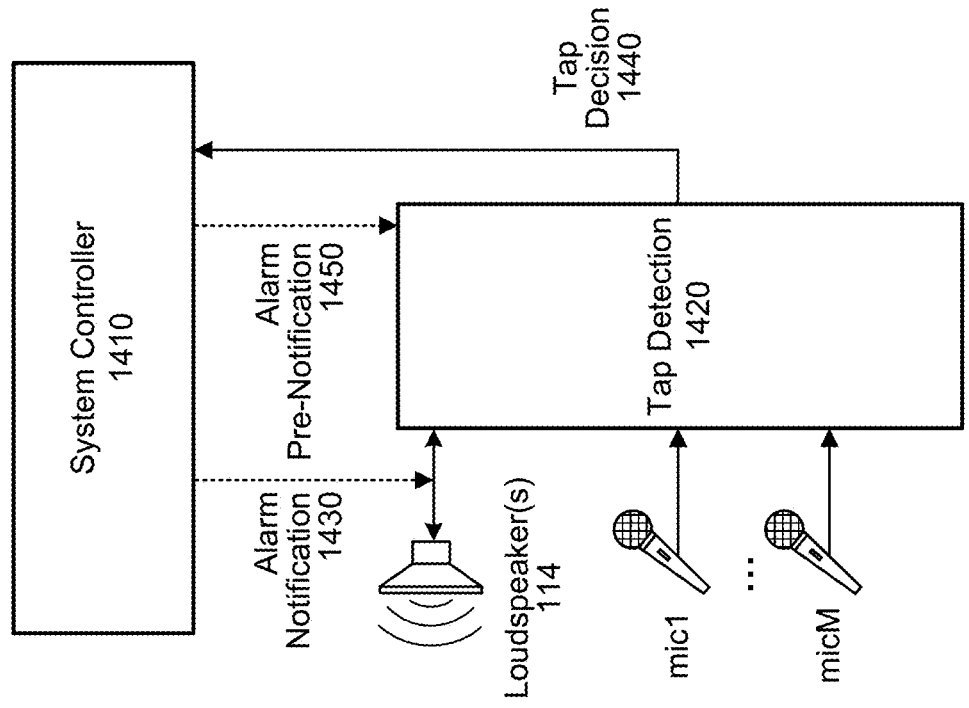
FIGS. 14A-14B illustrate examples of performing tap detection during alarm notifications according to embodiments of the present disclosure.
Figure 14B:
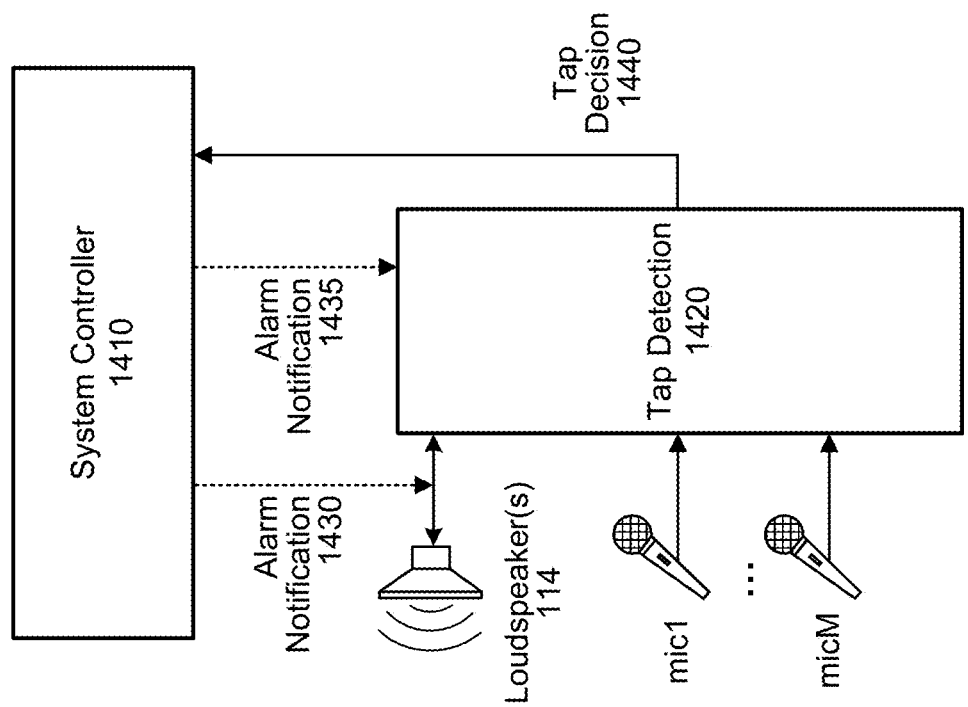

FIGS. 14A-14B illustrate examples of performing tap detection during alarm notifications according to embodiments of the present disclosure. As illustrated in FIG. 14A, the device 110 may include a system controller component 1410 that coordinates with a tap detection component 1420 during an alarm event. For example, the system controller component 1410 may send an alarm notification 1430 to the loudspeaker(s) 114 (e.g., output audio corresponding to the alarm event) and may also send an alarm notification 1435 to the tap detection component 1420, notifying the tap detection component 1420 that the alarm is currently being generated. The tap detection component 1420 may begin tap detection processing upon receipt of the alarm notification 1435, sending a tap decision 1440 to the system controller component 1410. Thus, if the tap detection 1420 detects a tap event, the tap detection component 1420 may send the tap decision 1440 indicating that the tap event was detected and the system controller component 1410 can disable or snooze the alarm event (e.g., cease outputting the output audio corresponding to alarm playback).

In some examples, the system controller component 1410 may send an alarm pre-notification 1450 prior to the system controller component 1410 sending the alarm notification 1430 to the loudspeaker(s) 114, as illustrated in FIG. 14B. For example, a fixed time (e.g., 10 seconds) prior to the scheduled alarm notification 1430, the system controller component 1410 may send the alarm pre-notification 1450 to the tap detection component 1420. The tap detection component 1420 may perform tap detection processing to monitor the ILD values and, if the tap detection component 1420 detects a tap event prior to the scheduled alarm notification 1430, the tap detection component 1420 may determine that wind conditions are present and set an ILD threshold value to the wind threshold value (e.g., 30 dB).

While not illustrated in FIG. 14B, in some examples the device 110 may receive an indication that a button press occurred to ignore tap event detection. For example, the device 110 may receive a button press input on a physical button, separate from a tap event on a microphone. The device 110 may detect the button press input and send a notification to the tap detection component 1420 to ignore the tap event or to disable tap event processing for a period of time without departing from the disclosure.

Figure 15:
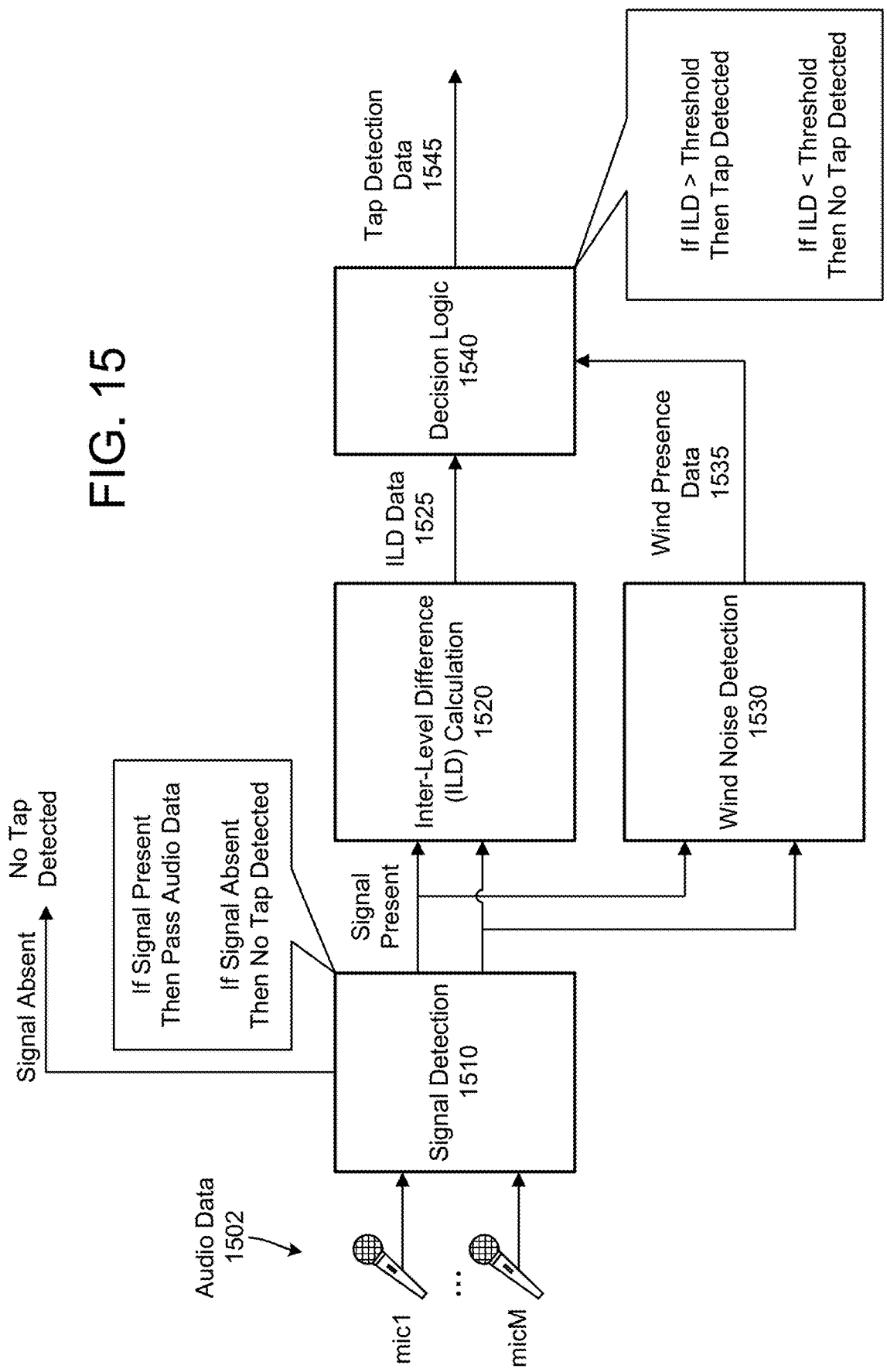
FIG. 15 illustrates an example component diagram for performing tap detection according to embodiments of the present disclosure.

FIG. 15 illustrates an example component diagram for performing tap detection according to embodiments of the present disclosure. As illustrated in FIG. 15, the device 110 may input audio data 1502 from two or more microphones to a signal detection component 1510 and the signal detection component 1510 may perform signal detection processing to determine whether a signal is present. If the signal detection component 1510 determines that a signal is not present (e.g., signal absent), the signal detection component 1510 may output an indication that no tap is detected and the device 110 can skip the rest of the tap detection processing.

If the signal detection component 1510 determines that a signal is present (e.g., signal present), the signal detection component 1510 may output the signal to the inter-level difference (ILD) calculation component 1520 and/or the wind noise detection component 1530.

For each input channel i (e.g., mic1, . . . micM of audio data 1502), the signal detection component 1510 may compute the signal power over the nth frame, using signal power calculation 1610 illustrated in FIG. 16A and shown below:

$$E_i(n) = \frac{1}{N} \sum_{t=n-N+1}^{n} x_i^2(t) \quad [13]$$

where N is the frame length (e.g. 320 samples, or 20 ms at 16 kHz sample rate). The signal detection component 1510 may then compare a maximum frame power over all channels against a signal threshold 1625 (e.g. $Sig_{thresh}$=−50 dBFS), as illustrated by signal detection decision 1620 illustrated in FIG. 16A and shown below:

$$\max_i E_i(n) \geq Sig_{thresh} \quad \text{signal present} \quad [14]$$
$$\max_i E_i(n) < Sig_{thresh} \quad \text{no signal}$$

If the signal detection component 1510 determines that there is no signal present, the device 110 may bypass all processing for that audio frame and generate output data indicating that no tap event is detected. If there is signal present for the audio frame, the device 110 continues processing the ILD calculation component 1520. In some examples, the signal detection component 1510 may determine that a frame power of both channels exceeds a high threshold value (e.g., both microphones are clipped at an upper limit), which may indicate a tap event occurring on both microphones. When this occurs, the device 110 may generate output data indicating that a tap event is detected without performing further processing, although the disclosure is not limited thereto.

When a signal is present, the ILD calculation component 1520 may receive the input signals (e.g., audio data 1502) and generate ILD data 1525. For example, the ILD calculation component 1520 may filter the input signals with a low-pass filter having a cut-off frequency (e.g., between 100 Hz and 500 Hz) and may determine the power of the band-pass filtered signals $x_{i,BP}(t)$ over the nth frame, using power calculation 1630 illustrated in FIG. 16B and shown below:

$$P_i(n) = \frac{1}{N} \sum_{t=n-N+1}^{n} x_{i,BP}^2(t) \quad [15]$$

The ILD calculation component 1520 may take the ratio of the max power and the min power to determine the inter-channel level difference (ILD) calculation 1640, illustrated in FIG. 16B and shown below:

$$ILD(n) = 10\log_{10}\left(\max_i P_i(n)\right) - 10\log_{10}\left(\min_i P_i(n)\right) \quad [16]$$

For far-field sound events and acoustic echo, the ILD 0. However, for tap events near the microphones, ILD becomes large. Therefore, the ILD is compared against a threshold (e.g., $ILD_{thresh}$=10 dB) and a decision is made for frame n using ILD decision 1645, illustrated in FIG. 16B and shown below:

$$ILD(n) \geq ILD_{thresh} \quad ild_{flag}(n)=1$$
$$ILD(n) < ILD_{thresh} \quad ild_{flag}(n)=0 \quad [17]$$

While a lower threshold value (e.g., 10 dB) can be used for normal tap detection processing, when wind noise is detected the device 110 may use a higher threshold value (e.g., 30 dB) to avoid false positives (e.g., tap event incorrectly detected, resulting in the alarm notification being disabled inadvertently by mistake). Thus, an ILD threshold 1650 may be 10 dB when no wind is present and 30 dB when wind is present, although the disclosure is not limited thereto.

The wind noise detection component 1530 may perform wind detection processing by determining a coherence between two input audio signals (e.g., two microphone signals). Two-channel coherence is defined as ratio of the cross power spectral density (PSD) and product of auto power spectral densities. Therefore, the wind noise detection component 1530 may use coherence calculation 1660 illustrated in FIG. 16C and shown below:

$$\Gamma(n, f) = \frac{\phi_{x_1 x_2}(n, f)}{\sqrt{\phi_{x_1 x_1}(n, f)\phi_{x_2 x_2}(n, f)}} \quad [18]$$

where the PSDs are computed using smoothed periodogram (e.g., Power Spectral Density (PSD) calculation 1670) shown below:

$$\phi_{x_i x_j}(n, f) = \alpha_s \phi_{x_i x_j}(n-1, f) + (1-\alpha_s) X_i(n, f) X_j^*(n, f) \quad [19]$$

where ( )* is complex conjugate, and $\alpha_s$ is the smoothing factor (e.g., value between 0 and 1 that controls a rate of change).

Sound events such as speech, music, etc. are correlated at all frequencies, such that magnitude coherence satisfy the following:

$$|\Gamma(n,f)| \approx 1 \quad \forall f \quad [20]$$

However, wind noise is a low-frequency, non-stationary signal that is uncorrelated at different channels. The metric to be used for wind noise detection is magnitude coherence averaged over low frequencies [0-300] Hz, illustrated in FIG. 16C as magnitude coherence calculation 1680 and shown below:

$$\Gamma_L(n) = \sum_{f=0}^{300} |\Gamma(n, f)| \quad [21]$$

This quantity is compared against a threshold and a decision is made for frame n, illustrated in FIG. 16C as wind decision 1690:

$$\Gamma_L(n) \geq Wnd_{thresh} \quad Wnd_{flag}(n)=0$$
$$\Gamma_L(n) < Wnd_{thresh} \quad Wnd_{flag}(n)=1 \quad [22]$$

Decision logic 1540 may receive the ILD data 1525 from the ILD calculation component 1520 and the wind presence data 1535 generated by the wind noise detection component 1530 and may generate tap detection data 1545 indicating whether a tap event is detected. The decision logic 1540 may choose a threshold value (e.g., $ILD_{thresh}$) based on the wind presence data 1535 (e.g., $Wnd_{flag}$ value). For example, if wind is present then the decision logic 1540 may choose a large value (e.g., $ILD_{thresh}$=30 dB) to avoid false positives, whereas when wind is not present the decision logic 1540 may choose a smaller value (e.g., $ILD_{thresh}$=10 dB), although the disclosure is not limited thereto.

The decision logic 1540 may then compare the ILD to the threshold value, as described above with regard to the ILD decision 1645 shown in Equation [17]. The decision logic 1540 may make a frame-wise decision on whether a tap is present or not using:

Tap if $ild_{flag}(n)=1$

No Tap otherwise    [23]

The decision logic 1540 analyzes short (e.g., 20 ms) duration overlapping frames, and a frame-wise decision on whether tap is detected or not is made for every frame. However, the decision logic 1540 may include a hangover mechanism to avoid fluctuations in the tap decision. For example, the decision logic 1540 may use a 250 ms hangover period before making a final tap decision, although the disclosure is not limited thereto.

In some examples, the device 110 may detect false positives (e.g., false alarms) caused by wind, despite increasing the ILD threshold when wind is present. To reduce the number of false positives, as soon as the condition $ild_{flag}(n)=1$ is satisfied, the device 110 may start monitoring the root-mean-square (rms) levels of the band-pass filtered microphone signals over the hangover period (e.g., 250 ms). The device 110 may then compute the variances of the rms levels, and compare the maximum variance against a threshold value. For true tap events, the maximum variance is quite large, whereas during false positives caused by wind, the maximum variance is relatively small. Therefore, if the maximum variance exceeds a pre-determined threshold, the decision logic 1540 may maintain the tap detection data 1545 and treat it as a valid tap event. However, if the maximum variance is below the pre-determined threshold, the decision logic 1540 may ignore the decision indicated by the tap detection data 1545 and treat this as a no tap event.

Figure 17:
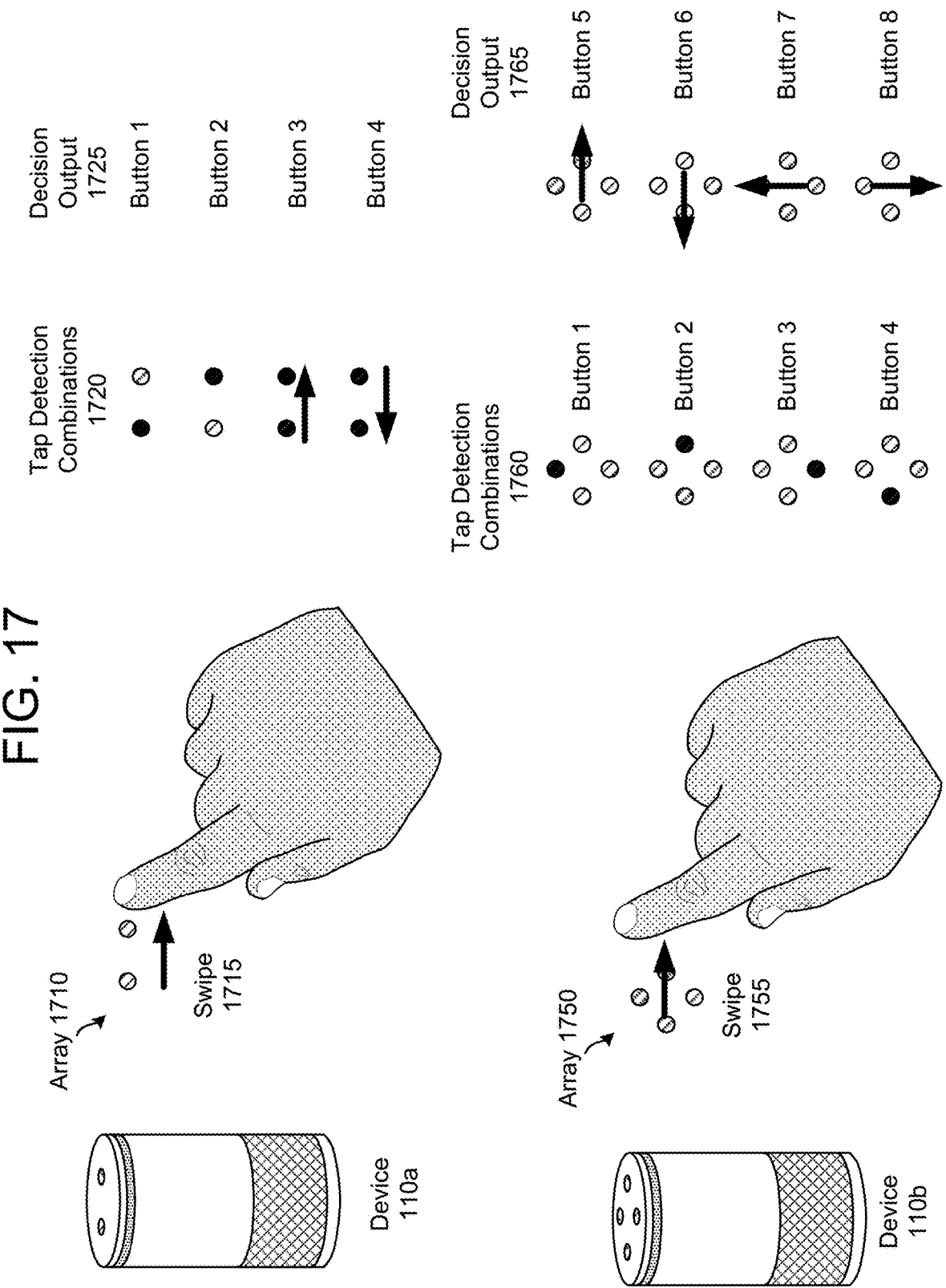
FIG. 17 illustrates examples of tap detection decisions according to embodiments of the present disclosure.

FIG. 17 illustrates examples of tap detection decisions according to embodiments of the present disclosure. As illustrated in FIG. 17, the device 110 may include different microphone arrays having a different number of microphones and therefore the device 110 may be configured to detect a varying number of virtual buttons by performing tap detection processing for each of the microphones.

In one examples, an array 1710 may include two microphones and the device 110 may determine whether a tap event is detected at either microphone over time. Thus, the device 110 may distinguish between a single tap event detected using the first microphone and a single tap event detected using the second microphone, treating the distinct tap events as separate buttons. Additionally or alternatively, the device 110 may detect a first tap event using the first microphone followed by a second tap event using the second microphone, which corresponds to a swipe 1715 motion (e.g., user 5 swipes from the first microphone to the second microphone).

As illustrated in FIG. 17, using the array 1710 the device 110 may detect four tap detection combinations 1720 that correspond to four decision outputs 1725 (e.g., device 110 may perform up to four separate actions). For example, a tap event at the first microphone corresponds to a first button press (e.g., Button 1), a tap event at the second microphone corresponds to a second button press (e.g., Button 2), a swipe from the first microphone to the second microphone corresponds to a third button press (e.g., Button 3), and a swipe from the second microphone to the first microphone corresponds to a fourth button press (e.g., Button 4).

In some examples, the device 110 may include four microphones without departing from the disclosure, as illustrated by array 1750. As the array 1750 includes four separate microphones, the device 110 may detect four separate tap events and up to four separate swipe events. As illustrated in FIG. 17, using the array 1750 the device 110 may detect eight tap detection combinations 1760 that correspond to eight decision outputs 1765 (e.g., device 110 may perform up to eight separate actions). For example, a tap event at the first microphone corresponds to a first button press (e.g., Button 1), a tap event at the second microphone corresponds to a second button press (e.g., Button 2), a tap event at the third microphone corresponds to a third button press (e.g., Button 3), a tap event at the fourth microphone corresponds to a fourth button press (e.g., Button 2), a swipe left-to-right (e.g., from the fourth microphone to the second microphone) corresponds to a fifth button press (e.g., Button 5), a swipe right-to-left (e.g., from the second microphone to the fourth microphone) corresponds to a sixth button press (e.g., Button 6), a swipe bottom-to-top (e.g., from the third microphone to the first microphone) corresponds to a seventh button press (e.g., Button 7), and a swipe top-to-bottom (e.g., from the first microphone to the third microphone) corresponds to an eighth button press (e.g., Button 8).

While FIG. 17 illustrates the device 110 detecting a single tap event, the disclosure is not limited thereto and the device 110 may distinguish between multiple tap events within a short period of time. For example, the device 110 may perform a first action when a single tap event is detected and may perform a second action when a double tap event is detected. Additionally or alternatively, the device 110 may distinguish between triple tap events and/or the like without departing from the disclosure.

Performing tap detection using only audio data may result in false positives. For example, loud noises in proximity to the device 110 (e.g., clapping, snapping, etc.), wind noise (e.g., caused by wind, a nearby fan, etc.), and/or other non-tap events may cause the device 110 to detect a tap event when no physical tap occurred. To reduce these false positives, the device 110 may perform tap detection using a combination of audio data and motion data. For example, the device 110 may perform tap detection using the audio data to identify a potential tap event, then confirm the tap event based on motion data (e.g., accelerometer data) generated by an accelerometer or other motion sensor. Additionally or alternatively, the device 110 may use both the audio data and the motion data to perform tap detection using a trained model (e.g., neural network, convolutional neural network (CNN), deep neural network (DNN), etc.). Thus, the device 110 only detects a tap event corresponding to an actual movement of the device 110.

FIG. 18 illustrates an example component diagram for using an accelerometer to reduce false positives while performing tap detection according to embodiments of the present disclosure. As illustrated in FIG. 18, fusion architecture 1800 may include an accelerometer component 1810, an encoder component 1820 included in the digital signal processor (DSP) component 116, a circular buffer component 1830, and/or a decoder component 1840 included in the central processing unit (CPU) component 118. The DSP component 116 may be configured to receive audio data 1802 from two or more microphones, receive accelerometer data 1815 from the accelerometer component 1810, and generate mixed data 1825 that includes both the audio data 1802 and the accelerometer data 1815. For example, the encoder component 1820 may generate the mixed data 1825 by embedding the accelerometer data 1815 within the audio data 1802 (e.g., within unused bits included in the audio data 1802) and send the mixed data 1825 to the circular buffer component 1830.

The circular buffer component 1830 may store the mixed data 1825 and the CPU component 118 may retrieve the mixed data 1825 from the circular buffer component 1830 when necessary. For example, the CPU component 118 may operate in a first mode (e.g., active mode) and may retrieve the mixed data 1825, as it is received, to perform tap detection. However, the disclosure is not limited thereto and in other examples the CPU component 118 may operate in a second mode (e.g., low power mode) and may receive an interrupt signal (e.g., interrupt event, wake-up signal, etc.), causing the CPU component 118 to operate in the first mode and retrieve a portion of the mixed data 1825 that is stored in the circular buffer component 1830 without departing from the disclosure.

The CPU component 118 may perform tap detection using the mixed data 1825 to detect tap events, as described in greater detail above. For example, the decoder component 1840 may decode the mixed data 1825 to generate first audio data corresponding to the audio data 1802 and may perform tap detection using the first audio data without departing from the disclosure. In addition, the CPU component 118 may use the accelerometer data 1815 embedded in the mixed data 1825 to perform tap detection. For example, the decoder component 1840 may decode the mixed data 1825 to generate the first audio data and first accelerometer data corresponding to the accelerometer data 1815 and may perform tap detection using a combination of the first audio data and the first accelerometer data.

Figure 24A:
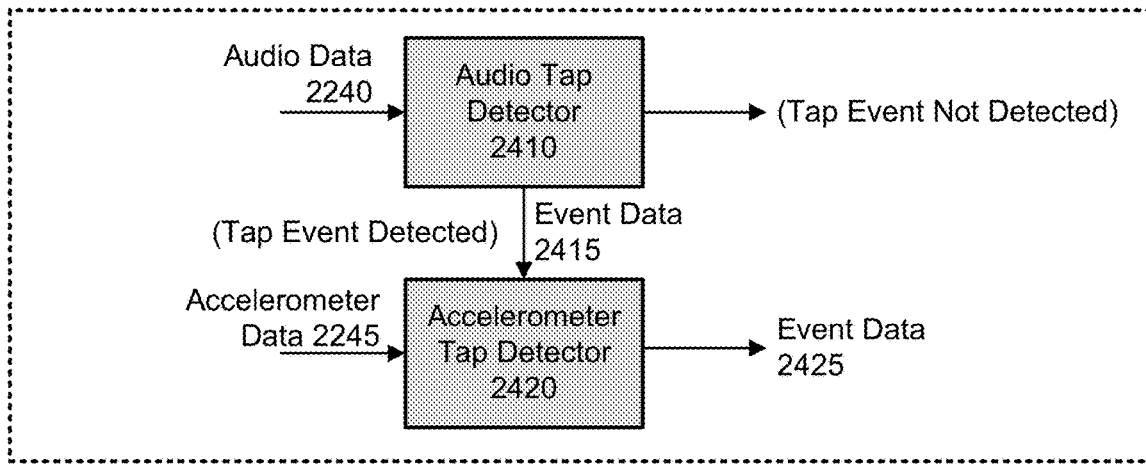
FIGS. 24A-24C illustrate examples of performing tap detection using accelerometer data according to embodiments of the present disclosure.
Figure 24B:
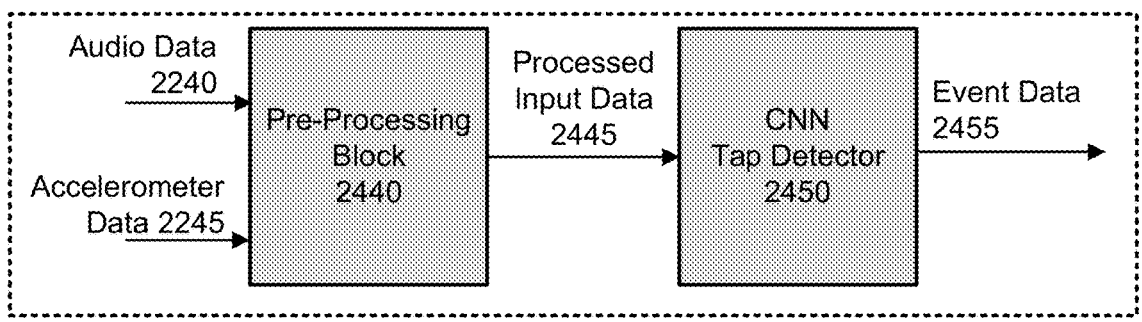
Figure 24C:
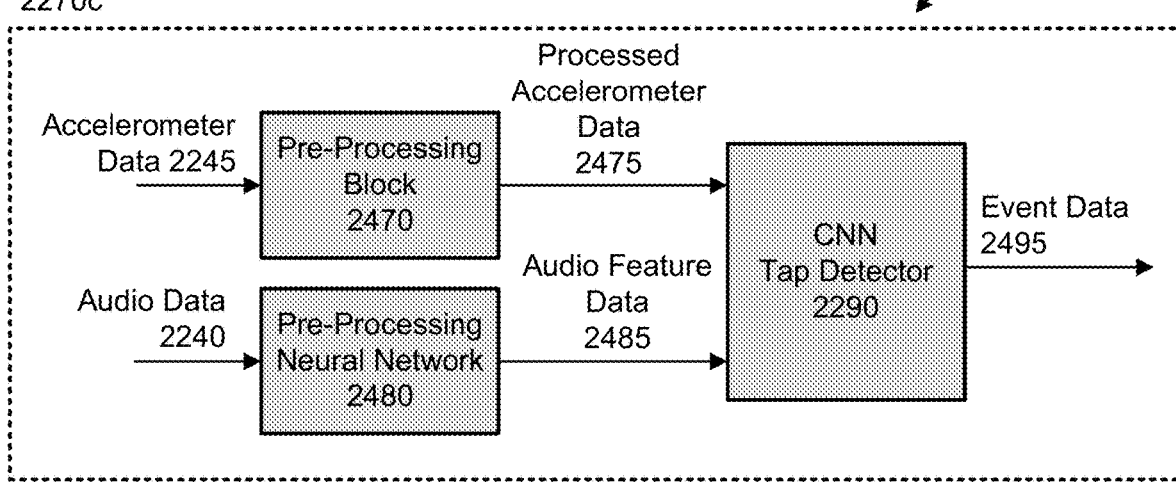

In some examples, the CPU component 118 may use the first accelerometer data to validate a potential tap event (e.g., confirm that movement of the device 110 occurred during the potential tap event) and remove false positives (e.g., potential tap events that do not correspond to movement of the device 110). For example, the CPU component 118 may use a cascaded implementation to perform tap detection, as illustrated in FIG. 24A. Additionally or alternatively, the CPU component 118 may input the first audio data and the first accelerometer data to a trained model configured to detect a tap event. For example, the CPU component 118 may use one or more trained models (e.g., convolution neural network (CNN), although the disclosure is not limited thereto) to perform tap detection, as illustrated in FIGS. 24B-24C.

In some examples, the microphones 112 and the accelerometer component 1810 may have different internal clocks. For example, the microphones 112 may have a first clock rate (e.g., 96 kHz, 16 kHz, etc.) and the accelerometer component 1810 may have a second clock rate (e.g., 400 Hz). While there may be a common multiple between the two clock rates, the clock rates are not synchronized with each other and therefore there will be a mismatch, requiring the device 110 to add/subtract samples to synchronize these two signals.

Figure 19:
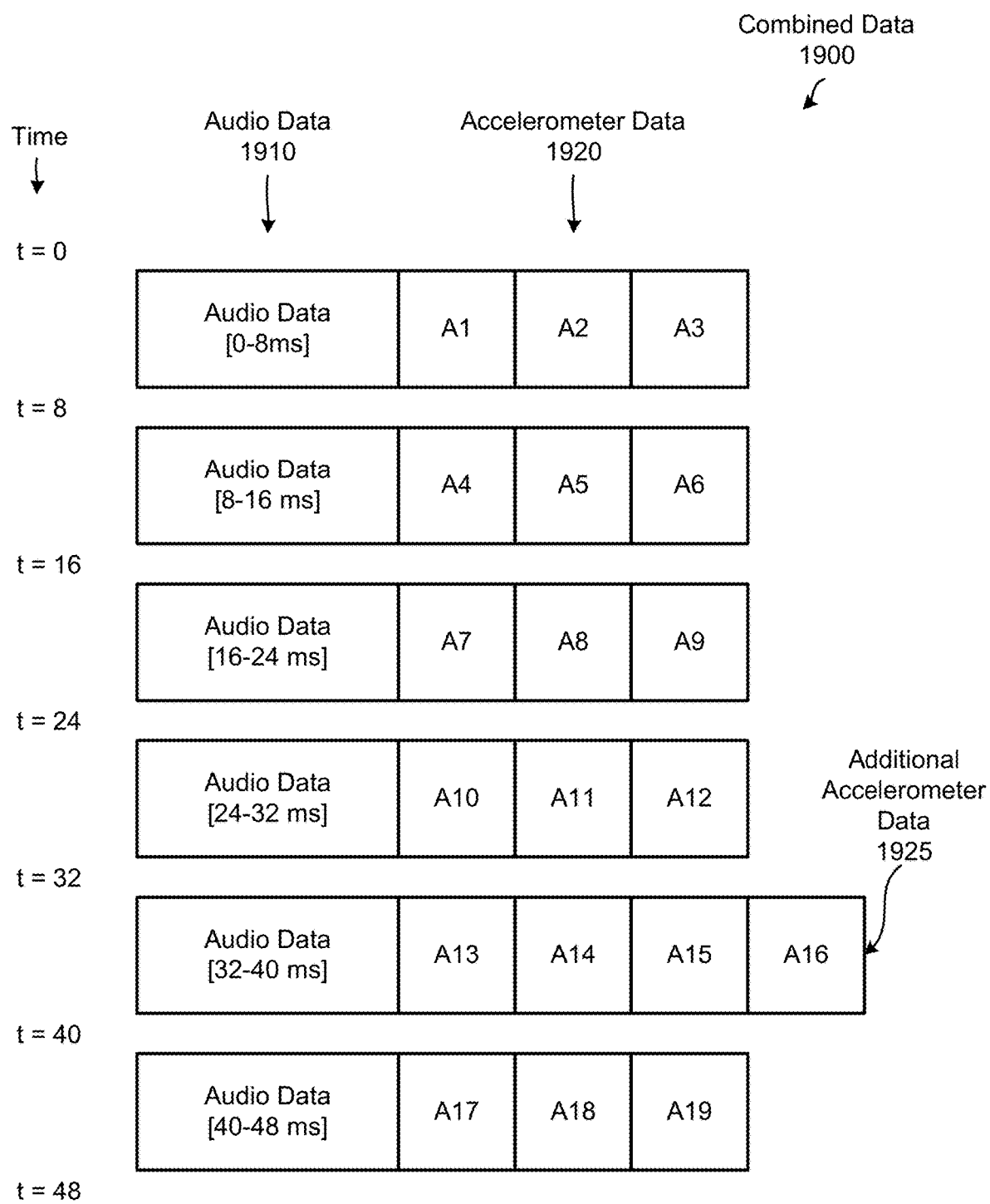
FIG. 19 illustrates an example of combining audio data and accelerometer data according to embodiments of the present disclosure.

FIG. 19 illustrates an example of combining audio data and accelerometer data according to embodiments of the present disclosure. As illustrated in FIG. 19, the device 110 may generate combined data 1900 that includes audio data 1910 and accelerometer data 1920. For example, the device 110 may combine a first portion of the audio data 1910 (e.g., 0-8 ms) having a first duration (e.g., 8 ms) with a first portion of the accelerometer data 1920 representing three separate accelerometer samples (e.g., A1-A3), a second portion of the audio data 1910 (e.g., 8-16 ms) having the first duration (e.g., 8 ms) with a second portion of the accelerometer data 1920 representing three separate accelerometer samples (e.g., A4-A6), and so on. However, due to the mismatch in clock rates, the combined data 1900 may include a varying number of accelerometer samples (e.g., accelerometer packets). For example, to synchronize the accelerometer data 1920 with the audio data 1910, the device 110 may combine a fifth portion of the audio data 1910 (e.g., 32-40 ms) having the first duration (e.g., 8 ms) with a fifth portion of the accelerometer data 1920 representing four separate accelerometer samples (e.g., A13-A16). Thus, the fifth portion of the combined data 1900 may include the first duration of the audio data 1910 while also including additional accelerometer data 1925. Therefore, the device 110 may enable the combined data 1900 to include a variable number of accelerometer samples without departing from the disclosure.

FIGS. 20A-20D illustrate examples of embedding accelerometer data according to embodiments of the present disclosure. As illustrated FIG. 20A, in some examples the device 110 may generate the accelerometer data 1920 using an accelerometer data scheme 2000. For example, the accelerometer data 1920 may include a header 2010 that includes an identifier (e.g., 8 bits), a version type (e.g., 8 bits), a payload size (in bytes) (e.g., 8 bits), and a number of accelerometer samples (e.g., 8 bits). In addition to the header 2010, the accelerometer data scheme 2000 may include the payload itself, which includes accelerometer samples 2020 and a checksum (e.g., 16 bits, although the disclosure is not limited thereto) configured to check the validity of the payload.

Figure 20A:
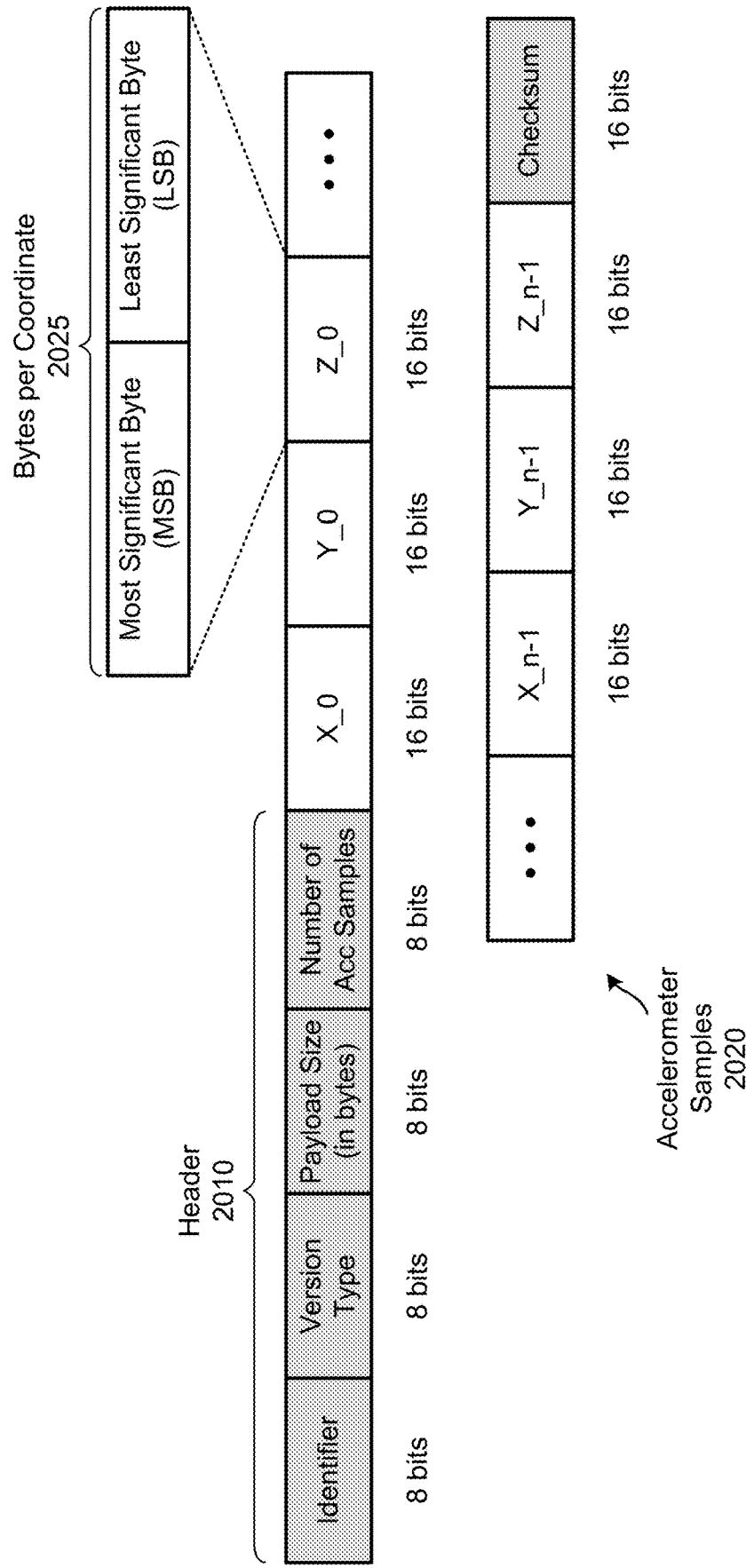
Figure 21:
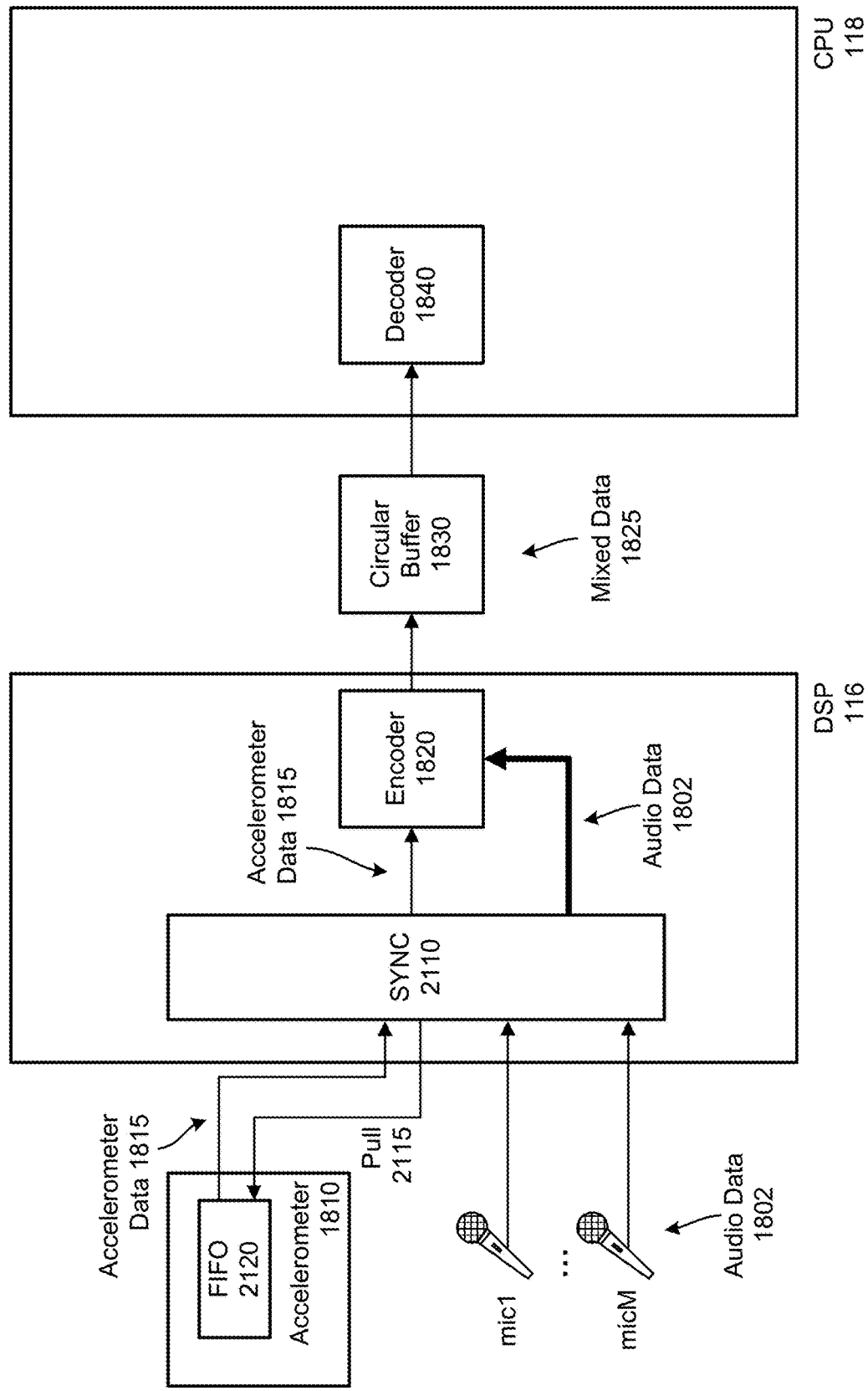
FIG. 21 illustrates an example component diagram for embedding accelerometer data while performing tap detection according to embodiments of the present disclosure.

As illustrated in FIG. 20A, the payload may correspond to a sequence of accelerometer samples 2020 broken into segments of 16 bits (e.g., two bytes). For example, FIG. 20A illustrates that the accelerometer samples 2020 includes two bytes per coordinate 2025: a most significant byte (MSB) and a least significant byte (LSB). Thus, a single accelerometer sample may be represented using three segments (e.g., six total bytes, comprising two bytes for each of the three directional axis included in the motion data). For example, FIG. 20A illustrates an example in which a first accelerometer sample (e.g., Sample 0) may be represented using two bytes for the x-axis (e.g., X_0), two bytes for the y-axis (e.g., Y_0), and two bytes for the z-axis (e.g., Z_0), for a total of three segments or six bytes. A second accelerometer sample (e.g., Sample 1) would be represented using an additional three segments (e.g., six bytes), and so on until an nth accelerometer sample (e.g., Sample n−1). For example, FIG. 20A illustrates the nth accelerometer sample (e.g., Sample n−1) represented using two bytes for the x-axis (e.g., X_n−1), two bytes for the y-axis (e.g., Y_n−1), and two bytes for the z-axis (e.g., Z_n−1).

Using the accelerometer data scheme 2000, the device 110 may generate accelerometer data corresponding to any number of accelerometer samples. For example, the first portion of the accelerometer data 1920 representing three accelerometer samples (e.g., A1-A3, such that n=3) would correspond to a payload of 20 bytes (e.g., three segments of two bytes for each of the three accelerometer samples and a two-byte checksum) and a total size of 24 bytes, while the fifth portion of the accelerometer data 1920 representing four separate accelerometer samples (e.g., A13-A16, such that n=4) would correspond to a payload of 26 bytes (e.g., three segments of two bytes for each of the four accelerometer samples, followed by a two-bye checksum) and a total size of 30 bytes, although the disclosure is not limited thereto. While FIG. 19 illustrates an example of the device 110 encoding three accelerometer samples or four accelerometer samples for each 8 ms portion of the audio data 1910 (e.g., audio frame), the disclosure is not limited thereto and the number of accelerometer samples may vary without departing from the disclosure.

To encode the accelerometer data 1920 within the combined data 1900, the device 110 may use an encoding technique in which the device 110 encodes the accelerometer data 1920 in a portion of a container used by the audio data 1910. For example, the audio data 1910 may use 24 bits of a 32 bit container, leaving 8 unused bits that can be encoded with the accelerometer data 1920. Thus, in some examples the device 110 may encode the accelerometer data 1920 in the top 8 bits of the 32 bit container (e.g., most significant byte), such that the combined data 1900 includes both the accelerometer data 1920 and the audio data 1910.

Figure 20B:
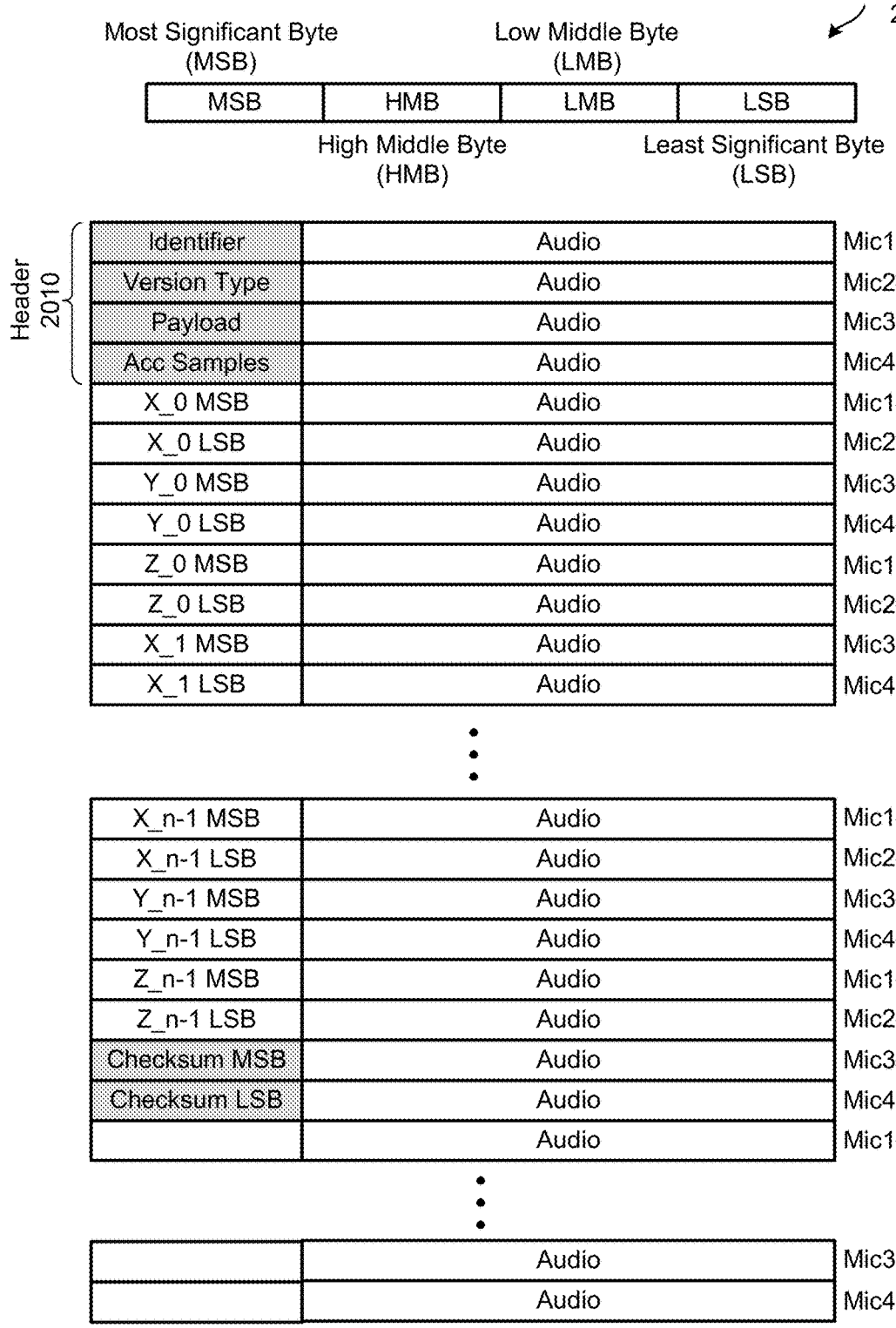

As illustrated in FIG. 20B, the device 110 may use an accelerometer encoding technique 2030 that separates the accelerometer data 1920 into 8 bit segments and encodes these segments in the top 8 bits of the 32 bit container (e.g., word) used by the audio data 1910. For example, the device 110 may encode an individual audio sample, which is represented using 24 bits of the 32 bit container, with a unique 8 bit segment of the accelerometer data 1920.

As the first four bytes of the accelerometer data scheme 2000 correspond to the header 2010 (e.g., Identifier, Version Type, Payload, Accelerometer Samples) and are already represented using 8 bit segments, FIG. 20B illustrates that the accelerometer encoding technique 2030 encodes these segments in the first four words (e.g., mixed samples) of the combined data (e.g., mixed data 1825) without modification.

The identifier may represent a value (e.g., in hexadecimals) indicating that data is present and/or indicating a type of data present. Thus, when the combined data 1900 includes the audio data 1910 and the accelerometer data 1920, the device 110 may detect the identifier included in the MSB of the combined data 1900 and determine that the accelerometer data 1920 is represented in the MSB of the combined data 1900. In contrast, when the combined data 1900 only includes the audio data 1910, the MSB may be blank (e.g., store null values) and the device 110 may ignore the MSB of the combined data 1900. Thus, the device 110 detects the existence of the accelerometer data 1920 embedded in the combined data 1900 using the identifier.

As illustrated in FIG. 20B, the audio data 1910 may interleave audio samples generated by each of the microphones 112. For example, a first microphone 112a may generate first audio samples, a second microphone 112b may generate second audio samples, and so on for each of the microphones 112. Thus, the audio data 1910 may include a first word representing a first sample of the first audio samples corresponding to the first microphone 112a (e.g., Mic1-Sample0), a second word representing a first sample of the second audio samples corresponding to the second microphone 112b (e.g., Mic2-Sample0), and so on for each of the microphones 112. Following the first m words of the audio data 1910 (e.g., first samples for each of the microphones 112), the audio data 1910 may include an (m+1) word representing a second sample of the first audio samples (e.g., Mic1-Sample1), an (m+2) word representing a second sample of the second audio samples (e.g., Mic2-Sample1), and so on for each of the second samples.

As the audio data 1910 is comprised of interleaved audio samples, the combined data 1900 may represent the interleaved audio samples using the three least significant bytes (e.g., high middle byte (HMB), low middle byte (LMB), and least significant byte (LSB)) of a word and may embed the accelerometer data 1920 as the MSB of the word. For example, a first word of the combined data 1900 may include a first portion (e.g., Most Significant Byte (MSB)) representing the Identifier and a second portion (e.g., three least significant bytes) representing a first sample of the first audio samples corresponding to the first microphone 112a (e.g., Mic1-Sample0, a second word of the combined data 1900 may include a first portion (e.g., MSB) representing the Version Type and a second portion (e.g., three least significant bytes) representing a first sample of the second audio samples corresponding to the second microphone 112b (e.g., Mic2-Sample0), a third word of the combined data 1900 may include a first portion (e.g., MSB) representing the Payload size (in bytes) and a second portion (e.g., three least significant bytes) representing a first sample of third audio samples corresponding to a third microphone 112c (e.g., Mic3-Sample0), and a fourth word of the combined data 1900 may include a first portion (e.g., MSB) representing the number of accelerometer samples and a second portion (e.g., three least significant bytes) representing a first sample of third audio samples corresponding to a third microphone 112c (e.g., Mic3-Sample0).

As the accelerometer data scheme 2000 represents the payload using a segment of 16 bits (e.g., two bytes) for an individual directional axis (e.g., two bytes per coordinate), however, the accelerometer encoding technique 2030 may encode each individual segment using two words (e.g., embed the individual segment using two audio samples). As illustrated in FIG. 20B, the device 110 may separate the payload for an individual directional axis (e.g., X_0, Y_0, Z_0, etc.) into two sections (e.g., MSB and LSB) and may separately encode each of the two sections in two audio samples.

To illustrate an example, a portion of the payload corresponding to the x-axis of a first accelerometer sample (e.g., X_0) may be separated into two sections (e.g., X_0 MSB and X_0 LSB), and the accelerometer encoding technique 2030 may encode these sections using two audio samples (e.g., Mic1-Sample1 and Mic2-Sample1). For example, a fifth word of the combined data 1900 may include a first portion (e.g., MSB) representing the first section (e.g., X_0 MSB) and a second portion (e.g., three least significant bytes) representing three bytes of audio data (e.g., Mic1-Sample1) and a sixth word of the combined data 1900 may include a first portion representing the second section (e.g., X_0 LSB) and a second portion representing three bytes of audio data (e.g., Mic2-Sample1).

Similarly, a portion of the payload corresponding to the y-axis of the first accelerometer sample (e.g., Y_0) may be separated into two sections (e.g., Y_0 MSB and Y_0 LSB), and the accelerometer encoding technique 2030 may encode these sections using two audio samples (e.g., Mic3-Sample1 and Mic4-Sample1). For example, a seventh word of the combined data 1900 may include a first portion representing the first section (e.g., Y_0 MSB) and a second portion representing three bytes of audio data (e.g., Mic3-Sample1) and an eighth word of the combined data 1900 may include a first portion representing the second section (e.g., Y_0 LSB) and a second portion representing three bytes of audio data (e.g., Mic4-Sample1).

As illustrated in FIG. 20B, the accelerometer encoding technique 2030 may continue this encoding for the portion of the payload corresponding to the z-axis of the first accelerometer sample. For example, the accelerometer encoding technique 2030 may separate Z_0 into two sections (e.g., Z_0 MSB and Z_0 LSB) and encode these sections using two audio samples (e.g., Mic1-Sample2 and Mic2-Sample2). Thus, the accelerometer encoding technique 2030 may encode the six bytes associated with the first accelerometer sample using six words of the combined data 1900.

The accelerometer encoding technique 2030 may continue this encoding for each of the n accelerometer samples, encoding an individual accelerometer sample using six audio samples of the audio data 1910. In addition, the payload size includes the checksum (e.g., 16 bits), although the disclosure is not limited thereto and the checksum may be larger or smaller without departing from the disclosure. As illustrated in FIG. 20B, an nth accelerometer sample (e.g., corresponding to X_n−1, Y_n−1, and Z_n−1) may be encoded using six words of the combined data 1900 (e.g., embedded within six audio samples of the audio data 1910), and the checksum may be separated into two bytes (e.g., Checksum MSB and Checksum LSB) and encoded in two audio samples following the final accelerometer sample (e.g., Mic2-SampleX+1 containing Z_n−1 LSB). Thus, in the combined data 1900 example illustrated in FIG. 19, the accelerometer encoding technique 2030 may encode three accelerometer samples (n=3) using 24 audio samples or may encode four accelerometer samples (n=4) using 30 audio samples, although the disclosure is not limited thereto.

In the example illustrated in FIG. 19, the device 110 may encode either three accelerometer samples or four accelerometer samples for each 8 ms portion of the audio data 1910 (e.g., individual audio frame). However, the disclosure is not limited thereto, and depending on the audio pipeline and other parameters, the combined data 1900 may be capable of encoding up to ten or more accelerometer samples for each audio frame without departing from the disclosure. For example, the example described above corresponds to the accelerometer samples having a first sampling rate (e.g., 400 Hz), which results in an average of 3.2 accelerometer samples within a single audio frame (e.g., 8 ms portion of the audio data 1910), such that an individual audio frame is associated with either 3 accelerometer samples or 4 accelerometer samples. However, modifying a length of the audio frame and/or using a second sampling rate for the accelerometer samples would vary the number of accelerometer samples accordingly. Thus, a second sampling rate (e.g., 800 Hz) would result in an average of 6.4 accelerometer samples within a single audio frame, such that an individual audio frame is associated with either 6 accelerometer samples or 7 accelerometer samples without departing from the disclosure.

As illustrated in FIG. 20B, the device 110 may use the accelerometer encoding technique 2030 to encode the accelerometer data 1920 in the combined data 1900. For example, the device 110 may encode the first portion of the accelerometer data 1920 (e.g., accelerometer samples A1-A3) using the first 24 audio samples of the first portion of the audio data 1910 (e.g., 0-8 ms). However, while the first 24 audio samples of the first portion of the combined data 1900 may use all 32 bits of data (e.g., 24 bits representing the audio data 1910 and 8 bits representing the accelerometer data 1920), the remaining audio samples of the first portion of the combined data 1900 may only use 24 bits of data (e.g., 24 bits representing the audio data 1910, with the remaining 8 bits being blank). Similarly, the device 110 may encode the fifth portion of the accelerometer data 1920 (e.g., accelerometer samples A13-A16) using the first 30 audio samples of the fifth portion of the audio data 1910 (e.g., 32-40 ms). However, while the first 30 audio samples of the fifth portion of the combined data 1900 may use all 32 bits of data (e.g., 24 bits representing the audio data 1910 and 8 bits representing the accelerometer data 1920), the remaining audio samples of the fifth portion of the combined data 1900 may only use 24 bits of data (e.g., 24 bits representing the audio data 1910, with the remaining 8 bits being blank). Thus, FIG. 20B does not illustrate that some of the audio samples included in the combined data 1900 are identical to the audio samples represented in the audio data 1910 and do not include a portion of the accelerometer data 1920.

Figure 20C:
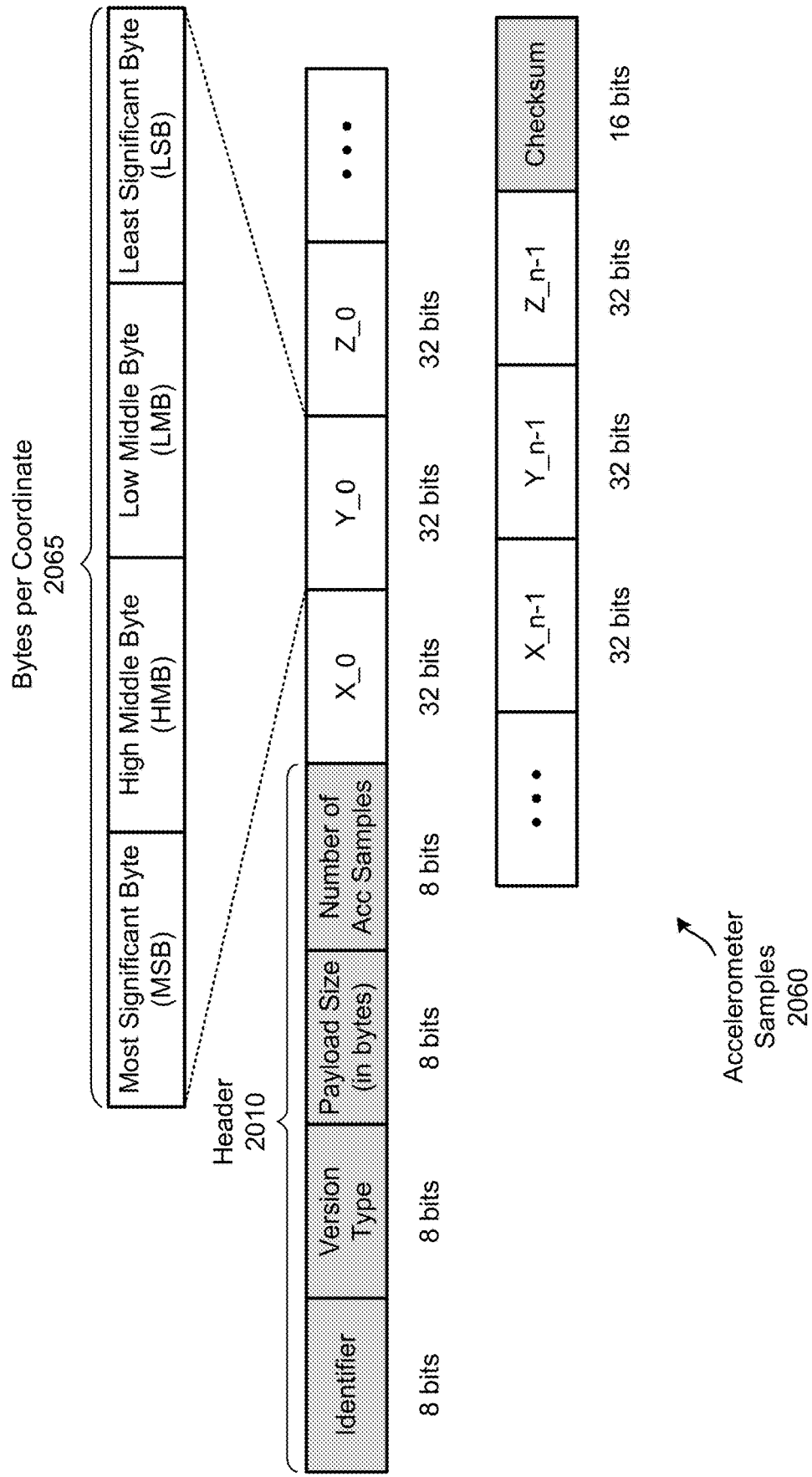

While FIG. 20A illustrates an example of a first accelerometer data scheme 2000 that includes accelerometer samples 2020 comprising two bytes per coordinate 2025 (e.g., MSB and LSB), the disclosure is not limited thereto. As illustrated in FIG. 20C, in some examples the device 110 may use a second accelerometer data scheme 2050 that includes accelerometer samples 2060 comprising four bytes per coordinate 2065 (e.g., MSB, HMB, LMB, and LSB), along with a checksum (e.g., 16 bits, although the disclosure is not limited thereto) configured to check the validity of the payload. Thus, the payload may correspond to a sequence of accelerometer samples 2060 broken into segments of 32 bits (e.g., four bytes), with a single accelerometer sample being represented using three segments (e.g., twelve bytes, comprising four bytes for each of the three directional axis included in the motion data). For example, FIG. 20C illustrates an example in which a first accelerometer sample (e.g., Sample 0) may be represented using four bytes for the x-axis (e.g., X_0), four bytes for the y-axis (e.g., Y_0), and four bytes for the z-axis (e.g., Z_0), for a total of three segments or twelve bytes. A second accelerometer sample (e.g., Sample 1) would be represented using an additional three segments (e.g., twelve bytes), and so on until an nth accelerometer sample (e.g., Sample n−1). In addition, the payload size includes the checksum (e.g., 16 bits), although the disclosure is not limited thereto and the checksum may be larger or smaller without departing from the disclosure.

Using the accelerometer data scheme 2050, the device 110 may generate accelerometer data corresponding to any number of accelerometer samples. For example, the first portion of the accelerometer data 1920 representing three accelerometer samples (e.g., A1-A3, such that n=3) would correspond to a payload of 38 bytes (e.g., three segments of four bytes for each of the three accelerometer samples and a two-byte checksum) and a total size of 42 bytes, while the fifth portion of the accelerometer data 1920 representing four separate accelerometer samples (e.g., A13-A16, such that n=4) would correspond to a payload of 50 bytes (e.g., three segments of four bytes for each of the four accelerometer samples, followed by a two-bye checksum) and a total size of 54 bytes, although the disclosure is not limited thereto. While FIG. 19 illustrates an example of the device 110 encoding three accelerometer samples or four accelerometer samples for each 8 ms portion of the audio data 1910 (e.g., audio frame), the disclosure is not limited thereto and the number of accelerometer samples may vary without departing from the disclosure.

As illustrated in FIG. 20D, the device 110 may use an accelerometer encoding technique 2080 that separates the accelerometer data 1920 into 8 bit segments and encodes these segments in the top 8 bits of the 32 bit container used by the audio data 1910. For example, the device 110 may encode an individual audio sample, which is represented using 24 bits of the 32 bit container, with a unique 8 bit segment of the accelerometer data 1920. This technique is similar to the technique described above with regard to FIG. 20B, except that the combined data 1900 embeds a single coordinate using four words instead of two words, as illustrated in FIG. 20D. While FIG. 20D illustrates an example in which the number of microphones 112 is equal to the number of bytes per coordinate, the disclosure is not limited thereto and the number of microphones 112 may vary without departing from the disclosure. For example, the device 110 may include any number of microphones, such as two microphones or six or more microphones, without departing from the disclosure.

FIG. 21 illustrates an example component diagram for embedding accelerometer data while performing tap detection according to embodiments of the present disclosure. As illustrated in FIG. 21, the DSP component 116 may include a synchronization component (e.g., SYNC) 2110 and the encoder component 1820 and may be configured to perform accelerometer synchronization 2100. For example, the synchronization component 2110 may receive the audio data 1802 from the two or more microphones 112. Once an entire audio frame and/or a desired portion of the audio data 1802 is received (e.g., 8 ms of audio data), the synchronization component 2110 may pull a portion of the accelerometer data 1815 that corresponds to the audio frame from the accelerometer component 1810. For example, the synchronization component 2110 may send a pull signal 2115 (e.g., request for the accelerometer data 1815) to the accelerometer component 1810 and, in response to the pull signal 2115, the accelerometer component 1810 may send a portion of the accelerometer data 1815 corresponding to the audio frame (e.g., accumulated during the 8 ms associated with the audio frame).

To do this, the accelerometer component 1810 may include a first-in, first-out (FIFO) buffer component 2120 configured to store the accelerometer data 1815 on a first-in, first-out basis. For example, the FIFO buffer component 2120 may receive three accelerometer samples prior to the accelerometer component 1810 receiving a first pull signal 2115a. Upon receiving the first pull signal 2115a, the FIFO buffer component 2120 may send a first portion of the accelerometer data 1815 currently stored in the FIFO buffer component 2120 (e.g., three accelerometer samples) to the synchronization component 2110. Subsequently, the FIFO buffer component 2120 may receive four additional accelerometer samples before receiving a second pull signal 2115b. Upon receiving the second pull signal 2115b, the FIFO buffer component 2120 may send a second portion of the accelerometer data 1815 currently stored in the FIFO buffer component 2120 (e.g., four additional accelerometer samples) to the synchronization component 2110.

In this example, the first portion of the accelerometer data 1815 (e.g., three accelerometer samples) may correspond to a first audio frame and the second portion of the accelerometer data 1815 (e.g., four additional accelerometer samples) may correspond to a second audio frame. Thus, the FIFO buffer component 2120 may store 3-4 accelerometer samples before receiving the pull signal 2115, although the disclosure is not limited thereto.

The synchronization component 2110 may send a synchronized portion of the accelerometer data 1815 and the audio data 1802 to the encoder component 1820 to generate the mixed data 1825. For example, the synchronization component 2110 may send the first audio frame of the audio data 1802 along with the first portion of the accelerometer data 1815 (e.g., three accelerometer samples) to the encoder component 1820 at a first time. Using the accelerometer encoding technique 2030 described above and illustrated in FIG. 20B, the encoder component 1820 may encode the first portion of the accelerometer data 1815 and the first audio frame of the audio data 1802 to generate a first audio frame of the mixed data 1825. Similarly, the synchronization component 2110 may send the second audio frame of the audio data 1802 along with the second portion of the accelerometer data 1815 (e.g., four additional accelerometer samples) to the encoder component 1820 at a second time. Using the accelerometer encoding technique 2030, the encoder component 1820 may encode the second portion of the accelerometer data 1815 and the second audio frame of the audio data 1802 to generate a second audio frame of the mixed data 1825.

Using the synchronization component 2110 and the encoder component 1820, the DSP component 116 may generate the mixed data 1825, as described in greater detail above. After generating the mixed data 1825, the encoder component 1820 may send the mixed data 1825 to the circular buffer 1830, which may store the mixed data 1825 until the CPU component 118 retrieves and/or processes the mixed data 1825 or the circular buffer component 1830 overwrites the mixed data 1825. Due to a communication path between the accelerometer component 1810 and the DSP component 116, the synchronization component 2110 may experience a delay between sending the pull signal 2115 and receiving the accelerometer data 1815. However, this may be a fixed delay, and the CPU component 118 may be configured to compensate for this fixed delay, such that the accelerometer data 1815 is virtually synchronized with the audio data 1802.

Figure 22A:
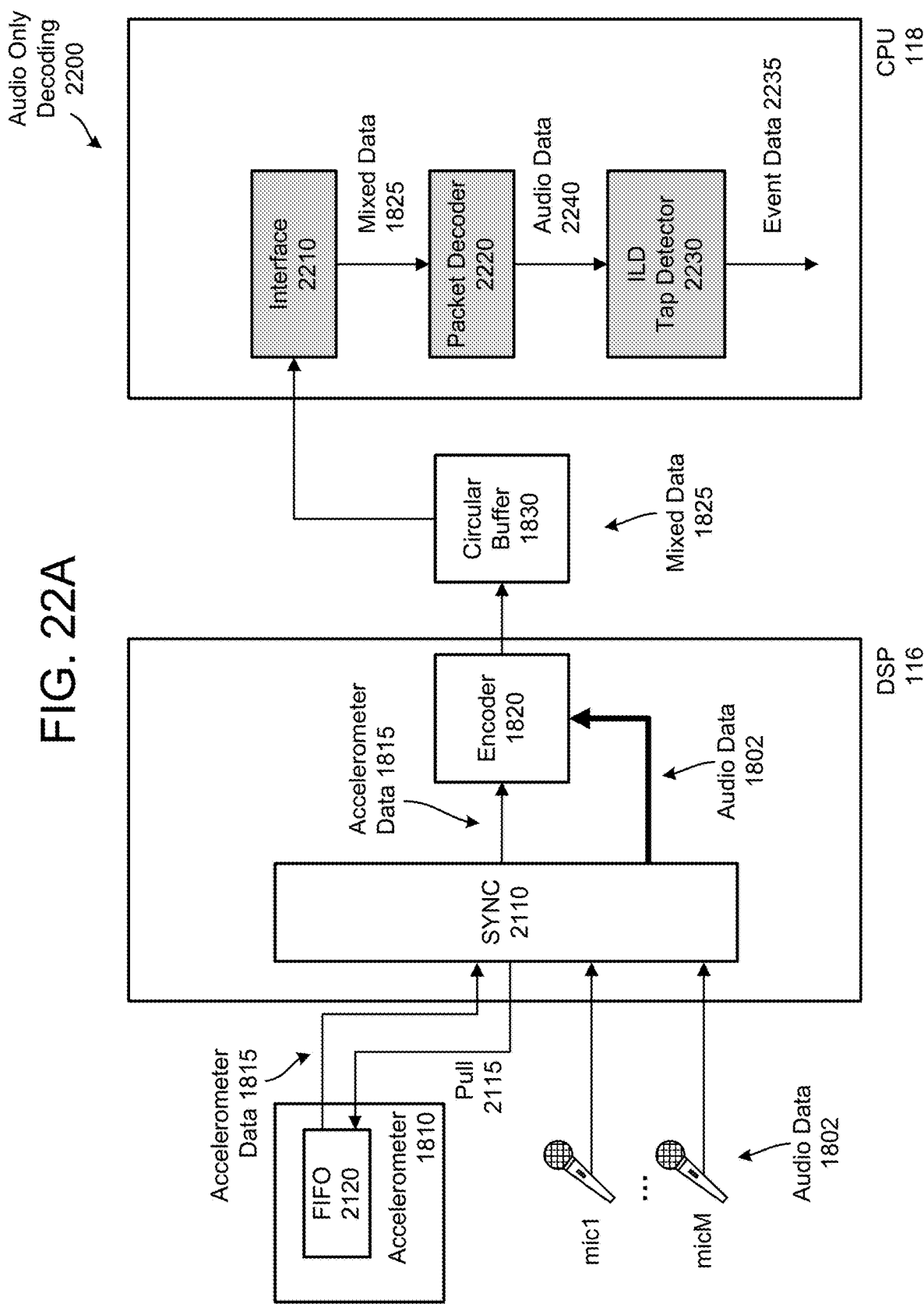
FIGS. 22A-22B illustrate example component diagrams for performing tap detection with and without decoding accelerometer data according to embodiments of the present disclosure.
Figure 22B:
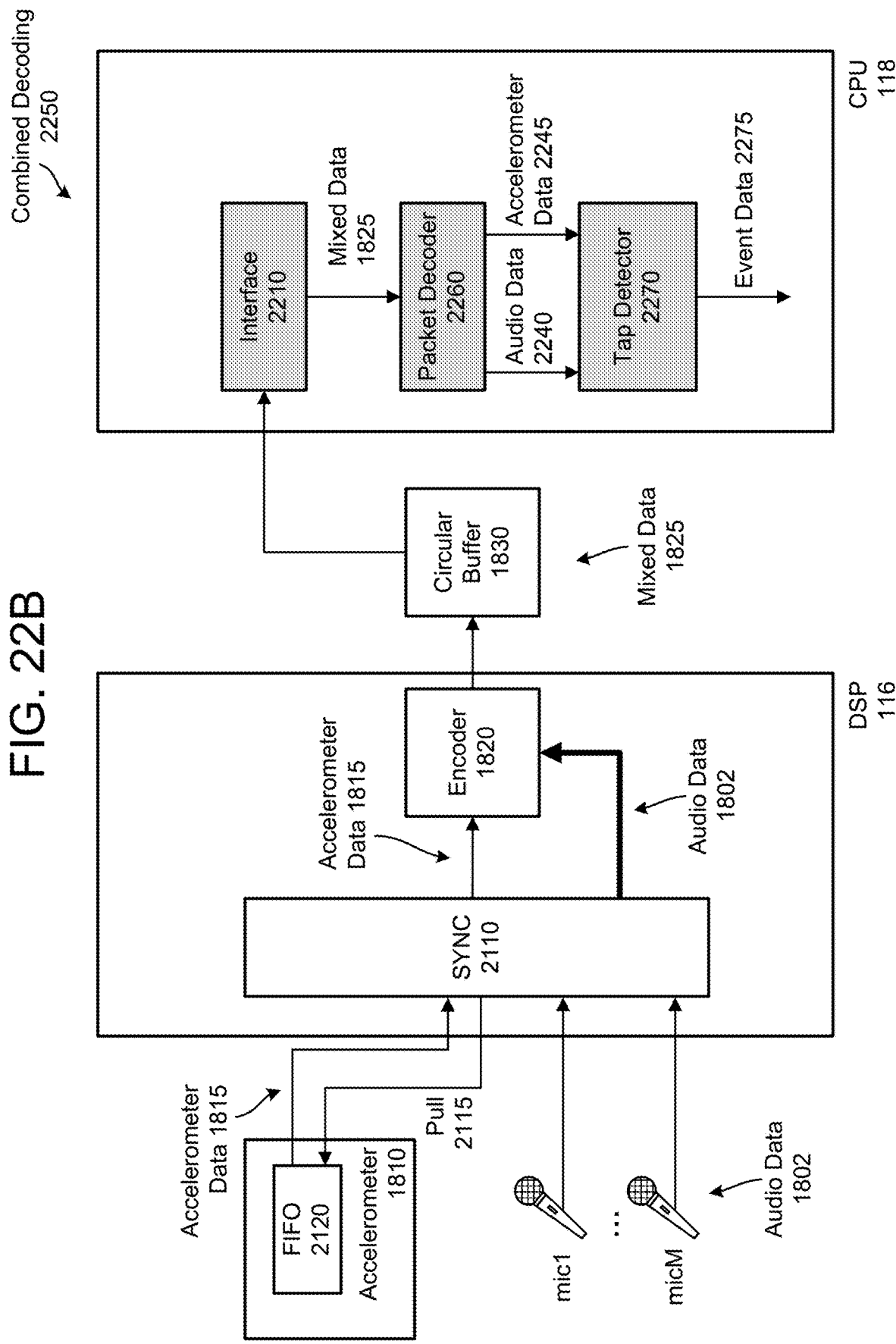

FIGS. 22A-22B illustrate example component diagrams for performing tap detection with and without decoding accelerometer data according to embodiments of the present disclosure. In some examples, the CPU component 118 may perform audio only decoding 2200 to perform tap detection as described above. For example, the CPU component 118 may include an interface component 2210 (e.g., hardware abstraction layer (HAL)), a first packet decoder component 2220, and an ILD tap detector component 2230 configured to generate event data 2235 indicating whether a tap event is detected.

As illustrated in FIG. 22A, during audio only decoding 2200 the circular buffer 1830 may send the mixed data 1825 to the interface component 2210 and the interface component 2210 may send the mixed data 1825 to the first packet decoder 2220. In this implementation, the CPU component 118 only performs tap detection using audio data. For example, the first packet decoder component 2220 may process the mixed data 1825 to generate audio data 2240 and the ILD tap detector component 2230 may process the audio data 2240 to generate the event data 2235.

As illustrated in FIG. 22A, the first packet decoder component 2220 generates the audio data 2240 using the mixed data 1825. For example, the first packet decoder component 2220 may modify the mixed data 1825 to maintain the audio data 1802 while removing (e.g., discard, erase, overwrite, etc.) the accelerometer data 1815, such that the audio data 2240 corresponds to the audio data 1802. Thus, in some examples the audio data 2240 represents and/or is an approximation of the audio data 1802 without departing from the disclosure. However, the disclosure is not limited thereto, and in other examples there may be differences between the audio data 1802 and the audio data 2240 without departing from the disclosure.

While the three least significant bytes of the mixed data 1825 represents the audio data 1802, output audio generated using the mixed data 1825 would include distortion or other audible sounds caused by the accelerometer data 1815 represented in the most significant byte. In some examples, the first packet decoder component 2220 may generate the audio data 2240 by shifting the three least significant bytes (e.g., HMB, LMB, and LSB), which represent the audio data 1802 embedded in the mixed data 1825, to become the three most significant bytes (e.g., MSB, HMB, and LMB, with the LSB being blank), although the disclosure is not limited thereto. Additionally or alternatively, the first packet decoder component 2220 may generate the audio data 2240 by storing blank values in the most significant byte (e.g., MSB), effectively removing the accelerometer data 1815.

Additionally or alternatively, while FIG. 22A illustrates an example in which the first packet decoder component 2220 processes the mixed data 1825 to generate the audio data 2240, the disclosure is not limited thereto and in some examples the interface component 2210 may send the mixed data 1825 to the ILD tap detector component 2230 without departing from the disclosure. For example, the ILD tap detector component 2230 may be configured to process only the audio data portion (e.g., three least significant bytes) of the mixed data 1825, although the disclosure is not limited thereto.

In other examples, the CPU component 118 may perform combined decoding 2250 to perform tap detection without departing from the disclosure, as illustrated in FIG. 22B. For example, the CPU component 118 may include the interface component 2210, a second packet decoder component 2260, and a tap detector component 2270 configured to generate event data 2275 indicating whether a tap event is detected.

As illustrated in FIG. 22B, during combined decoding 2250 the circular buffer 1830 may send the mixed data 1825 to the interface component 2210 and the interface component 2210 may send the mixed data 1825 to the second packet decoder 2260. In this implementation, the CPU component 118 performs tap detection using a combination of audio data and motion data. For example, the second packet decoder component 2260 may process the mixed data 1825 to generate the audio data 2240 and accelerometer data 2245 and the tap detector component 2270 may process the audio data 2240 and the accelerometer data 2245 to generate the event data 2275.

FIG. 22B illustrates an example in which the second packet decoder component 2260 generates the audio data 2240 and the accelerometer data 2245, conceptually illustrating that the tap detector component 2270 performs tap detection based on the audio data 1802 and the accelerometer data 1815 received by the DSP component 116. Thus, in some examples the audio data 2240 represents and/or is an approximation of the audio data 1802 and/or the accelerometer data 2245 represents and/or is an approximation of the accelerometer data 1815 without departing from the disclosure. However, the disclosure is not limited thereto, and there may be differences between the audio data 2240 and the audio data 1802 and/or the accelerometer data 2245 and the accelerometer data 1815 without departing from the disclosure.

Additionally or alternatively, while FIG. 22B illustrates an example in which the second packet decoder component 2260 processes the mixed data 1825 to generate the audio data 2240 and the accelerometer data 2245, the disclosure is not limited thereto and in some examples the interface component 2210 may send the mixed data 1825 to the tap detector component 2270 without departing from the disclosure.

FIG. 23 illustrates examples of decoding mixed data according to embodiments of the present disclosure. As illustrated in FIG. 23, during audio only decoding 2300 the first packet decoder component 2220 may receive mixed data 1825 including audio bits 2310 (e.g., bits 0-23) and accelerometer bits 2315 (e.g., bits 24-31). For example, the mixed data 1825 may correspond to up to 32 bits of information representing both the audio data 1802 and the accelerometer data 1815. However, the first packet decoder component 2220 may process the mixed data 1825 to generate the audio data 2240 including audio bits 2320 (e.g., bits 8-31) and blank bits 2325 (e.g., bits 0-7). For example, the audio bits 2320 may correspond to only 24 bits of information that represent the audio data 2240. Thus, the first packet decoder component 2220 may discard the accelerometer bits 2315 corresponding to the accelerometer data 1815 without departing from the disclosure.

In contrast, during combined decoding 2350 the second packet decoder component 2260 may also receive the mixed data 1825 and may generate the audio data 2240 and the accelerometer data 2245. As illustrated in combined decoding 2350, the second packet decoder component 2260 may receive the mixed data 1825 including the audio bits 2310 (e.g., bits 0-23) and the accelerometer bits 2315 (e.g., bits 24-31). For example, the mixed data 1825 may correspond to up to 32 bits of information representing both the audio data 1802 and the accelerometer data 1815. Similar to the first packet decoder component 2220, the second packet decoder component 2260 may process the mixed data 1825 to generate the audio data 2240 including the audio bits 2320 (e.g., bits 8-31) along with the blank bits 2325 (e.g., bits 0-7). For example, the audio bits 2320 may correspond to 24 bits of information that correspond to the audio data 1802. In addition, the second packet decoder component 2260 may process the mixed data 1825 to generate the accelerometer data 2245 including accelerometer bits 2360 (e.g., bits 0-15). For example, the accelerometer bits 2360 may correspond to 16 bits of information that represent the accelerometer data 1815. As the mixed data 1825 only stores 8 bits of information in each word (e.g., sample), the second packet decoder component 2260 may use two words of the mixed data 1825 to generate a single word of the accelerometer data 2245. For example, a first portion of the accelerometer bits 2360 (e.g., bits 8-15) may correspond to first accelerometer bits 2315*a* embedded in a first word of the mixed data 1825, while a second portion of the accelerometer bits 2360 (e.g., bits 0-7) may correspond to second accelerometer bits 2315*b* embedded in a second word of the mixed data 1825.

FIGS. 24A-24C illustrate examples of performing tap detection using accelerometer data according to embodiments of the present disclosure. As illustrated in FIG. 24A, in some examples the device 110 may include a first tap detector component 2270*a* that performs cascaded tap detection 2400 to detect a tap event without departing from the disclosure. For example, the device 110 may process the audio data 2240 using an audio tap detector component 2410 to generate first event data 2415. The first event data 2415 may indicate that a potential tap event is not detected, in which case the device 110 may stop additional processing, or the first event data 2415 may indicate that a potential tap event is detected.

When the first event data 2415 indicates that a potential tap event is detected, the device 110 may process the accelerometer data 2245 using an accelerometer tap detector component 2420 to generate second event data 2430. For example, the device 110 may use the accelerometer data 2245 to confirm that the potential tap event corresponds to a real tap event (e.g., actual movement of the device 110 occurred) or to reject the potential tap event as a false positive.

As illustrated in FIG. 24B, in other examples the device 110 may include a second tap detector component 2270*b* that performs combined tap detection 2430 to detect a tap event without departing from the disclosure. For example, the device 110 may process the audio data 2240 and the accelerometer data 2245 using a pre-processing block component 2440 to generate processed input data 2445 and may process the processed input data 2445 using a convolutional neural network (CNN) tap detector 2450 to generate event data 2455. The event data 2455 may indicate whether a tap event is not detected (e.g., no tap event occurred) or a tap event is detected (e.g., actual movement of the device 110 occurred) based on a combination of the audio data 2240 and the accelerometer data 2245. For example, the CNN tap detector component 2450 may be trained to distinguish between false positives and true tap events based on minor variations in the accelerometer data 2245, although the disclosure is not limited thereto.

As illustrated in FIG. 24C, in other examples the device 110 may include a third tap detector component 2270*c* that performs dual neural network tap detection 2460 to detect a tap event without departing from the disclosure. For example, the device 110 may process the accelerometer data 2245 using a pre-processing block component 2470 to generate processed accelerometer data 2475. In addition, the device 110 may input the audio data 2240 to a pre-processing neural network 2480 (e.g., trained model) and may process the audio data 2240 using the pre-processing neural network 2480 to generate audio feature data 2485. For example, the pre-processing neural network 2480 may be configured to learn optimal audio features on which to perform tap detection and may process the audio data 2240 to generate the audio feature data 2485 representing the optimal audio features.

The device 110 may process the processed accelerometer data 2475 and the audio feature data 2485 using a convolutional neural network (CNN) tap detector 2490 to generate event data 2495. The event data 2495 may indicate whether a tap event is not detected (e.g., no tap event occurred) or a tap event is detected (e.g., actual movement of the device 110 occurred) based on a combination of the processed accelerometer data 2475 and the audio feature data 2485. For example, the CNN tap detector component 2490 may be trained to distinguish between false positives and true tap events based on minor variations in the accelerometer data 2245, although the disclosure is not limited thereto.

Figure 25:
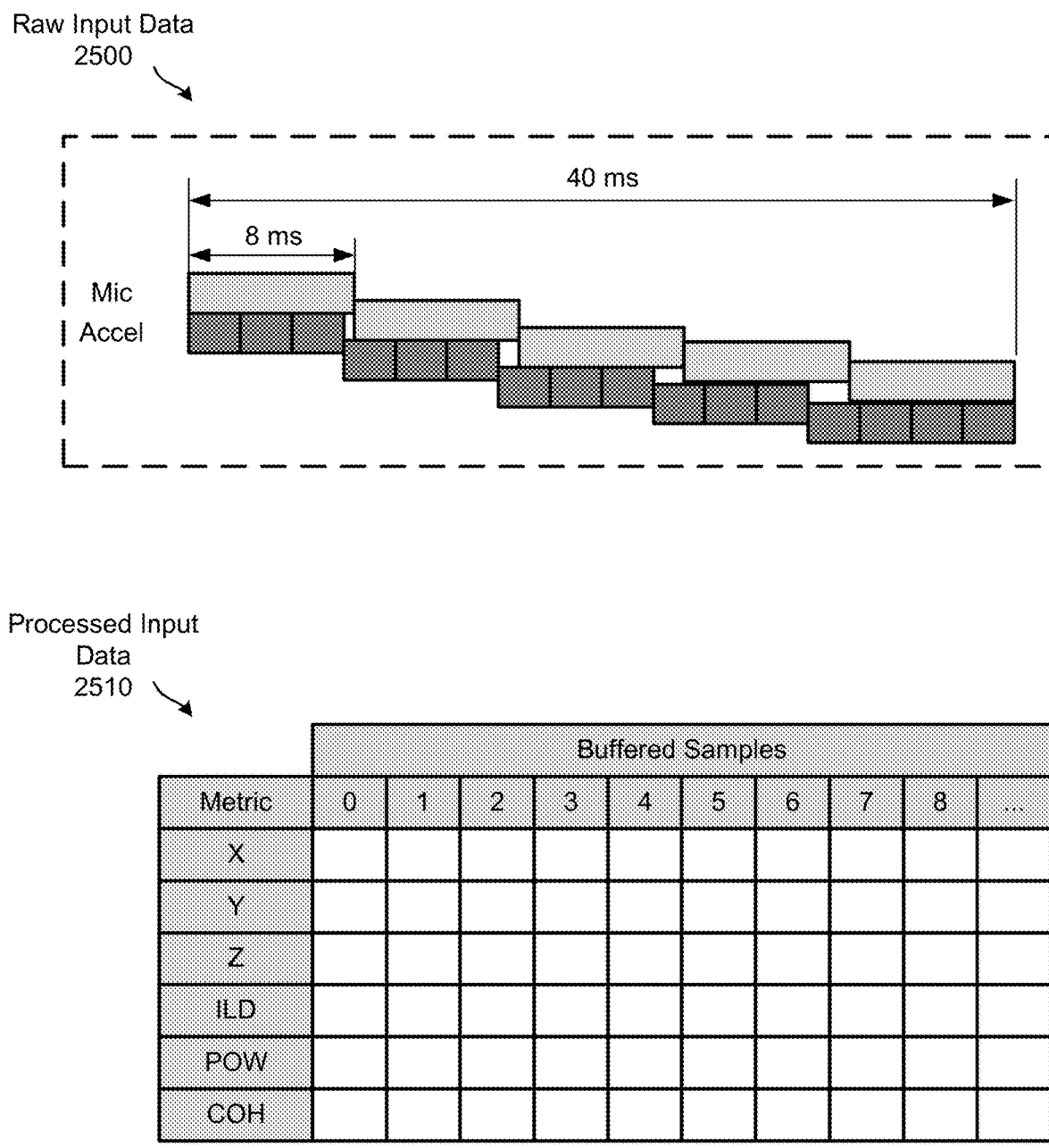
FIG. 25 illustrates an example of processing input data to perform tap detection according to embodiments of the present disclosure.

FIG. 25 illustrates an example of processing input data to perform tap detection according to embodiments of the present disclosure. As illustrated in FIG. 25, the pre-processing block component 2440 may receive raw input data 2500 that includes the audio data 2440, which corresponds to the audio data 1802 generated by the microphones 112, and the accelerometer data 2445, which corresponds to the accelerometer data 1815 generated by the accelerometer component 1810.

As described above, clocks between the microphones 112 and the accelerometer component 1810 may not be synchronized, resulting in the accelerometer data 1815 being offset slightly from the audio data 1802. As a result, individual audio frames of the mixed data 1825 may include a varying number of accelerometer samples (e.g., 3-4 samples). This is illustrated in FIG. 25 as four segments of the microphone data (e.g., four 8 ms portions of the audio data 2440/1802) corresponding to 3 accelerometer samples of the accelerometer data 1815/2445 and then a fifth segment of the microphone data (e.g., 8 ms portion of the audio data 1802/2440) corresponding to four accelerometer samples of the accelerometer data 1815/2445.

In order to process the audio data 2240 and the accelerometer data 2245 using the CNN tap detector component 2470, the device 110 may generate an aligned matrix of accelerometer samples and audio metrics, where each buffered sample of the aligned matrix represents 2.5 ms of features. For example, the device 110 may interpolate the accelerometer data 2245 to add additional accelerometer values as needed, although the disclosure is not limited thereto.

As illustrated in FIG. 25, the device 110 may generate processed input data 2510 including a plurality of buffered samples (e.g., 0-8, etc.) corresponding to a first duration of time (e.g., 2.5 ms). For each buffered sample, the device 110 may generate a plurality of feature values. For example, the device 110 may generate an x-coordinate value corresponding to the x-axis of the accelerometer data 2245, a y-coordinate value corresponding to the y-axis of the accelerometer data 2245, a z-coordinate value corresponding to the z-axis of the accelerometer data 2245, an inter-channel level difference (ILD) value corresponding to a difference between a first microphone value associated with a first microphone and a second microphone value associated with a second microphone, a power value (POW) representing a root-mean-squared (RMS) power value, a coherence value (COH) representing a coherence between the first microphone and the second microphone, and/or the like, although the disclosure is not limited thereto.

Figure 26:
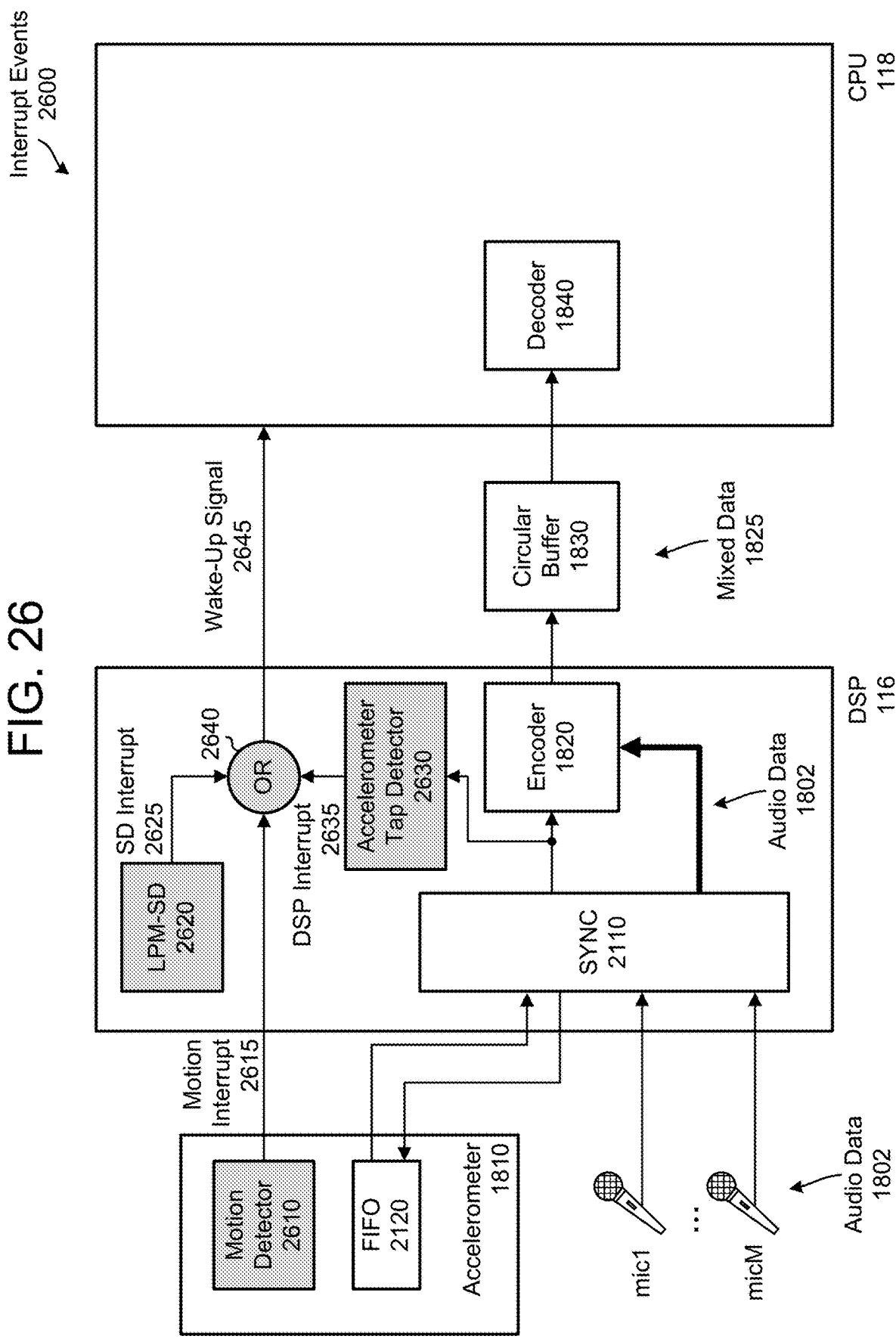
FIG. 26 illustrates an example component diagram for generating an interrupt event according to embodiments of the present disclosure.

FIG. 26 illustrates an example component diagram for generating an interrupt event according to embodiments of the present disclosure. As illustrated in FIG. 26, the device 110 may generate interrupt events 2600 that wake the CPU component 118 and cause the CPU component 118 to transition from operating in a first mode (e.g., low power mode) to operating in a second mode (e.g., active mode). During the first mode, the device 110 may generate and store the mixed data 1825 in the circular buffer component 1830, as described in greater detail above, but may not process the mixed data 1825 and/or perform tap detection.

In order to process the mixed data 1825 and perform tap detection, the device 110 may generate a wake-up signal or interrupt event that causes the CPU component 118 to operate in the second mode and process the mixed data 1825 stored in the circular buffer component 1830. As illustrated in FIG. 26, the device 110 may generate an interrupt event using three different techniques, although each individual technique is optional.

In some examples, the accelerometer component 1810 may include a motion detector component 2610 that is configured to detect motion and generate a motion interrupt 2615 when motion is detected. For example, the motion detector 2610 may be configured to detect motion using various techniques without departing from the disclosure.

In other examples, the DSP component 116 may include a low-power mode sound detector (LPM-SD) component 2620 configured to detect an audible sound and generate a sound detector (SD) interrupt 2625. For example, the LPM-SD component 2620 may detect any audible sound above a threshold value and generate the SD interrupt 2625. However, the disclosure is not limited thereto, and in some examples the LPM-SD component 2620 may be configured to detect particular acoustic events without departing from the disclosure.

In some examples, the DSP component 116 may process the accelerometer data 1815 using an accelerometer tap detector component 2630 to generate a DSP interrupt 2635. This is similar to the motion interrupt 2615, but instead of being generated by the accelerometer component 1810, the DSP interrupt 2635 is generated by the DSP component 116 in response to the accelerometer data 1815. For example, the accelerometer tap detector 2630 may generate the DSP interrupt 2635 when a particular directional axis (e.g., z-coordinate axis) of the accelerometer data 1815 exceeds a threshold value, although the disclosure is not limited thereto.

While FIG. 26 illustrates multiple examples of generating interrupt events, the disclosure is not limited thereto and the device 110 may generate interrupt events using one or more of the examples illustrated in FIG. 26, and/or generate additional interrupt events not illustrated in FIG. 26, without departing from the disclosure. For example, the DSP component 116 may include an audio tap detector component (not illustrated) that calculates inter-channel level difference (ILD) values and may generate an ILD interrupt without departing from the disclosure.

As illustrated in FIG. 26, the DSP component 116 may include an OR component 2640 configured to receive the motion interrupt 2615, the SD interrupt 2625, the DSP interrupt 2635, and/or other interrupt events and generate a wake-up signal 2645 to send to the CPU component 118. For example, the wake-up signal 2645 may cause the CPU component 118 to transition from operating in the first mode to operating in the second mode in order to perform tap detection on the mixed data 1825 stored in the circular buffer component 1830.

Figure 27:
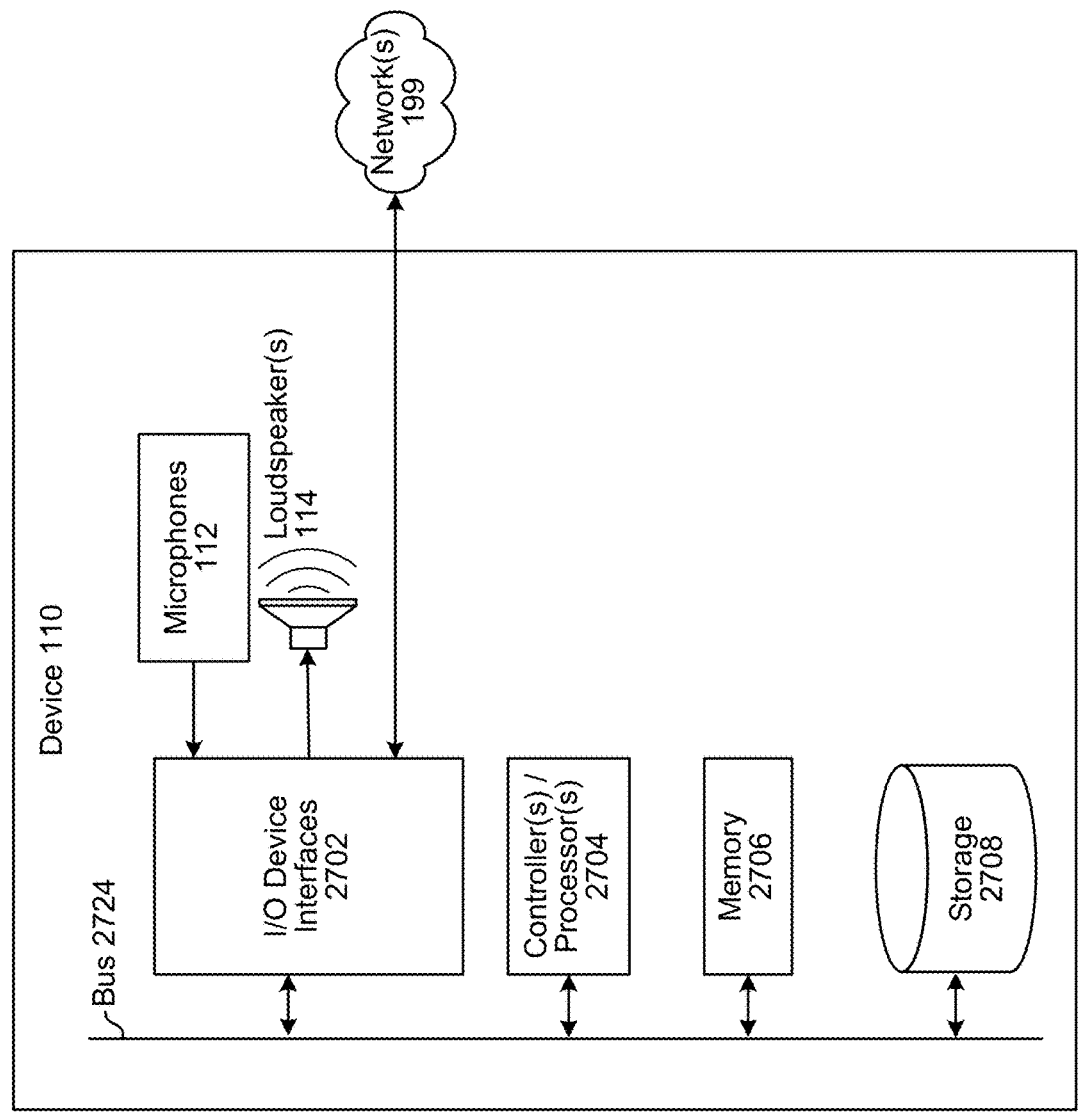
FIG. 27 is a block diagram conceptually illustrating example components of a system according to embodiments of the present disclosure.

FIG. 27 is a block diagram conceptually illustrating example components of a system \ according to embodiments of the present disclosure. In operation, the system 100 may include computer-readable and computer-executable instructions that reside on the device 110, as will be discussed further below.

The device 110 may include one or more audio capture device(s), such as a microphone array which may include one or more microphones 112. The audio capture device(s) may be integrated into a single device or may be separate. The device 110 may also include an audio output device for producing sound, such as loudspeaker(s) 114. The audio output device may be integrated into a single device or may be separate.

As illustrated in FIG. 27, the device 110 may include an address/data bus 2724 for conveying data among components of the device 110. Each component within the device 110 may also be directly connected to other components in addition to (or instead of) being connected to other components across the bus 2724.

The device 110 may include one or more controllers/processors 2704, which may each include a central processing unit (CPU) for processing data and computer-readable instructions, and a memory 2706 for storing data and instructions. The memory 2706 may include volatile random access memory (RAM), non-volatile read only memory (ROM), non-volatile magnetoresistive (MRAM) and/or other types of memory. The device 110 may also include a data storage component 2708, for storing data and controller/processor-executable instructions (e.g., instructions to perform operations discussed herein). The data storage component 2708 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 2702.

The device 110 includes input/output device interfaces 2702. A variety of components may be connected through the input/output device interfaces 2702. For example, the device 110 may include one or more microphone(s) 112 (e.g., a plurality of microphone(s) 112 in a microphone array), one or more loudspeaker(s) 114, and/or a media source such as a digital media player (not illustrated) that connect through the input/output device interfaces 2702, although the disclosure is not limited thereto. Instead, the number of microphone(s) 112 and/or the number of loudspeaker(s) 114 may vary without departing from the disclosure. In some examples, the microphone(s) 112 and/or loudspeaker(s) 114 may be external to the device 110, although the disclosure is not limited thereto. The input/output interfaces 2702 may include A/D converters (not illustrated) and/or D/A converters (not illustrated).

The input/output device interfaces 2702 may also include an interface for an external peripheral device connection such as universal serial bus (USB), FireWire, Thunderbolt, Ethernet port or other connection protocol that may connect to network(s) 199.

The input/output device interfaces 2702 may be configured to operate with network(s) 199, for example via an Ethernet port, a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The device 110 may include components that may comprise processor-executable instructions stored in storage 2708 to be executed by controller(s)/processor(s) 2704 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Computer instructions for operating the device 110 and its various components may be executed by the controller(s)/processor(s) 2704, using the memory 2706 as temporary "working" storage at runtime. The computer instructions may be stored in a non-transitory manner in non-volatile memory 2706, storage 2708, or an external device. Alternatively, some or all of the executable instructions may be embedded in hardware or firmware in addition to or instead of software.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

As illustrated in FIG. 28, the device 110 may correspond to multiple different designs without departing from the disclosure. For example, FIG. 28 illustrates a first speech-detection device 110a having a first microphone array (e.g., six microphones), a second speech-detection device 110b having a second microphone array (e.g., two microphones), a first display device 110c, a headless device 110d, a tablet computer 110e, a smart watch 110f, and a smart phone 110g. Each of these devices 110 may apply the tap detection algorithm described above to perform tap detection and detect a physical interaction with the device without departing from the disclosure. While FIG. 28 illustrates specific examples of devices 110, the disclosure is not limited thereto and the device 110 may include any number of microphones without departing from the disclosure.

Additionally or alternatively, multiple devices (110a-110g) may contain components of the system, and the devices may be connected over a network(s) 199. The network(s) 199 may include a local or private network or may include a wide network such as the Internet. Devices may be connected to the network(s) 199 through either wired or wireless connections without departing from the disclosure. For example, some of the devices 110 may be connected to the network(s) 199 through a wireless service provider, over a WiFi or cellular network connection, and/or the like, although the disclosure is not limited thereto.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the fixed beamformer, acoustic echo canceller (AEC), adaptive noise canceller (ANC) unit, residual echo suppression (RES), double-talk detector, etc. may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
receiving, by a device, first data including a first portion representing first audio samples corresponding to a first microphone, a second portion representing second audio samples corresponding to a second microphone, and a third portion representing first motion samples generated by a motion sensor;
determining, by the device, a first power value corresponding to the first audio samples;
determining, by the device, a second power value corresponding to the second audio samples;
generating, using the third portion of the first data, motion data representing the first motion samples;

detecting, by the device, a physical interaction with the device based on the first power value, the second power value, and the motion data; and performing, by the device, a first action in response to detecting the physical interaction.

2. The computer-implemented method of claim 1, wherein detecting the physical interaction with the device further comprises:
- determining a first ratio value between the first power value and the second power value;
- determining that the first ratio value satisfies a first condition, the first condition indicating a potential interaction with the device; and
- determining that the motion data satisfies a second condition, the second condition indicating motion of the device.

3. The computer-implemented method of claim 1, wherein detecting the physical interaction with the device further comprises:
- processing, by a first model, the first power value, the second power value, and the motion data to generate event data; and
- determining that the event data indicates the physical interaction with the device.

4. The computer-implemented method of claim 1, further comprising:
- generating, using the first portion of the first data, a first plurality of power values including the first power value;
- generating, using the second portion of the first data, a second plurality of power values including the second power value; and
- generating, using the first motion samples, second motion samples that are aligned with the first plurality of power values, wherein detecting the physical interaction with the device further comprises:
- detecting the physical interaction with the device based on the first plurality of power values, the second plurality of power values, and the second motion samples.

5. The computer-implemented method of claim 1, further comprising:
- generating, using a first segment of the first data having a first duration of time, a first segment of first audio data representing a first plurality of the first audio samples, the first segment of the first audio data including a first number of samples;
- generating, using the first segment of the first data, a first segment of second audio data representing a second plurality of the second audio samples, the first segment of the second audio data including the first number of samples;
- generating, using the first segment of the first data, a first segment of the motion data representing a third plurality of the first motion samples, the first segment of the motion data including a second number of samples;
- generating, using a second segment of the first data having the first duration of time, a second segment of the first audio data representing a fourth plurality of the first audio samples, the second segment of the first audio data including the first number of samples; and
- generating, using the second segment of the first data, a second segment of the second audio data representing a fifth plurality of the second audio samples, the second segment of the second audio data including the first number of samples; and
- generating, using the second segment of the first data, a second segment of the motion data representing a sixth plurality of the first motion samples, the second segment of the motion data including a third number of samples.

6. The computer-implemented method of claim 1, wherein generating the motion data further comprises:
- generating, using a first segment of the first data having a first duration of time, a first segment of the motion data including a first number of the first motion samples; and
- generating, using a second segment of the first data having the first duration of time, a second segment of the motion data including a second number of the first motion samples, the method further comprises:
- interpolating two or more samples included in at least one of the first number of the first motion samples or the second number of the first motion samples to generate second motion samples; and
- generating second motion data including the first number of the first motion samples, the second number of the first motion samples, and the second motion samples, wherein detecting the physical interaction with the device further comprises detecting the physical interaction with the device based on the first power value, the second power value, and the second motion data.

7. The computer-implemented method of claim 1, further comprising:
- determining a difference value between the first power value and the second power value; and
- determining, using at least the first power value and the second power value, a coherence value indicating a similarity between a plurality of the first audio samples within a first time range and a plurality of the second audio samples within the first time range, wherein detecting the physical interaction with the device further comprises detecting the physical interaction with the device based on the difference value, the coherence value, and the motion data.

8. The computer-implemented method of claim 1, further comprising:
- operating a first processor of the device in a first mode;
- determining, using a second processor of the device and the first motion samples:
  - a first value representing first motion of the device in a first dimension,
  - a second value representing second motion of the device in a second dimension, and
  - a third value representing third motion of the device in a third dimension;
- determining, using the second processor, that the third value satisfies a condition, the condition indicating a potential interaction with the device; and
- causing, by the second processor, the first processor to operate in a second mode.

9. The computer-implemented method of claim 1, further comprising:
- selecting a first word of the first data that includes first bits representing a first sample of the first audio samples and second bits representing a first portion of a first sample of the first motion samples;
- generating, using the first bits, a first word of first audio data;
- selecting a second word of the first data that includes third bits representing a first sample of the second audio samples and fourth bits representing a second portion of the first sample of the first motion samples; and generating, using the third bits, a first word of second audio data,
wherein generating the motion data further comprises generating, using the second bits and the fourth bits, a first word of the motion data.

10. The computer-implemented method of claim 1, further comprising:
generating, using the first data, first audio data representing the first audio samples; and
generating, using the first data, second audio data representing the second audio samples;
wherein detecting the physical interaction with the device further comprises:
processing, by a first model, the first audio data and the second audio data to generate audio feature data;
processing, by a second model, the audio feature data and the motion data to generate event data; and
determining that the event data indicates the physical interaction with the device.

11. A computer-implemented method, the method comprising:
receiving, by a first processor of a device, first audio data including at least a first word representing a first audio sample that corresponds to a first microphone and a second word representing a second audio sample that corresponds to a second microphone;
receiving, by the first processor and from a motion sensor, motion data including at least a first motion sample and a second motion sample;
generating, by the first processor and using the first audio data and the motion data, first data including a third word and a fourth word, the third word representing the first audio sample and a first portion of the first motion sample, the fourth word representing the second audio sample and a second portion of the first motion sample; and
sending, by the first processor to a second processor of the device, the first data.

12. The computer-implemented method of claim 11, further comprising:
determining, by the second processor and using the first data, a first power value corresponding to the first audio sample;
determining, by the second processor and using the first data, a second power value corresponding to the second audio sample;
determining, by the second processor and using the first data, the motion data;
detecting, by the second processor, a physical interaction with the device using the first power value, the second power value, and the motion data; and
performing, by the device, a first action in response to detecting the physical interaction.

13. The computer-implemented method of claim 12, wherein detecting the physical interaction further comprises:
determining a first ratio value between the first power value and the second power value;
determining that the first ratio value satisfies a first condition, the first condition indicating a potential interaction with the device; and
determining that the motion data satisfies a second condition, the second condition indicating motion of the device.

14. The computer-implemented method of claim 11, further comprising:
receiving, by the first processor, a first portion of the first audio data;
determining, by the first processor, that the first portion of the first audio data corresponds to a first duration of time;
sending, from the first processor to the motion sensor, a request for a portion of the motion data corresponding to the first duration of time; and
receiving, by the first processor from the motion sensor, at least the first motion sample and the second motion sample.

15. The computer-implemented method of claim 11, wherein a first portion of the first data corresponds to a first duration of time and includes a first number of motion samples, and a second portion of the first data corresponds to the first duration of time and includes a second number of motion samples.

16. The computer-implemented method of claim 11, further comprising:
operating the second processor in a first mode;
determining, using the first processor and the motion data:
a first value representing first motion of the device in a first dimension,
a second value representing first motion of the device in a second dimension, and
a third value representing first motion of the device in a third dimension;
determining, using the first processor, that the third value satisfies a condition, the condition indicating a potential interaction with the device; and
causing, by the first processor, the second processor to operate in a second mode.

17. The computer-implemented method of claim 11, wherein generating the first data further comprises:
selecting, from the first word included in the first audio data, first bits representing the first audio sample, the first word having a first number of bits comprising the first bits and second bits;
selecting, from the motion data, third bits representing the first portion of the first motion sample; and
generating the third word included in the first data, the third word having the first number of bits comprising the first bits and the third bits.

18. A device comprising:
at least one processor; and
memory including instructions operable to be executed by the at least one processor to cause the device to:
receive first data including a first portion representing first audio samples corresponding to a first microphone, a second portion representing second audio samples corresponding to a second microphone, and a third portion representing first motion samples generated by a motion sensor;
generate, using the first portion of the first data, first audio data representing the first audio samples;
generate, using the second portion of the first data, second audio data representing the second audio samples;
generate, using the third portion of the first data, first motion data representing the first motion samples;
detect a physical interaction with the device based on the first audio data, the second audio data, and the first motion data; and
perform a first action in response to detecting the physical interaction.

19. The device of claim 18, wherein the memory further comprises instructions that, when executed by the at least one processor, further cause the device to:

generate, using a first segment of the first data having a first duration of time, a first segment of the first motion data including a first number of the first motion samples;

generate, using a second segment of the first data having the first duration of time, a second segment of the first motion data including a second number of the first motion samples;

generate second motion samples by interpolating two or more samples included in at least one of the first number of the first motion samples or the second number of the first motion samples;

generate second motion data including the first number of the first motion samples, the second number of the first motion samples, and the second motion samples; and detect the physical interaction with the device based on the first audio data, the second audio data, and the second motion data.

20. The device of claim 18, wherein the memory further comprises instructions that, when executed by the at least one processor, further cause the device to:

select a first word of the first data that includes first bits representing a first sample of the first audio samples and second bits representing a first portion of a first sample of the first motion samples;

generate, using the first bits, a first word of the first audio data;

select a second word of the first data that includes third bits representing a first sample of the second audio samples and fourth bits representing a second portion of the first sample of the first motion samples;

generate, using the third bits, a first word of the second audio data; and generate, using the second bits and the fourth bits, a first word of the motion data.

* * * * *